United States Patent
Zhang et al.

(10) Patent No.: US 12,400,473 B2
(45) Date of Patent: Aug. 26, 2025

(54) WEARABLE FACIAL MOVEMENT TRACKING DEVICES

(71) Applicant: CORNELL UNIVERSITY, Ithaca, NY (US)

(72) Inventors: Cheng Zhang, Ithaca, NY (US); Tuochao Chen, Ithaca, NY (US); Benjamin Steeper, Ithaca, NY (US); Francois Guimbretiere, Ithaca, NY (US); Ke Li, Suzhou (CN); Ruidong Zhang, Lianyungang (CN); Hyunchul Lim, Ithaca, NY (US)

(73) Assignee: Cornell University, Ithaca, NY (US)

( * ) Notice: Subject to any disclaimer, the term of this patent is extended or adjusted under 35 U.S.C. 154(b) by 261 days.

(21) Appl. No.: 17/986,102

(22) Filed: Nov. 14, 2022

(65) Prior Publication Data
US 2023/0077010 A1    Mar. 9, 2023

Related U.S. Application Data

(63) Continuation-in-part of application No. PCT/US2021/032511, filed on May 14, 2021.
(Continued)

(51) Int. Cl.
*G06V 40/16* (2022.01)
(52) U.S. Cl.
CPC ......... *G06V 40/166* (2022.01); *G06V 40/171* (2022.01); *G06V 40/176* (2022.01)

(58) Field of Classification Search
CPC .. G06V 40/166; G06V 40/171; G06V 40/176; G06V 10/752; G06V 20/20;
(Continued)

(56) References Cited

U.S. PATENT DOCUMENTS 8,922,481 B1    12/2014    Kauffmann et al.
9,672,416 B2     6/2017    Zhang et al.
(Continued)

OTHER PUBLICATIONS

Extended European Search Report of European Patent Application Serial No. EP 21804664.7, Apr. 10, 2024, 11 pages.
(Continued)

*Primary Examiner* — Nimesh Patel
(74) *Attorney, Agent, or Firm* — Ryan, Mason & Lewis, LLP

(57) ABSTRACT

This technology provides systems and methods for tracking facial movements and reconstructing facial expressions by learning skin deformation patterns and facial features. Frontal view images of a user making a variety of facial expressions are acquired to create a data training set for use in a machine-learning process. Head-mounted or neck-mounted wearable devices are equipped with one or more camera(s) or acoustic device(s) in communication with a data processing system. The cameras capture images of contours of the users face from either the cheekbone or the chin profile of the user. The acoustic devices transmit and receive signals to calculate a representation of the skin deformation. A data processing system uses the images, the profile of the contours, or skin deformation to track facial movement or to reconstruct facial expressions of the user based on the data training set.

25 Claims, 32 Drawing Sheets

Related U.S. Application Data

(60) Provisional application No. 63/343,023, filed on May 17, 2022, provisional application No. 63/025,979, filed on May 15, 2020.

(58) Field of Classification Search
CPC .... G06V 40/174; G06V 40/16; G06V 40/172; G06V 40/168; G06V 10/245; G06V 40/161; G06V 40/20; G06V 10/26; G06V 10/443; G06V 20/64; G06V 10/225; G06V 10/267; G06V 40/193; G06V 40/28; G06V 10/10; G06V 40/18; G06V 40/19; G06V 40/40; G06T 11/00; G06T 17/00; G06T 2207/30201; G06T 7/00; G06T 7/13; G06T 2207/10004; G06T 2207/10016; G06T 2207/30196; G06T 7/0012; G06T 15/00; G06T 2200/04; G06T 2207/20112; G06T 2207/30232; G06T 5/20; G06T 5/70; G06T 5/92; G06T 7/20; G06T 7/136; G06T 7/246; G06T 7/248; G06T 7/292; G06T 7/593; G06T 5/50; G06T 3/4038; G06T 3/14; G06T 3/08; G06T 7/73; G06T 15/005; G06T 19/003; G06T 2207/20081; G06T 2207/20084; G06T 7/33; G06T 7/60; G06T 7/74; G06N 20/00; G06N 3/02; G06N 3/045; G06N 3/08; G06N 5/022; G06N 5/042; G06F 3/012; G06F 3/011; G06F 3/017; G06F 3/013; G06F 3/014; G06F 1/163; G06F 2200/1637; G06F 3/0346

See application file for complete search history.

(56) References Cited

U.S. PATENT DOCUMENTS

| | | | |
|---|---|---|---|
| 10,045,737 | B2 | 8/2018 | Tzvieli et al. |
| 10,078,441 | B2 | 9/2018 | Lee et al. |
| 10,217,261 | B2 | 2/2019 | Li et al. |
| 10,248,852 | B2 | 4/2019 | Kim et al. |
| 10,254,842 | B2 | 4/2019 | Kato et al. |
| 10,376,153 | B2 | 8/2019 | Tzvieli et al. |
| 10,614,295 | B2 | 4/2020 | Kim et al. |
| 2012/0062719 | A1* | 3/2012 | Debevec ............... H04N 23/56 348/E5.024 |
| 2015/0310263 | A1 | 10/2015 | Zhang et al. |
| 2017/0098122 | A1 | 4/2017 | el Kaliouby et al. |
| 2017/0351909 | A1* | 12/2017 | Kaehler ............... G06V 40/171 |
| 2018/0004478 | A1* | 1/2018 | Chen ....................... A63F 13/26 |
| 2018/0027307 | A1* | 1/2018 | Ni ....................... H04N 21/44218 345/419 |
| 2018/0092549 | A1 | 4/2018 | Tzvieli et al. |
| 2018/0107275 | A1 | 4/2018 | Chen et al. |
| 2018/0158246 | A1 | 6/2018 | Grau et al. |
| 2018/0365484 | A1* | 12/2018 | Yu ......................... G06V 40/176 |
| 2019/0012528 | A1* | 1/2019 | Wilson ................... G06F 3/012 |
| 2019/0285881 | A1 | 9/2019 | Ilic et al. |
| 2020/0322518 | A1 | 10/2020 | Nagata |
| 2021/0289134 | A1* | 9/2021 | Athreya ................ G06T 3/4038 |
| 2024/0212388 | A1 | 6/2024 | Li et al. |

OTHER PUBLICATIONS

Suzuki, et al., "Recognition and mapping of facial expressions to avatar by embedded photo reflective sensors in head mounted display," 2017 IEEE Virtual Reality (VR), 2017, pp. 177-185, doi: 10.1109/VR.2017.7892245.
A. Bulling et al., "It's in Your Eyes Towards Context—Awareness and Mobile HCI Using Wearable EOG Goggles," Proceedings of the 10th International Conference on Ubiquitous Computing, Sep. 2008, pp. 84-93.
A. Bulling et al., "Wearable EOG Goggles: Eye-Based Interaction in Everyday Environments," CHI '09 Extended Abstracts on Human Factors in Computing Systems, Apr. 2009, pp. 3259-3264.
Cogain, "Eye Tracker Accuracy Terms and Definitions—working copy," https://old.cogain.org/forums/eye-tracker-accuracy-and-precision-general-discussion/eye-tracker-accuracy-terms-and-definiti.html, Accessed Mar. 5, 2024, 1 page.
C. W. Cho et al., "Gaze Detection by Wearable Eye-Tracking and NIR LED-Based Head-Tracking Device Based on SVR," ETRI Journal, vol. 34, No. 4, Aug. 2012, pp. 542-552.
Github, "Analog Devices AI," https://github.com/MaximIntegratedAI, Accessed Mar. 5, 2024, 3 pages.
Bitfoic Electronics, "OWR-05049T-38D Data Sheet," https://www.bitfoic.com/detail/owr05049t38d-14578, Accessed Mar. 5, 2024, 5 pages.
S. Dong et al., "GazBy: Gaze-Based BERT Model to Incorporate Human Attention in Neural Information Retrieval," Proceedings of the 2022 ACM SIGIR International Conference on Theory of Information Retrieval, Jul. 2022, 11 pages.
Hexagon, "Ergoneers Dikablis Glasses 3 Eye Tracker," https://hexagondownloads.blob.core.windows.net/public/AutonomouStuff/wp-content/uploads/2019/10/as-dikablis-glasses-3.pdf, Accessed Mar. 5, 2024, 2 pages.
CDC, "Niosh Sound Level Meter App," https://www.cdc.gov/niosh/topics/noise/app.html, Jan. 25, 2023, 5 pages.
Gazerecorder, "Online Eye Tracking Software," https://gazerecorder.com/, Accessed Mar. 5, 2024, 13 pages.
A. Golard et al., "Ultrasound for Gaze Estimation—A Modeling and Empirical Study," Sensors, vol. 21, No. 4502, Jun. 30, 2021, 13 pages.
Brown HCI Group, "WebGazer.js: Democratizing Webcam Eye Tracking on the Browser" https://webgazer.cs.brown.edu/#publication, Accessed Mar. 5, 2024, 12 pages.
Imotions, "SMI Eye Tracking Glasses," https://imotions.com/products/hardware/smi-eye-tracking-glasses/, Accessed Mar. 5, 2024, 7 pages.
M. Kassner et al., "Pupil: An Open Source Platform for Pervasive Eye Tracking and Mobile Gaze-based Interaction," arXiv:1405.0006v1, Apr. 30, 2014, 10 pages.
K. Krafka et al., "Eye Tracking for Everyone," Proceedings of the IEEE Conference on Computer Vision and Pattern Recognition (CVPR), Jun. 2016, pp. 2176-2184.
M. Kytö et al., "Pinpointing: Precise Head- and Eye-Based Target Selection for Augmented Reality," Proceedings of the CHI Conference on Human Factors in Computing Systems, Paper No. 81, Apr. 2018, 14 pages.
Lowpowerlab, "Introduction Current Ranger," https://lowpowerlab.com/guide/currentranger/, Sep. 19, 2018, 4 pages.
Pupil Labs, "Pupil Invisible, " https://pupil-labs.com/products/, Accessed Mar. 5, 2024, 2 pages.
A. Lanata et al., "Robust Head Mounted Wearable Eye Tracking System for Dynamical Calibration," Journal of Eye Movement Research, vol. 8, No. 5, Nov. 2, 2015, 15 pages.
Y. Lei, "Eye Tracking Calibration on Mobile Devices," ETRA '21 Adjunct: ACM Symposium on Eye Tracking Research and Applications, May 2021, 4 pages.
T. Li et al., "Ultra-Low Power Gaze Tracking for Virtual Reality," SenSys '17: Proceedings of the 15th ACM Conference on Embedded Network Sensor Systems, Nov. 2017, 14 pages.
T. Li et al., "Battery-Free Eye Tracker on Glasses," Proceedings of the 10th Wireless of the Students, by the Students, and for the Students Workshop, Nov. 2, 2018, pp. 27-29.
B. Mahanama, "Multi-User Eye-Tracking," Symposium on Eye Tracking Research and Applications, Jun. 2022, 3 pages.
M. Matsubara et al., "Extraction of Read Text Using a Wearable Eye Tracker for Automatic Video Annotation," UbiComp/ISWC'15 Adjunct: Adjunct Proceedings of the 2015 ACM International Joint Conference on Pervasive and Ubiquitous Computing and Proceedings of the 2015 ACM International Symposium on Wearable Computers, Sep. 201, pp. 849-854.
A. Mayberry et al., "iShadow: Design of a Wearable, Real-Time Mobile Gaze Tracker," Proceedings of the 12th Annual International

(56) References Cited

OTHER PUBLICATIONS

Conference on Mobile Systems, Applications, and Services, Jun. 2014, Author Manuscript, 35 pages.
A. Mayberry et al., "CIDER: Enabling Robustness-Power Tradeoffs on a Computational Eyeglass," Proceedings of the 21st Annual International Conference on Mobile Computing and Networking, Sep. 2015, Author Manuscript, 36 pages.
CDC, "Occupational Noise Exposure," https://www.cdc.gov/niosh/docs/98-126/default.html#print, Accessed Mar. 5, 2024, 1 page.
T. Ohno et al., "Just Blink Your Eyes: A Head-Free Gaze Tracking System," CHI '03 Extended Abstracts on Human Factors in Computing Systems, Apr. 2003, 2 pages.
L. Paletta et al., "Smartphone Eye Tracking Toolbox: Accurate Gaze Recovery on Mobile Displays," Proceedings of the Symposium on Eye Tracking Research and Applications, Mar. 2014, 2 pages.
A. Papoutsaki et al., "WebGazer: Scalable Webcam Eye Tracking Using User Interactions," Proceedings of the Twenty-Fifth International Joint Conference on Artificial Intelligence, Jul. 2016, 7 pages.
A. Papoutsaki et al., "SearchGazer: Webcam Eye Tracking for Remote Studies of Web Search," Proceedings of the 2017 Conference on Conference Human Information Interaction and Retrieval, Mar. 2017, pp. 17-26.
L Piccardi et al., "WearCam: A Head Mounted Wireless Camera for Monitoring Gaze Attention and for the Diagnosis of Developmental Disorders in Young Children," The 16th IEEE International Symposium on Robot and Human Interactive Communication, Aug. 2007, 5 pages.
Pjrc, "Audio Adaptor Boards for Teensy 3.x and Teensy 4.x," https://www.pjrc.com/store/teensy3_audio.html, Accessed Mar. 6, 2024, 7 pages.
Pjrc, "Teensy 4.1 Development Board," https://www.pjrc.com/store/teensy41.html, Accessed Mar. 6, 2024, 23 pages.
W. J. Ryan et al., "Limbus / Pupil Switching For Wearable Eye Tracking Under Variable Lighting Conditions," Proceedings of the 2008 symposium on Eye Tracking Research & Applications, Mar. 2008, 4 pages.
S. Saxena et al., "Towards Efficient Calibration for Webcam Eye-Tracking in Online Experiments," Symposium on Eye Tracking Research and Applications, Jun. 2022, 7 pages.
RealEye, "RealEye Webcam Eye-Tracking," https://www.realeye.io/, Accessed Mar. 6, 2024, 8 pages.
C. Topal et al., "A Wearable Head-Mounted Sensor-Based Apparatus for Eye Tracking Applications," IEEE International Conference on Virtual Environments, Human-Computer Interfaces, and Measurement Systems, Jul. 2008, 4 pages.
C. Topal et al., "A Head-Mounted Sensor-Based Eye Tracking Device: Eye Touch System," Proceedings of the 2008 Symposium on Eye Tracking Research & Applications, Mar. 2008, 4 pages.
M. Vidal et al., "Wearable Eye Tracking for Mental Health Monitoring," Computer Communications, vol. 35, No. 11, Jun. 15, 2012, pp. 1306-1311.
Q. Wang et al., "Thermographic Eye Tracking," Proceedings of the Ninth Biennial ACM Symposium on Eye Tracking Research & Applications, Mar. 2016, pp. 307-310.
E. Whitmire et al., "EyeContact: Scleral Coil Eye Tracking for Virtual Reality," Proceedings of the 2016 ACM International Symposium on Wearable Computers, Sep. 2016, 8 pages.
K. Wisiecka et al., "Comparison of Webcam and Remote Eye Tracking," 2022 Symposium on Eye Tracking Research and Applications, Jun. 2022, 7 pages.
Z. Ye et al., "Detecting Eye Contact using Wearable Eye-Tracking Glasses," Proceedings of the 2012 ACM Conference on Ubiquitous Computing, Sep. 2012, 7 pages.
Y. Zhang et al., "Discrimination of Gaze Directions Using Low-Level Eye Image Features," Proceedings of the 1st International Workshop on Pervasive Eye Tracking & Mobile Eye-based Interaction, Sep. 2011, pp. 9-14.
A. Zhu et al., "MobiET: A New Approach to Eye Tracking for Mobile Device," Proceedings of the 2018 ACM International Joint Conference and 2018 International Symposium on Pervasive and Ubiquitous Computing and Wearable Computers, Oct. 2018, 8 pages.
W. Sun et al., "VibroSense: Recognizing Home Activities by Deep Learning Subtle Vibrations on an Interior Surface of a House from a Single Point Using Laser Doppler Vibrometry," Proceedings of the ACM on Interactive, Mobile, Wearable and Ubiquitous Technologies, vol. 4, No. 3, Sep. 2020, pp. 96:1-96:28.
F. Zhang et al., "MediaPipe Hands: On-device Real-time Hand Tracking," arXiv:2006.10214v1, Jun. 18, 2020, 5 pages.
H. Zhou et al., "One Ring to Rule Them All: An Open Source Smartring Platform for Finger Motion Analytics and Healthcare Applications," Proceedings of the 8th ACM/IEEE Conference on Internet of Things Design and Implementation, May 2023, pp. 27-38.
A.-I. Siean, "A Set of Smart Ring Gestures for Drone Control," The 12th International Conference on Electronics, Communications and Computing, Oct. 2022, pp. 203-208.
Polytec Gmbh, "VibroGo," https://www.polytec.com/eu/vibrometry/products/single-point-vibrometers/vibrogo, Accessed Oct. 21, 2022, 23 pages.
R. Abbaszadeh et al., "Prediction of Watermelon Quality Based on Vibration Spectrum," Postharvest Biology and Technology, vol. 86, Dec. 2013, pp. 291-293.
J. D. Achenbach, "Wave Propagation in Elastic Solids," Elsevier, Jan. 1973, 18 pages. Description and Table of Contents Only.
J. R. M. Aerts et al., "Nonlinearity in Eardrum Vibration as a Function of Frequency and Sound Pressure," Hearing Research, vol. 263, May 2010, pp. 26-32.
Y. Avargel et al., "Speech Measurements Using a Laser Doppler Vibrometer Sensor: Application to Speech Enhancement," 2011 Joint Workshop on Hands-free Speech Communication and Microphone Arrays, Jun. 2011, pp. 109-114.
D. Avrahami et al., "Below the Surface: Unobtrusive Activity Recognition for Work Surfaces using RF-radar Sensing," 23rd International Conference on Intelligent User Interfaces, Mar. 2018, pp. 439-451.
A. Bonde et al., "Demo Abstract: Deskbuddy: an Office Activity Detection System," Proceedings of the 18th International Conference on Information Processing in Sensor Networks, Apr. 2019, pp. 352-353.
P. Castellini et al., "Laser Doppler Vibrometry: Development of Advanced Solutions Answering to Technology's Needs," Mechanical Systems and Signal Processing, vol. 20, Aug. 2006, pp. 1265-1285.
K.-Y. Chen et al., "DOSE: Detecting User-Driven Operating States of Electronic Devices from a Single Sensing Point," IEEE International Conference on Pervasive Computing and Communications, Mar. 2015, pp. 46-54.
G. Cohn et al., "GasSense: Appliance-Level, Single-Point Sensing of Gas Activity in the Home," International Conference on Pervasive Computing, Apr. 2010, pp. 265-282.
G. Cohn et al., "An Ultra-Low-Power Human Body Motion Sensor Using Static Electric Field Sensing," Proceedings of the 2012 ACM Conference on Ubiquitous Computing, Sep. 2012, pp. 99-102.
A. Davis et al., "Visual Vibrometry: Estimating Material Properties from Small Motions in Video," IEEE Transactions on Pattern Analysis and Machine Intelligence, vol. 39, No. 4, Apr. 2017, pp. 732-745.
A. Davis et al., "The Visual Microphone: Passive Recovery of Sound from Video," ACM Transactions on Graphics, vol. 33, No. 4, Jul. 2014, 10 pages.
J. Fagert et al., "Monitoring Hand-Washing Practices Using Structural Vibrations," Proceedings of Structural Health Monitoring, May 2017, 10 pages.
J. Fagert et al., "Vibration Source Separation for Multiple People Gait Monitoring Using Footstep-Induced Floor Vibrations," Structural Health Monitoring, DOI 10.12783/shm2019/32338, Nov. 15, 2019, 1 page. Abstract Only.
J. Fogarty et al., "Sensing from the Basement: A Feasibility Study of Unobtrusive and Low-Cost Home Activity Recognition," Proceedings of the 19th Annual ACM Symposium on User Interface Software and Technology, Oct. 2006, pp. 91-100.

(56) References Cited

OTHER PUBLICATIONS

Y. Shen et al., "The Impact of Quantity of Training Data on Recognition of Eating Gestures," arXiv:1812.04513v1, Dec. 11, 2018, 7 pages.
D. Goyal et al., "The Vibration Monitoring Methods and Signal Processing Techniques for Structural Health Monitoring: A Review," Archives of Computational Methods in Engineering, vol. 23, pp. 585-594.
T. Shiratori et al., "Motion Capture from Body-Mounted Cameras," ACM Transactions on Graphics, Jul. 25, 2011, 10 pages.
S. Stankoski et al., "Smartwatch-Based Eating Detection: Data Selection for Machine Learning from Imbalanced Data with Imperfect Labels," Sensors, vol. 21, No. 5, Mar. 9, 2021, 25 pages.
A. M. Huber et al., "A New Implantable Middle Ear Hearing Device for Mixed Hearing Loss: A Feasibility Study in Human Temporal Bones," Otology & Neurotology, vol. 27, Dec. 2006, pp. 1104-1109.
A. M. Huber et al., "Evaluation of Eardrum Laser Doppler Interferometry as a Diagnostic Tool," The Laryngoscope, vol. 111, No. 3, Mar. 2001, pp. 501-507.
B. Tekin et al., "Fusing 2D Uncertainty and 3D Cues for Monocular Body Pose Estimation," arXiv:1611.05708v3, Apr. 10, 2017, 13 pages.
Y. Kim et al., "ViridiScope: Design and Implementation of a Fine Grained Power Monitoring System for Homes," Proceedings of the 11th ACM International Conference on Ubiquitous Computing, Sep. 2009, pp. 245-254.
S. Kuznetsov et al., "UpStream: Motivating Water Conservation with Low-Cost Water Flow Sensing and Persuasive Displays," Proceedings of the SIGCHI Conference on Human Factors in Computing Systems, Apr. 2010, pp. 1851-1860.
T. He et al., "Bag of Tricks for Image Classification with Convolutional Neural Networks," IEEE/CVF Conference on Computer Vision and Pattern Recognition, Dec. 4, 2018, pp. 558-567.
E. Thomaz et al., "A Practical Approach for Recognizing Eating Moments with Wrist-Mounted Inertial Sensing," In Proceedings of the ACM International Joint Conference on Pervasive and Ubiquitous Computing, Sep. 2015, pp. 1029-1040.
G. Laput et al., "Zensors: Adaptive, Rapidly Deployable, Human-Intelligent Sensor Feeds," Proceedings of the 33rd Annual ACM Conference on Human Factors in Computing Systems, Apr. 2015, 10 pages.
E. Thomaz et al., "Feasibility of Identifying Eating Moments from First-Person Images Leveraging Human Computation," Proceedings of the 4th International SenseCam & Pervasive Imaging Conference, Nov. 2013, 8 pages.
H. Li et al., "IDSense: A Human Object Interaction Detection System Based on Passive UHF RFID," Proceedings of the 33rd Annual ACM Conference on Human Factors in Computing Systems, Apr. 2015, 10 pages.
S. Li et al., "WiFit: Ubiquitous Bodyweight Exercise Monitoring with Commodity Wi-Fi Devices," IEEE SmartWorld, Ubiquitous Intelligence & Computing, Advanced & Trusted Computing, Scalable Computing & Communications, Cloud & Big Data Computing, Internet of People and Smart City Innovation, Oct. 2018, pp. 530-537.
X. Liu et al., "Wi-Sleep: Contactless Sleep Monitoring via WiFi Signals," IEEE Real-Time Systems Symposium, Dec. 2014, pp. 346-355.
G. Luo et al., "Wavelet Denoising," Chapter 4, Advances in Wavelet Theory and Their Applications in Engineering, Physics and Technology, Apr. 2012, 23 pages.
S. Mashiyama et al., "Activity Recognition Using Low Resolution Infrared Array Sensor," IEEE International Conference on Communications, Jun. 2015, 6 pages.
M. Mirshekari et al., "Human Gait Monitoring Using Footstep-Induced Floor Vibrations Across Different Structures," Proceedings of the 2018 ACM International Joint Conference and 2018 International Symposium on Pervasive and Ubiquitous Computing and Wearable Computers, Oct. 2018, pp. 1382-1391.

M. Mirshekari et al., "Obstruction-Invariant Occupant Localization Using Footstep-induced Structural Vibrations," Mechanical Systems and Signal Processing, vol. 153, May 15, 2021, 19 pages.
M. Mirshekari et al., "Poster Abstract: Non-intrusive Occupant Localization Using Floor Vibrations in Dispersive Structure," Proceedings of the 14th ACM Conference on Embedded Network Sensor Systems, Nov. 2016, pp. 378-379.
P. G. G. Muyshondt et al., "A Single-Ossicle Ear: Acoustic Response and Mechanical Properties Measured in Duck," Hearing Research, vol. 340, Oct. 2016, 13 pages.
K. Ohara et al., "Detecting State Changes Of Indoor Everyday Objects Using Wi-Fi Channel State Information," Proceedings of the ACM on Interactive, Mobile, Wearable and Ubiquitous Technologies, vol. 1, No. 3, Sep. 2017, 28 pages.
W. Ostachowicz et al., "50th Anniversary Article: Comparison Studies of Full Wavefield Signal Processing for Crack Detection," Strain, vol. 50, Jun. 25, 2014, pp. 275-291.
S. Pan et al., "Fine-Grained Recognition of Activities of Daily Living through Structural Vibration and Electrical Sensing," Proceedings of the 6th ACM International Conference on Systems for Energy-Efficient Buildings, Cities, and Transportation, Nov. 2019, pp. 149-158.
S. Pan et al., "FootprintID: Indoor Pedestrian Identification through Ambient Structural Vibration Sensing," Proceedings of the ACM on Interactive, Mobile, Wearable and Ubiquitous Technologies, vol. 1, No. 3, Sep. 2017, 31 pages.
S. N. Patel et al., "Detecting Human Movement by Differential Air Pressure Sensing in HVAC System Ductwork: An Exploration in Infrastructure Mediated Sensing," International Conference on Pervasive Computing, May 2008, 18 pages.
S. N. Patel et al., "At the Flick of a Switch: Detecting and Classifying Unique Electrical Events on the Residential Power Line," International Conference on Ubiquitous Computing, Sep. 2007, pp. 271-288.
Q. Pu et al., "Whole-Home Gesture Recognition Using Wireless Signals," Proceedings of the 19th Annual International Conference on Mobile Computing & Networking, Sep. 2013, 13 pages.
J. Tompson et al., "Joint Training of a Convolutional Network and a Graphical Model for Human Pose Estimation," arXiv:1406.2984v2, Sep. 17, 2014, 9 pages.
N. B. Roozen et al., "Determining Radiated Sound Power of Building Structures by Means of Laser Doppler Vibrometry," Journal of Sound and Vibration, vol. 346, Jun. 23, 2015, 37 pages.
S. J. Rothberg et al., "An International Review of Laser Doppler Vibrometry: Making Light Work of Vibration Measurement," Optics and Lasers in Engineering, vol. 99, Dec. 2017, 35 pages.
L. Shi et al., "Device-free Multiple People Localization through Floor Vibration," Proceedings of the 1st ACM International Workshop on Device-Free Human Sensing, Nov. 2019, pp. 57-61.
L. Shi et al., "Data Quality-Informed Multiple Occupant Localization using Floor Vibration Sensing," Proceedings of the 21st International Workshop on Mobile Computing Systems and Applications, Mar. 2020, p. 98.
K. Li et al., "GazeTrak: Exploring Acoustic-based Eye Tracking on a Glass Frame," arXiv:2402.14634v2, Feb. 23, 2024, 16 pages.
R. Zhang et al., "EchoSpeech: Continuous Silent Speech Recognition on Minimally-obtrusive Eyewear Powered by Acoustic Sensing," Proceedings of the 2023 CHI Conference on Human Factors in Computing Systems, No. 852, Apr. 2023, 18 pages.
L. Billman et al., "Speech Reading with Deep Neural Networks," Uppsala Universitet Department of Information Technology, Jul. 2018, 65 pages.
N. Alghamdi et al., "A Corpus of Audio-Visual Lombard Speech with Frontal and Profile Views," The Journal of the Acoustical Society of America, vol. 143, No. 6, Jun. 2018, pp. EL523-EL529.
Y. M. Assael et al., "LipNet: Sentence-level Lipreading," arXiv:1611.01599v1, Nov. 5, 2016, 12 pages.
Y. M. Assael et al., "LipNet: End-to-End Sentence-level Lipreading," arXiv:1611.01599v2, Dec. 16, 2016, 13 pages.
J. S. Chung et al., "Lip Reading in Profile," British Machine Vision Conference, Sep. 2017, 11 pages.
J. S. Chung et al., "Lip Reading in the Wild," Asian Conference on Computer Vision, Mar. 2017, 17 pages.

(56) References Cited

OTHER PUBLICATIONS

M. Cooke et al., "An Audio-Visual Corpus for Speech Perception and Automatic Speech Recognition," The Journal of the Acoustical Society of America, vol. 120, No. 5, Nov. 2006, pp. 2421-2424.
T. Le Cornu et al., "Reconstructing Intelligible Audio Speech from Visual Speech Feature," 16th Annual Conference of the International Speech Communication Association, Sep. 2015, 6 pages.
A. Ephrat et al., "Vid2Speech: Speech Reconstruction from Silent Video," arXiv:1701.00495v2, Jan. 9, 2017, 5 pages.
I. Fung et al., "End-to-End Low-Resource Lip-Reading with Maxout CNN and LSTM," IEEE International Conference on Acoustics, Speech and Signal Processing (ICASSP), Sep. 2018, 5 pages.
Y. Gao et al., "EchoWhisper: Exploring an Acoustic-Based Silent Speech Interface for Smart-phone Users," Proceedings of the ACM on Interactive, Mobile, Wearable and Ubiquitous Technologies, vol. 4, No. 3, Sep. 2020, pp. 80:1-80:27.
Y. Jin et al., "EarCommand: "Hearing" Your Silent Speech Commands in Ear," Proceedings of the ACM on Interactive, Mobile, Wearable and Ubiquitous Technologies, vol. 6, No. 2, Jun. 2022, pp. 57:1-57:28.
A. Koumparoulis et al., "Exploring ROI Size in Deep Learning Based Lipreading," Auditory Visual Speech Processing Conference Proceedings, Aug. 25, 2017, 6 pages.
Y. Kunimi et al., "E-Mask: A Mask-Shaped Interface for Silent Speech Interaction with Flexible Strain Sensors," Augmented Humans, Mar. 2022, pp. 26-34.
J. Luo et al., "End-To-End Silent Speech Recognition with Acoustic Sensing," arXiv:2011.11315v1, Nov. 23, 2020, 7 pages.
D. Michelsanti et al., "Vocoder-Based Speech Synthesis from Silent Videos," arXiv:2004.02541v2, Aug. 15, 2020, 5 pages.
R. Mira et al., "End-to-End Video-to-Speech Synthesis Using Generative Adversarial Networks," arXiv:2104.13332v3, Aug. 15, 2022, 12 pages.
L. Pandey et al., "LipType: A Silent Speech Recognizer Augmented with an Independent Repair Model," ACM CHI Virtual Conference on Human Factors in Computing Systems, May 2021, 19 pages.
L. Pandey et al., "Acceptability of Speech and Silent Speech Input Methods in Private and Public," ACM CHI Virtual Conference on Human Factors in Computing Systems, May 2021, 13 pages.
L. Pandey et al., "Silent Speech and Emotion Recognition from Vocal Tract Shape Dynamics in Real-Time MRI," arXiv:2106.08706v1, Jun. 16, 2021, 8 pages.
E. K. Patterson et al., "Cuave: A New Audio-Visual Database for Multimodal Human-Computer Interface," IEEE International Conference on Acoustics, Speech, and Signal Processing, May 2002, 4 pages.
A. Rekik et al., "A New Visual Speech Recognition Approach for RGB-D Cameras," International Conference Image Analysis and Recognition, Oct. 2014, 8 pages.
C. Rzepka, "Examining the Use of Voice Assistants: A Value-Focused Thinking Approach," Twenty-fifth Americas Conference on Information Systems, Aug. 2019, 10 pages.
G. Saon et al., "English Conversational Telephone Speech Recognition by Humans and Machines," arXiv:1703.02136v1, Mar. 6, 2017, 7 pages.
K. Sun et al., "Lip-Interact: Improving Mobile Device Interaction with Silent Speech Commands," Proceedings of the 31st Annual ACM Symposium on User Interface Software and Technology, Oct. 2018, 13 pages.
H. Akbari et al., "Lip2Audspec: Speech Reconstruction from Silent Lip Movements Video," arXiv:1710.09798v1, Oct. 26, 2017, 9 pages.
A. Thanda et al., "Audio Visual Speech Recognition using Deep Recurrent Neural Networks," arXiv: 1611.02879v1, Nov. 9, 2016, 12 pages.
D. Vorontsova et al., "Silent EEG-Speech Recognition Using Convolutional and Recurrent Neural Network with 85% Accuracy of 9 Words Classification," Sensors vol. 21, No. 6744, Oct. 11, 2021, 19 pages.
K. Vougioukas et al., "Video-Driven Speech Reconstruction using Generative Adversarial Networks," arXiv:1906.06301v1, Jun. 14, 2019, 6 pages.
M. Wand et al., "Lipreading with Long Short-Term Memory," arXiv:1601.08188v1, Jan. 29, 2016, 5 pages.
J. Wang et al., "RFID Tattoo: A Wireless Platform for Speech Recognition," Proceedings of the ACM on Interactive, Mobile, Wearable and Ubiquitous Technologies, vol. 3, No. 4, Dec. 2019, pp. 155:1-155:24.
Z. Wang et al., "ToothSonic: Earable Authentication via Acoustic Toothprint," Proceedings of the ACM on Interactive, Mobile, Wearable and Ubiquitous Technologies, vol. 6, No. 2, Jun. 2022, pp. 78:1-78:24.
P. Weber et al., "(Non-)Interacting with Conversational Agents: Perceptions and Motivations of Using Chatbots and Voice Assistants," Proceedings of Mensch und Computer, Sep. 2020, pp. 321-331.
W. Xiong et al., "Achieving Human Parity in Conversational Speech Recognition," arXiv:1610.05256v2, Feb. 17, 2017, 13 pages.
K. Xu et al., "LCANet: End-to-End Lipreading with Cascaded Attention—CTC," arXiv:1803.04988v1, Mar. 13, 20218, 10 pages.
S. Yang et al., "LRW-1000: A Naturally-Distributed Large-Scale Benchmark for Lip Reading in the Wild," arXiv:1810.06990v6, Apr. 24, 2019, 8 pages.
Q. Zhang et al., "SoundLip: Enabling Word and Sentence-Level Lip Interaction for Smart Devices," Proceedings of the ACM on Interactive, Mobile, Wearable and Ubiquitous Technologies, vol. 5, No. 21, Mar. 2021, pp. 44:1-44:28.
G. Zhao et al., "Lipreading With Local Spatiotemporal Descriptors," IEEE Transactions on Multimedica, vol. 11, No. 7, Nov. 2009, pp. 1254-1265.
K. Suzuki et al., "Recognition and Mapping of Facial Expressions to Avatar by Embedded Photo Reflective Sensors in Head Mounted Display," IEEE Virtual Reality, Mar. 2017, pp. 177-185.
H.-Y. Lai, "Tracking of Eye Movement Features for Individualized Assessment of Neurocognitive State Using Mobile Devices," Doctor of Philosophy Thesis, Massachusetts Institute of Technology, Sep. 2021, 150 pages.
S. F. W. Neggers et al., "Ocular Gaze Is Anchored to the Target of an Ongoing Pointing Movement," Neurophysiology, vol. 83, No. 2, Feb. 2000, pp. 639-651.
Tobii, "Tobii Pro Fusion," https://www.tobiipro.com/product-listing/fusion/, Accessed Mar. 5, 2024, 16 pages.
Tobii, "Tobii Pro Glasses 3," https://www.tobiipro.com/product-listing/tobii-pro-glasses-3/, Accessed Mar. 5, 2024, 12 pages.
A. Ablavatski et al., "Real-time Pupil Tracking from Monocular Video for Digital Puppetry," arXiv:2006.11341v1, Jun. 19, 2020, 4 pages.
C. Ahlstrom et al., "Comparison of Eye Tracking Systems with One and Three Cameras," 7th International Conference on Methods and Techniques in Behavioral Research, Aug. 2010, pp. 196-199.
Github, "MAX7800x Power Monitor and Energy Benchmarking Guide," https://github.com/MaximIntegratedAI/MaximAI_Documentation/blob/master/Guides/MAX7800x%20Power%20Monitor%20and%20Energy%20Benchmarking%20Guide.pdf, Accessed Mar. 5, 2024, 11 pages.
T. Bafna et al., "EyeTell: Tablet-based Calibration-free Eye-typing using Smooth-pursuit Movements," ETRA '21 Short Papers: ACM Symposium on Eye Tracking Research and Applications, May 2021, 6 pages.
F. H. Borsato et al., "Episcleral Surface Tracking: Challenges and Possibilities for Using Mice Sensors for Wearable Eye Tracking," Proceedings of the Ninth Biennial ACM Symposium on Eye Tracking Research & Applications, Mar. 2016, pp. 39-46.
S. Mahmud et al., "ActSonic: Recognizing Everyday Activities from Inaudible Acoustic Waves Around the Body," arXiv:2404.13924v2, May 8, 2024, 29 pages.
C.-J. Lee et al., "EchoWrist: Continuous Hand Pose Tracking and Hand-Object Interaction Recognition Using Low-Power Active Acoustic Sensing on a Wristband," arXiv:2401.17409v2, Mar. 29, 2024, 21 pages.
S. Mahmud et al., "PoseSonic: 3D Upper Body Pose Estimation Through Egocentric Acoustic Sensing on Smartglasses," Proceed-

(56) References Cited

OTHER PUBLICATIONS ings of the ACM on Interactive, Mobile, Wearable and Ubiquitous Technologies, vol. 7, No. 3, Sep. 2023, pp. 111:1-111:28.
K. Li et al., "EyeEcho: Continuous and Low-power Facial Expression Tracking on Glasses," arXiv:2402.12388v2, Feb. 23, 2024, 24 pages.
R. Zhang et al., "HPSpeech: Silent Speech Interface for Commodity Headphones," Proceedings of the 2023 ACM International Symposium on Wearable Computers, Oct. 2023, pp. 60-65.
T. C. Yu et al., "Ring-a-Pose: A Ring for Continuous Hand Pose Tracking," arXiv:2404.12980v1, Apr. 19, 2024, 26 pages.
International Search Report of PCT/US2021/032511, dated Aug. 13, 2021, one page.
H. Li et al., "Wristwash: Towards Automatic Handwashing Assessment Using a Wrist-worn Device," Proceedings of the 2018 ACM International Symposium on Wearable Computers, Oct. 2018, pp. 132-139.
R. K. Kramer et al., "Soft Curvature Sensors for Joint Angle Proprioception," IEEE/RSJ International Conference on Intelligent Robots and Systems, Sep. 2011, 8 pages.
J. J. Gibson, "The Theory of Affordances," Chapter 8, The Ecological Approach to Visual Perception, Hillsdale, Jan. 1, 1979, 15 pages.
Go Pro, "Hero 12 Black," https://gopro.com/en/us/shop/cameras, Accessed Jul. 18, 2024, 10 pages.
Y. Guan et al., "Ensembles of Deep LSTM Learners for Activity Recognition using Wearables," arXiv:1703.09370v1, Mar. 28, 2017, 28 pages.
S. Gupta et al., "ElectriSense: Single-Point Sensing Using EMI for Electrical Event Detection and Classification in the Home," Proceedings of the 12th ACM International Conference on Ubiquitous Computing, Sep. 2010, pp. 139-148.
N. Y. Hammerla et al., "Deep, Convolutional, and Recurrent Models for Human Activity Recognition Using Wearables," arXiv: 1604.08880v1, Apr. 29, 2016, 7 pages.
H. Haresamudram et al., "On the Role of Features in Human Activity Recognition," Proceedings of the 2019 ACM International Symposium on Wearable Computers, Sep. 2019, pp. 78-88.
H. Haresamudram et al., "Masked Reconstruction Based Self-Supervision for Human Activity Recognition," Proceedings of the 2020 ACM International Symposium on Wearable Computers, Sep. 2020, pp. 45-49.
H. Haresamudram et al., "Contrastive Predictive Coding for Human Activity Recognition," arXiv:2012.05333v1, Dec. 9, 2020, 23 pages.
K. He et al., "Deep Residual Learning for Image Recognition," Proceedings of the IEEE Conference on Computer Vision and Pattern Recognition, arXiv:1512.03385v1, Dec. 10, 2015, 12 pages.
D.-A. Huang et al., "Connectionist Temporal Modeling for Weakly Supervised Action Labeling," arXiv:1607.08584v1, Jul. 28, 2016, 17 pages.
S. Ioffe et al., "Batch Normalization: Accelerating Deep Network Training by Reducing Internal Covariate Shift," arXiv:1502.03167v3, Mar. 2, 2015, 11 pages.
Y. Iravantchi et al., "PrivacyMic: Utilizing Inaudible Frequencies for Privacy Preserving Daily Activity Recognition," Proceedings of the 2021 CHI Conference on Human Factors in Computing Systems, May 2021, No. 198, 13 pages.
Y. Iravantchi et al., "Interferi: Gesture Sensing using On-Body Acoustic Interferometry," CHI Conference on Human Factors in Computing Systems, No. 276, May 2019, 13 pages.
M. Kijima et al., "Poster Abstract: Multiple Door Opening/Closing Detection System Using Infrasound Sensor," 17th ACM/IEEE International Conference on Information Processing in Sensor Networks (IPSN), Apr. 2018, pp. 126-127.
D. Kim et al., "Detector-Free Weakly Supervised Group Activity Recognition," IEEE/CVF Conference on Computer Vision and Pattern Recognition (CVPR), Jun. 2022, pp. 20083-20093.
D. P. Kingma et al., "Adam: A Method for Stochastic Optimization," arXiv:1412.6980v9, Jan. 30, 2017, 15 pages.

A. Kukleva et al., "Unsupervised Learning of Action Classes with Continuous Temporal Embedding," Computer Vision and Pattern, Apr. 8, 2019, pp. 12066-12074.
J. R. Kwapisz et al., "Activity Recognition using Cell Phone Accelerometers," ACM SIGKDD Explorations Newsletter, vol. 12, No. 2, Mar. 31, 2011, pp. 74-82.
H. Kwon et al., "Adding Structural Characteristics to Distribution-Based Accelerometer Representations for Activity Recognition Using Wearables, " Proceedings of the 2018 ACM International Symposium on Wearable Computers, Oct. 2018, pp. 72-75.
N. D. Lane et al., "DeepEar: Robust Smartphone Audio Sensing in Unconstrained Acoustic Environments using Deep Learning," Proceedings of the 2015 ACM International Joint Conference on Pervasive and Ubiquitous Computing, Sep. 2015, pp. 283-294.
G. Laput et al., "Ubicoustics: Plug-and-Play Acoustic Activity Recognition," Proceedings of the 31st Annual ACM Symposium on User Interface Software and Technology, Oct. 2018, pp. 213-224.
G. Laput et al., "Sensing Fine-Grained Hand Activity with Smartwatches," Proceedings of the 2019 CHI Conference on Human Factors in Computing Systems, May 2019, No. 338, 13 pages.
G. Laput et al., "ViBand: High-Fidelity Bio-Acoustic Sensing Using Commodity Smartwatch Accelerometers," Proceedings of the 29th Annual Symposium on User Interface Software and Technology, Oct. 16, 2016, 13 pages.
G. Laput et al., "Synthetic Sensors: Towards General-Purpose Sensing," Proceedings of the 2017 CHI Conference on Human Factors in Computing Systems, May 2017, 14 pages.
C. Lea et al., "Temporal Convolutional Networks for Action Segmentation and Detection," IEEE Conference on Computer Vision and Pattern Recognition (CVPR), Jul. 2017, pp. 156-165.
B. Li et al., "Extraction and Interpretation of Deep Autoencoder-based Temporal Features from Wearables for Forecasting Personalized Mood, Health, and Stress," Proceedings of the ACM on Interactive, Mobile, Wearable and Ubiquitous Technologies, vol. 4, No. 2, Jun. 2020, pp. 49:1-49:26.
K. Li et al., "EarIO: A Low-power Acoustic Sensing Earable for Continuously Tracking Detailed Facial Movements," Proceedings of the ACM on Interactive, Mobile, Wearable and Ubiquitous Technologies, vol. 6, No. 2, Jun. 2022, pp. 62:1-62:24.
D. Liang et al., "Audio-Based Activities of Daily Living (ADL) Recognition with Large-Scale Acoustic Embeddings from Online Videos," Proceedings of the ACM on Interactive, Mobile, Wearable and Ubiquitous Technologies, vol. 3, No. 1, Mar. 2019, pp. 17:1-17:18.
T.-Y. Lin et al., "Focal Loss for Dense Object Detection," IEEE Transactions on Pattern Analysis and Machine Intelligence, Jul. 2018, pp. 2980-2988.
D. Liu et al., "Diffusion Action Segmentation," arXiv:2303.17959v2. Aug. 12, 2023, 15 pages.
P. Lukowicz et al., "Recognizing Workshop Activity Using Body Worn Microphones and Accelerometers," Pervasive Computing: Proceedings of the 2nd International Conference, Apr. 2004, pp. 18-32.
H. Ma et al., "AttnSense: Multi-level Attention Mechanism For Multimodal Human Activity Recognition," Proceedings of the Twenty-Eighth International Joint Conference on Artificial Intelligence, Aug. 2019, pp. 3109-3115.
S. Mahmud et al., "Human Activity Recognition from Wearable Sensor Data Using Self-Attention," European Conference on Artificial Intelligence, Mar. 17, 2020, pp. 1332-1339.
J. Meyer et al., "A CNN-based Human Activity Recognition System Combining a Laser Feedback Interferometry Eye Movement Sensor and an IMU for Context-aware Smart Glasses," Proceedings of the ACM on Interactive, Mobile, Wearable and Ubiquitous Technologies, vol. 5, No. 4, Dec. 2021, pp. 172:1-172:24.
V. Mollyn et al., "SAMoSA: Sensing Activities with Motion and Subsampled Audio," Proceedings of the ACM on Interactive, Mobile, Wearable and Ubiquitous Technologies, vol. 6, No. 3, Sep. 2022, pp. 132:1-132:19.
D. B. Moyano et al., "Possible Effects on Health of Ultrasound Exposure, Risk Factors in the Work Environment and Occupational Safety Review," Healthcare, vol. 10, Feb. 24, 2022, 19 pages.

(56) References Cited

OTHER PUBLICATIONS

V. S. Murahari et al., "On Attention Models for Human Activity Recognition," arXiv:1805.07648v1, May 19, 2018, 4 pages.
W. J. Murphy et al., "Revisiting the NIOSH Criteria for a Recommended Standard: Occupational Noise Exposure," The Journal of the Acoustical Society of America, vol. 111, No. 5, May 2002, 2 pages, Abstract Only.
R. Nandakumar et al., "Contactless Sleep Apnea Detection on Smartphones," Proceedings of the 13th Annual International Conference on Mobile Systems, Applications, and Services, May 2015, 13 pages.
T. Ohkawa et al., "AssemblyHands: Towards Egocentric Activity Understanding via 3D Hand Pose Estimation," Conference on Computer Vision and Pattern Recognition, Jun. 2023, pp. 12999-13008.
F. J. Ordonez et al., "Deep Convolutional and LSTM Recurrent Neural Networks for MultimodalWearable Activity Recognition," Sensors, vol. 16, No. 115, Jan. 18, 2016, 25 pages.
A. Waghmare et al., "Z-Pose: Continuous 3D Hand Pose Tracking Using Single-Point Bio-Impedance Sensing on a Ring," SmartWear '23: Proceedings of the 2nd Workshop on Smart Wearable Systems and Applications, Oct. 2023, 6 pages.
M. Wilhelm et al., "PeriSense: Ring-Based Multi-Finger Gesture Interaction Utilizing Capacitive Proximity Sensing," Sensors, vol. 20, No. 3990, Jul. 17, 2020, 23 pages.
C. Zhang et al., "FingOrbits: Interaction with Wearables Using Synchronized Thumb Movements," ACM International Symposium on Wearable Computers, Sep. 2017, pp. 62-65.
Apple Inc., "Apple Vision Pro," https://www.apple.com/apple-vision-pro/, Accessed Oct. 18, 2024, 8 pages.
Apple Inc., "Apple Watch Series 10," https://www.apple.com/shop/buy-watch/apple-watch, Accessed Oct. 18, 2024, 11 pages.
Y. Bi et al., "Autodietary: A Wearable Acoustic Sensor System for Food Intake Recognition in Daily Life," IEEE Sensors Journal, vol. 16, No. 3, Feb. 1, 2016, pp. 806-816.
R. Boldu et al., "Thumb-in-Motion: Evaluating Thumb-to-Ring Microgestures for Athletic Activity," Proceedings of the 2018 ACM Symposium on Spatial User Interaction, Oct. 2018, pp. 150-157.
G. Cao et al., "EarphoneTrack: Involving Earphones into the Ecosystem of Acoustic Motion Tracking," Proceedings of the 18th Conference on Embedded Networked Sensor Systems, Nov. 2020, 14 pages.
E. Chan et al., "User Elicitation on Single-hand Microgestures," Proceedings of the 2016 CHI Conference on Human Factors in Computing Systems, May 2016, pp. 3403-3414.
L. Chan et al., "CyclopsRing: Enabling Whole-Hand and Context-Aware Interactions Through a Fisheye Ring," Proceedings of the 28th Annual ACM Symposium on User Interface Software & Technology, Nov. 5, 2015, 8 pages.
L. Chan et al., "FingerPad: Private and Subtle Interaction Using Fingertips," Proceedings of the 26th Annual ACM Symposium on User Interface Software and Technology, Oct. 2013, 6 pages.
T. Chen et al., "EFRing: Enabling Thumb-to-Index-Finger Microgesture Interaction through Electric Field Sensing Using Single Smart Ring," Proceedings of the ACM on Interactive, Mobile, Wearable and Ubiquitous Technologies, Jan. 2023, vol. 6, No. 4, pp. 161:1-161:31.
J. Connolly et al., "IMU Sensor-Based Electronic Goniometric Glove for Clinical Finger Movement Analysis," IEEE Sensors Journal, vol. 18, No. 3, Feb. 1, 2018, 8 pages.
B.-F. Gheran et al., "Gestures for Smart Rings: Empirical Results, Insights, and Design Implications," Proceedings of the 2018 Designing Interactive Systems Conference, Jun. 2018, pp. 623-635.
O. Glauser et al., "Interactive Hand Pose Estimation using a Stretch-Sensing Soft Glove," ACM Transactions on Graphics (TOG), vol. 38, No. 4, Jul. 2019, 15 pages.
J. Gong et al., "Pyro: Thumb-Tip Gesture Recognition Using Pyroelectric Infrared Sensing," Proceedings of the 30th Annual ACM Symposium on User Interface Software and Technology, Oct. 2017, pp. 553-563.

Y. Gu et al., "QwertyRing: Text Entry on Physical Surfaces Using a Ring," Proceedings of the ACM on Interactive, Mobile, Wearable and Ubiquitous Technologies, vol. 4, No. 4, Aug. 2020, pp. 128:1-128:29.
J. Gummeson et al., "An Energy Harvesting Wearable Ring Platform for Gesture Input on Surfaces," Proceedings of the 12th Annual International Conference on Mobile systems, Applications, and Services, Jun. 2014, 14 pages.
A. Handa et al., "DexPilot: Vision Based Teleoperation of Dexterous Robotic Hand-Arm System," arXiv:1910.03135v2, Oct. 14, 2019, 18 pages.
Y. Jian et al., "HandAvatar: Embodying Non-Humanoid Virtual Avatars through Hands," Proceedings of the 2023 CHI Conference on Human Factors in Computing Systems, Apr. 2023, 17 pages.
L. Jing et al., "Magic Ring: A Self-contained Gesture Input Device on Finger," Proceedings of the 12th International Conference on Mobile and Ubiquitous Multimedia, Dec. 2013, 4 pages.
W. Kienzle et al., "ElectroRing: Subtle Pinch and Touch Detection with a Ring," Proceedings of the 2021 CHI Conference on Human Factors in Computing Systems, May 2021, 12 pages.
Meta, "This is Meta Quest," https://www.meta.com/quest/, Accessed Oct. 22, 2024, 17 pages.
S. Nanayakkara et al., "EyeRing: A Finger-Worn Input Device for Seamless Interactions with our Surroundings," Proceedings of the 4th Augmented Human International Conference, Mar. 2013, 8 pages.
V. Nguyen et al., "HandSense: Capacitive coupling-based Dynamic, Micro Finger Gesture Recognition," Proceedings of the 17th Conference on Embedded Networked Sensor Systems, Nov. 2019, 13 pages.
S. Nirjon et al., "TypingRing: A Wearable Ring Platform for Text Input," Proceedings of the 13th Annual International Conference on Mobile Systems, Applications, and Services, Mar. 2015, 14 pages.
M. Ogata et al., "iRing: Intelligent Ring Using Infrared Reflection," Proceedings of the 25th Annual ACM Symposium on User Interface Software and Technology, Oct. 2012, pp. 131-136.
Oura Health Oy, "Oura Ring," https://ouraring.com, Accessed Oct. 23, 2024, 7 pages.
S. Pei et al., "Hand Interfaces: Using Hands to Imitate Objects in AR/VR for Expressive Interactions," Proceedings of the 2022 CHI Conference on Human Factors in Computing Systems, Apr. 2022, 16 pages.
M. Poongodi et al., "Diagnosis and Combating COVID-19 Using Wearable Oura Smart Ring with Deep Learning Methods," Personal and Ubiquitous Computing, Mar. 2021, 12 pages.
F. Chen et al., "Audio Privacy: Reducing Speech Intelligibility while Preserving Environmental Sounds," Proceedings of the 16th ACM international conference on Multimedia, Oct. 2008, pp. 733-736.
Analog Devices, Inc. "MAX78002 Evaluation Kit," https://www.analog.com/media/en/technical-documentation/data-sheets/MAX78002EVKIT.pdf, May 2022, 18 pages.
H. Duan et al., "Revisiting Skeleton-based Action Recognition," IEEE/CVF Conference on Computer Vision and Pattern Recognition (CVPR), Jun. 2022, pp. 2969-2978.
P. F. Edemekong et al., "Activities of Daily Living," StatPearls, https://digitalcollections.dordt.edu/faculty_work/1222, Jun. 26, 2020, 12 pages.
Y. A. Farha et al., "MS-TCN: Multi-Stage Temporal Convolutional Network for Action Segmentation," IEEE/CVF Conference on Computer Vision and Pattern Recognition (CVPR), Jun. 2019, pp. 3575-3584.
J. Froehlich et al., "HydroSense: Infrastructure-Mediated Single-Point Sensing of Whole-Home Water Activity," Proceedings of the 11th International Conference on Ubiquitous Computing, Sep. 2009, pp. 235-244.
C. Qian et al., "Realtime and Robust Hand Tracking from Depth," Proceedings of the IEEE Conference on Computer Vision and Pattern Recognition, Jun. 2014, 8 pages.
Ringly, "Ringly, Smart Jewelry and Accessories," https://ringly.com/, Accessed Oct. 23, 2024, 3 pages.
McLEAR Ltd., "RingPay—McLEAR," https://mclear.com/product/payment-ring/., Accessed Oct. 23, 2024, 7 pages.

(56) References Cited

OTHER PUBLICATIONS

J. Romero et al., "Embodied Hands: Modeling and Capturing Hands and Bodies Together," ACM Transactions on Graphics, arXiv:2201.02610v1, Jan. 7, 2022, 19 pages.
S. Sen et al., "VibeRing: Using Vibrations from a Smart Ring as an Out-of-band Channel for Sharing Secret Keys," Pervasive and Mobile Computing, https://www.sciencedirect.com/science/article/pii/S1574119221001309, Dec. 2021, 37 pages.
A. Sharma et al., "SparseIMU: Computational Design of Sparse IMU Layouts for Sensing Fine-Grained Finger Microgestures," ACM Transactions on Computer-Human Interaction, vol. 30, No. 3, Jun. 2023, pp. 39:1-39:40.
T. Starner et al., "The Gesture Pendant: A Self-illuminating, Wearable, Infrared Computer Vision System for Home Automation Control and Medical Monitoring," Fourth International Symposium on Wearable Computers, Oct. 2000, 8 pages.
D. J. Sturman et al., "A Survey of Glove-based Input," IEEE Computer Graphics and Applications, Jan. 1994, pp. 30-39.
R.-D. Vatavu, "iFAD Gestures: Understanding Users' Gesture Input Performance with Index-Finger Augmentation Devices," Proceedings of the 2023 CHI Conference on Human Factors in Computing Systems, Apr. 2023, 17 pages.
Vicon Motion Systems Ltd., "Award Winning Motion Capture Systems," https://www.vicon.com/, Accessed Oct. 23, 2024, 4 pages.
A. Wang et al., "MilliSonic: Pushing the Limits of Acoustic Motion Tracking," arXiv: 1901.06601v1, Jan. 20, 2019, 11 pages.
S. Wange et al., "Interacting with Soli: Exploring Fine-Grained Dynamic Gesture Recognition in the Radio-Frequency Spectrum," Proceedings of the 29th Annual Symposium on User Interface Software and Technology, Oct. 2016, pp. 851-860.
K. Yatani et al., "BodyScope: A Wearable Acoustic Sensor for Activity Recognition," Proceedings of the 2012 ACM Conference on Ubiquitous Computing, Sep. 2012, pp. 341-350.
B. Zhang et al., "A Ring-Shaped Interactive Device for Large Remote Display and Mobile Device Control," Proceedings of the 13th International Conference on Ubiquitous Computing, Sep. 2011, 2 pages.
Amazon, "SanDisk 32GB Extreme for Mobile Gaming microSD UHS-I Card—C10, U3, V30, 4K, A1, Micro SD—SDSQXAF-032G-GN6GN," https://www.amazon.com/SanDisk-Extreme-Mobile-Gaming-microSD/dp/B089M5KV4Y/2C66&sr=8-1&th=1, Accessed Oct. 30, 2024, 9 pages.
C. A. Kardous et al., "So How Accurate Are These Smartphone Sound Measurement Apps?" https://blogs.cdc.gov/niosh-science-blog/2014/04/09/sound-apps, Apr. 9, 2014, 19 pages.
Android Developers, "Profile Your App Performance," https://developer.android.com/studio/profile, Acessed Oct. 30, 2024, 5 pages.
Humane, "Ai Pin," https://humane.com/, Accessed Oct. 30, 2024, 23 pages.
D. Kimm et al., "Hand Speed Measurements in Boxing," Procedia Engineering, vol. 112, Sep. 2015, pp. 502-506.
H. Lim et al., "C-Auth: Exploring the Feasibility of Using Egocentric View of Face Contour for User Authentication on Glasses," Proceedings of the 2023 ACM International Symposium on Wearable Computers, Oct. 2023, pp. 6-10.
M. Loper et al., "SMPL: A Skinned Multi-Person," ACM Transactions on Graphics (TOG), Oct. 2015, 16 pages.
Maxim Integrated, "MAX98357A/ MAX98357B Tiny, Low-Cost, PCM Class D Amplifier with Class AB Performance," https://www.analog.com/media/en/technical-documentation/data-sheets/MAX98357A-MAX98357B.pdf, Jul. 2019, 38 pages.
Nordic Semiconductor, "nRF52840 Multiprotocol Bluetooth 5.4 SoC supporting Bluetooth Low Energy, Bluetooth mesh, NFC, Thread and Zigbee," https://www.nordicsemi.com/products/nrf52840, Accessed Oct. 30, 2024, 2 pages.
SG Wireless, "SGW111X BLE Modules," http://www.sgwireless.com, Accessed Oct. 30, 2024, 2 pages.
J. Shin et al., "MyDJ: Sensing Food Intakes with an Attachable on Your Eyeglass Frame," Proceedings of the 2022 CHI Conference on Human Factors in Computing Systems, Apr. 2022, 17 pages.
R. Sun et al., "EchoNose: Sensing Mouth, Breathing and Tongue Gestures inside Oral Cavity using a Non-contact Nose Interface," Proceedings of the 2023 ACM International Symposium on Wearable Computers, Oct. 2023, pp. 22-26.
W. Sun et al., "TeethTap: Recognizing Discrete Teeth Gestures Using Motion and Acoustic Sensing on an Earpiece," 26th International Conference on Intelligent User Interfaces, arXiv:2102.12548v1, Feb. 24, 2021, 16 pages.
W.-J. Yan et al., "How Fast are the Leaked Facial Expressions: The Duration of Micro-Expressions," Journal of Nonverbal Behavior, vol. 37, Jul. 16, 2013, pp. 217-230.
R. Zhang et al., "Monitoring Chewing and Eating in Free-Living Using Smart Eyeglasses," IEEE Journal of Biomedical and Health Informatics, vol. 22, No. 1, Jan. 2018, pp. 23-32.
R. Zhang et al., "Free-living Eating Event Spotting using EMG-monitoring Eyeglasses," IEEE EMBS International Conference on Biomedical & Health Informatics, Mar. 2018, pp. 128-132.
S. Zhang et al., "I Am an Earphone and I Can Hear My User's Face: Facial Landmark Tracking Using Smart Earphones," ACM Transactions on Internet of Things, Dec. 2023, 28 pages.
T. Denning et al., "In Situ with Bystanders of Augmented Reality Glasses: Perspectives on Recording and Privacy-Mediating Technologies," Proceedings of the SIGCHI Conference on Human Factors in Computing Systems, Apr. 2014, 10 pages.
J. H. Huh et al., "WristAcoustic: Through-Wrist Acoustic Response Based Authentication for Smartwatches," Proceedings of the ACM on Interactive, Mobile, Wearable and Ubiquitous Technologies, vol. 6, No. 4, Jan. 2023, pp. 167:1-167:34.
J. Kim et al., "SonarID: Using Sonar to Identify Fingers on a Smartwatch," Proceedings of the 2022 CHI Conference on Human Factors in Computing Systems, Apr. 2022, 10 pages.
O. Kudina et al., "Ethics from Within: Google Glass, the Collingridge Dilemma, and the Mediated Value of Privacy," Science, Technology, & Human Values, vol. 44, No. 2, Aug. 21, 2018, pp. 291-314.
G. Laput et al., "Acoustruments: Passive, Acoustically-Driven, Interactive Controls for Handheld Devices," ACM SIGGRAPH 2015 Emerging Technologies, Jul. 2015, 10 pages.
D. Li et al., "Room-scale Hand Gesture Recognition Using Smart Speakers," Proceedings of the 20th ACM Conference on Embedded Networked Sensor Systems, Nov. 2022, 14 pages.
J. O'Hagan et al., "Privacy-Enhancing Technology and Everyday Augmented Reality: Understanding Bystanders' Varying Needs for Awareness and Consent," Proceedings of the ACM on Interactive, Mobile, Wearable and Ubiquitous Technologies, vol. 6, No. 4, Jan. 2023, 35 pages.
M. Ono et al., "Touch & Activate: Adding Interactivity to Existing Objects Using Active Acoustic Sensing," Proceedings of the 26th Annual ACM Symposium on User Interface Software and Technology, Oct. 2013, pp. 31-40.
Y. Gao et al., "EarEcho: Using Ear Canal Echo for Wearable Authentication," Proceedings of the ACM on Interactive, Mobile, Wearable and Ubiquitous Technologies, vol. 3, No. 3, Sep. 2019, pp. 81:1-81:24.
A. Hayashida et al., "Estimation of Room Temperature Based on Acoustic Frequency Response," Acoustical Science and Technology, vol. 41, No. 4, Jul. 2020, pp. 693-696.
D. Kim et al., "Pantoenna: Mouth Pose Estimation for VR/AR Headsets Using Low-Profile Antenna and Impedance Characteristic Sensing," Proceedings of the 36th Annual ACM Symposium on User Interface Software and Technology, Oct.-Nov. 2023, 12 pages.
Gras Sound & Vibration, "What are Microphone Environmental Coefficients?" https://www.grasacoustics.com/blog/working-with-environmental-coefficients, Jun. 29, 2022, 8 pages.
Xreal, Inc., "Air 2 Ultra," https://developer.xreal.com/?lang=en, Accessed Oct. 30, 2024, 20 pages.
C. Xu et al., "Finger-writing with Smartwatch: A Case for Finger and Hand Gesture Recognition using Smartwatch," Proceedings of the 16th International Workshop on Mobile Computing Systems and Applications, Feb. 2015, pp. 9-14.

(56) References Cited

OTHER PUBLICATIONS

C. Zhang et al., "FingerPing: Recognizing Fine-grained Hand Poses using Active Acoustic On-body Sensing," Proceedings of the 2018 CHI Conference on Human Factors in Computing Systems, Apr. 2018, 10 pages.

Y. Ji et al., "Updating the Silent Speech Challenge Benchmark with Deep Learning," Speech Communication, Sep. 2017, 25 pages.

D. Verma et al., "ExpressEar: Sensing Fine-Grained Facial Expressions with Earables," Proceedings of the ACM on Interactive, Mobile, Wearable and Ubiquitous Technologies, vol. 5, No. 3, Sep. 2021, pp. 129:1-129:28.

L. Liu et al., "Deep Learning for Generic Object Detection: A Survey," International Journal of Computer Vision, Oct. 31, 2019, 58 pages.

W. Liu et al., "A Survey of Deep Neural Network Architectures and Their Applications," Neurocomputing, Authors Manuscript, Nov. 2016, 31 pages.

S. Minaee et al., "Image Segmentation Using Deep Learning: A Survey," arXiv:2001.05566v5, Nov. 15, 2020, 22 pages.

Y. Nakajima et al., "Non-audible Murmur Recognition," 8th European Conference on Speech Communication and Technology, Sep. 2003, pp. 220-223.

Y. Nakajima et al., "Non-audible Murmur Recognition Input Interface Using Stethoscopic Microphone Attached to the Skin," IEEE International Conference on Acoustics, Speech, and Signal Processing, Apr. 2003, pp. 127-130.

O. R. Nasir et al., "Text2FaceGAN: Face Generation from Fine Grained Textual Descriptions," arXiv:1911.11378v1, Nov. 26, 2019, 10 pages.

N. Otsu, "A Threshold Selection Method from Gray-Level Histograms," IEEE Transactions on Systems, Man, and Cybernetics, vol. SMC-9, No. 1, Jan. 1979, pp. 62-66.

A. Porbadnigk et al., "EEG-Based Speech Recognition Impact of Temporal Effects," Proceedings of the International Conference on Bio-inspired Systems and Signal Processing, Jan. 2009, pp. 376-381.

B. Shi et al., "An End-to-End Trainable Neural Network for Image-based Sequence Recognition and Its Application to Scene Text Recognition," arXiv:1507.05717v1, Jul. 21, 2015, 9 pages.

K. Simonyan et al., "Very Deep Convolutional Networks for Large-Scale Image Recognition," arXiv:1409.1556v6, Apr. 10, 2015, 14 pages.

T. Stamer, "The Challenges of Wearable Computing: Part 1," IEEE Micro, vol. 21, No. 4, Jul.-Aug. 2001, pp. 44-52.

Y. Tanaka et al., "Long-Term Histological Comparison Between Near-Infrared Irradiated Skin and Scar Tissues," Clinical, Cosmetic and Investigational Dermatology, vol. 3, Nov. 25, 2010, pp. 143-149.

G. Tian et al., "Audio2face: Generating Speech/Face Animation from Single Audio With Attention-Based Bidirectional LSTM Networks," arXiv: 1905.11142v1, May 27, 2019, 6 pages.

A. Wunsch et al., "A Controlled Trial to Determine the Efficacy of Red and Near-Infrared Light Treatment in Patient Satisfaction, Reduction of Fine Lines, Wrinkles, Skin Roughness, and Intradermal Collagen Density Increase," Photomedicine and Laser Surgery, vol. 32, No. 2, Feb. 2014, pp. 93-100.

W. Yin et al., "Comparative Study of CNN and RNN for Natural Language Processing," arXiv:1702.01923v1, Feb. 7, 2017, 7 pages.

S. Shen et al., "I am a Smartwatch and I Can Track My User's Arm," In Proceedings of the 14th Annual International Conference on Mobile Systems, Applications, And Services, Jun. 25-30, 2016, pp. 85-96.

S. Oney et al., "ZoomBoard: A Diminutive QWERTY Soft Keyboard Using Iterative Zooming for Ultra-Small Devices," Proceedings of the SIGCHI Conference on Human Factors in Computing Systems, Apr. 2013, pp. 2799-2802.

T. S. Saponas et al., "Enabling Always-Available Input with Muscle-Computer Interfaces," Proceedings of the 22nd Annual ACM Symposium on User Interface Software and Technology, Oct. 2009, pp. 167-176.

X. Zhou et al., "Sparseness Meets Deepness: 3D Human Pose Estimation from Monocular Video," IEEE Conference on Computer Vision and Pattern Recognition (CVPR), Jun. 2016, pp. 4966-4975.

D. Way et al., "A Usability User Study Concerning Free-Hand Microgesture and Wrist-Worn Sensors," 11th International Conference on Wearable and Implantable Body Sensor Networks, Jun. 16, 2014, pp. 138-142.

H. Wen et al., "Serendipity: Finger Gesture Recognition using an Off-the-Shelf Smartwatch," Proceedings of the 2016 CHI Conference on Human Factors in Computing Systems, May 7, 2016, pp. 3847-3851.

T. Von Marcard et al., "Sparse Inertial Poser: Automatic 3D Human Pose Estimation from Sparse IMUs," Eurographics, vol. 36, No. 2, May 2017, pp. 349-360.

S.-E. Wei et al., "Convolutional Pose Machines," IEEE Conference on Computer Vision and Pattern Recognition, Jun. 2016, pp. 4724-4732.

Y. Zhang et al., "Skin Track: Using the Body as an Electrical Waveguide for Continuous Finger Tracking on the Skin," Proceedings of the 2016 CHI Conference on Human Factors in Computing Systems, May 2016, pp. 1491-1503.

I. Akhter et al., "Pose-Conditioned Joint Angle Limits for 3D Human Pose Reconstruction," IEEE Conference on Computer Vision and Pattern Recognition, 2015, pp. 1446-1455.

O. Amft et al., "Detection of Eating and Drinking Arm Gestures Using Inertial Body-Worn Sensors," IEEE International Symposium on Wearable Computers, Oct. 2005, pp. 160-163.

O. Amft et al., "Analysis of Chewing Sounds for Dietary Monitoring," Proceedings of the 7th International Conference on Ubiquitous Computing, Sep. 2005, pp. 56-72.

M. Andriluka et al., "Pictorial Structures Revisited: People Detection and Articulated Pose Estimation," IEEE Conference on Computer Vision and Pattern Recognition, Jun. 2009, pp. 1014-1021.

A. Bedri et al., "FitByte: Automatic Diet Monitoring in Unconstrained Situations Using Multimodal Sensing on Eyeglasses," Proceedings of the 2020 CHI Conference on Human Factors in Computing Systems, Apr. 2020, 12 pages.

A. Bedri et al., "EarBit: Using Wearable Sensors to Detect Eating Episodes in Unconstrained Environments," Proceedings of the ACM on Interactive, Mobile, Wearable and Ubiquitous Technologies, vol. 1, No. 3, Sep. 2017, 20 pages.

A. Bedri et al., "Detecting Mastication: A Wearable Approach," Proceedings of the 2015 ACM on International Conference on Multimodal Interaction, Nov. 2015, pp. 247-250.

A. Bedri et al., "A Wearable System for Detecting Eating Activities with Proximity Sensors in the Outer Ear," Proceedings of the 2015 ACM International Symposium on Wearable Computers, Sep. 7-11, 2015, pp. 91-92.

S. Bi et al., "Auracle: Detecting Eating Episodes with an Ear-mounted Sensor," Proceedings of the ACM on Interactive, Mobile, Wearable and Ubiquitous Technologies, vol. 2, No. 3, Sep. 2018, 27 pages.

W. Wei et al., "Real-Time 3D Arm Motion Tracking Using the 6-Axis IMU Sensor of a Smartwatch," 17th International Conference on Wearable and Implantable Body Sensor Networks, Jul. 2021,4 pages.

F. Bogo et al., "Keep it SMPL: Automatic Estimation of 3D Human Pose and Shape from a Single Image," arXiv:1607.08128v1, Jul. 27, 2016, 18 pages.

L. Xie et al., "Data-driven Motion Estimation with Low-Cost Sensors," 5th International Conference on Visual Information Engineering, Jul. 2008, 6 pages.

X. Chen et al., "Articulated Pose Estimation by a Graphical Model with Image Dependent Pairwise Relations," arXiv:1407.3399v2, Nov. 4, 2014, 9 pages.

J. Chung et al., "A Glasses-type Wearable Device for Monitoring the Patterns of Food Intake and Facial Activity," Scientific Reports, vol. 7, No. 41690, Jan. 30, 2017, 8 pages.

E. Cippitelli et al., "A Human Activity Recognition System Using Skeleton Data from RGBD Sensors," Computational Intelligence and Neuroscience, Mar. 2016, 14 pages.

F. Cordeiro et al., "Barriers and Negative Nudges: Exploring Challenges in Food Journaling," Proceedings of the 33rd Annual

(56) References Cited

OTHER PUBLICATIONS

ACM Conference on Human Factors in Computing Systems, Authors Manuscript, Feb. 16, 2016, 8 pages.

Y. Dong et al., "Detecting Periods of Eating During Free-Living by Tracking Wrist Motion," IEEE Journal of Biomedical and Health Informatics, vol. 18, No. 4, Jul. 2014, pp. 1253-1260.

M. Farooq et al., "Segmentation and Characterization of Chewing Bouts by Monitoring Temporalis Muscle Using Smart Glasses with Piezoelectric Sensor," IEEE Journal of Biomedical and Health Informatics, Authors Manuscript, Nov. 1, 2018, 24 pages.

N. Fawaz et al., "Deep Learning for Time Series Classification: A Review," arXiv:1809.04356v4, May 14, 2019, 44 pages.

A. Filippeschi et al., "Survey of Motion Tracking Methods Based on Inertial Sensors: A Focus on Upper Limb Human Motion," Sensors, vol. 17, No. 6, Jun. 2017, 40 pages.

K. He et al., "Mask R-CNN," arXiv:1703.06870v3, Jan. 24, 2018, 12 pages.

H. Junker et al., "Gesture Spotting with Body-Worn Inertial Sensors to Detect User Activities," Pattern Recognition vol. 41, 2008, pp. 2010-2024.

K. Kyritsis et al., "End-to-end Learning for Measuring in-meal Eating Behavior from a Smartwatch," 40th Annual International Conference of the IEEE Engineering in Medicine and Biology Society, Oct. 2018, 4 pages.

K. Kyritsis et al., "Modeling Wrist Micromovements to Measure In-Meal Eating Behavior from Inertial Sensor Data," IEEE Journal of Biomedical and Health Informatics, Jan. 2019, 11 pages.

Y. Liu et al., "Real-time Arm Skeleton Tracking and Gesture Inference Tolerant to Missing Wearable Sensors," Proceedings of the 17th Annual International Conference on Mobile Systems, Applications, and Services, Jun. 2019, pp. 287-299.

Y. Y. Luktuke et al., "Segmentation and Recognition of Eating Gestures from Wrist Motion using Deep Learning," 2020 IEEE International Conference on Big Data, Dec. 2020, pp. 1368-1373.

D. Mehta et al., "Single-Shot Multi-Person 3D Pose Estimation From Monocular RGB," arXiv: 1712.03453v3, Aug. 28, 2018, 16 pages.

D. Mehta et al., "VNect: Real-time 3D Human Pose Estimation with a Single RGB Camera," arXiv:1705.01583v1, May 3, 2017, 13 pages.

M. Mirtchouk et al., "Recognizing Eating from Body-Worn Sensors: Combining Free-Living and Laboratory Data," Proceedings of the ACM on Interactive, Mobile, Wearable and Ubiquitous Technologies, vol. 1, No. 3, Article 85, Sep. 2017, 20 pages.

M. Mirtchouk et al., "Automated Estimation of Food Type from Body-worn Audio and Motion Sensors in Free-Living Environments," Proceedings of Machine Learning Research, vol. 106, Aug. 1, 2019, 21 pages.

M. Mirtchouk et al., "Automated Estimation of Food Type and Amount Consumed from Body-Worn Audio and Motion Sensors," In Proceedings of the 2016 ACM International Joint Conference on Pervasive and Ubiquitous Computing, Sep. 12-16, 2016, pp. 451-462.

M. B. Morshed et al., "A Real-Time Eating Detection System for Capturing Eating Moments and Triggering Ecological Momentary Assessments to Obtain Further Context: System Development and Validation Study," JMIR Mhealth Uhealth, vol. 8, No. 12, Dec. 2020, 15 pages.

K. Murakami et al., "Eating Frequency Is Positively Associated with Overweight and Central Obesity in US Adults," The Journal of Nutrition, Dec. 1, 2015, 10 pages.

A. Newell et al., "Stacked Hourglass Networks for Human Pose Estimation," arXiv:1603.06937v2, Jul. 26, 2016, 17 pages.

J. C. Núñez et al., "Convolutional Neural Networks and Long Short-Term Memory for Skeleton-Based Human Activity and Hand Gesture Recognition," Pattern Recognition, vol. 76, Apr. 2018, pp. 80-94.

L. Piyathilaka et al., "Gaussian Mixture Based HMM for Human Daily Activity Recognition Using 3D Skeleton Features," IEEE 8th Conference on Industrial Electronics and Applications, Jul. 2013, pp. 567-572.

S. A. Rahman et al., "Unintrusive Eating Recognition Using Google Glass," In 9th International Conference on Pervasive Computing Technologies for Healthcare, 2015, pp. 108-111.

R. I. Ramos-Garcia et al., "Improving the Recognition of Eating Gestures Using Intergesture Sequential Dependencies," IEEE Journal of Biomedical and Health Informatics, vol. 19, No. 3, May 2015, pp. 825-831.

J. L. Scisco et al., "Examining the Utility of a Bite-Count-Based Measure of Eating Activity in Free-Living Human Beings," Journal of the Academy of Nutrition and Dietetics, Sep. 3, 2013, 6 pages.

S. Sharma et al., "Automatic Detection of Periods of Eating Using Wrist Motion Tracking," IEEE First Conference on Connected Health: Applications, Systems and Engineering Technologies, Jun. 2016, pp. 362-363.

S. Sharma et al., "The Impact of Walking and Resting on Wrist Motion for Automated Detection of Meals," ACM Transactions on Computing for Healthcare, vol. 1, No. 4, Sep. 2020, pp. 24:1-24:19.

A. Toshev et al., "DeepPose: Human Pose Estimation via Deep Neural Networks," arXiv:1312.4659v3, Aug. 20, 2014, 9 pages.

S. Raurale et al., "EMG Acquisition and Hand Pose Classification for Bionic Hands from Randomly-Placed Sensors," IEEE International Conference on Acoustics, Speech and Signal Processing (ICASSP), Apr. 2018, 5 pages.

J. Rekimoto, "GestureWrist and GesturePad: UnobtrusiveWearable Interaction Devices," Proceedings Fifth International Symposium on Wearable Computers, Oct. 2001, 7 pages.

M. Rohrbach et al., "A Database for Fine Grained Activity Detection of Cooking Activities," IEEE Conference on Computer Vision and Pattern Recognition, Jun. 2012, 8 pages.

J. C. R. Rudolph et al., "Sensing Hand Interactions with Everyday Objects by Profiling Wrist Topography," Proceedings of the Sixteenth International Conference on Tangible, Embedded, and Embodied Interaction, Feb. 2022, 14 pages.

A. De Silva et al., "Real-Time Hand Gesture Recognition Using Temporal Muscle Activation Maps of Multi-Channel sEMG Signals," arXiv:2002.03159v1, Feb. 8, 2020, 5 pages.

I. Sosin et al., "Continuous Gesture Recognition from sEMG Sensor Data with Recurrent Neural Networks and Adversarial Domain Adaptation," arXiv:2012.08816v1, Dec. 16, 2020, 6 pages.

W. Sun et al., "ThumbTrak: Recognizing Micro-finger Poses Using a Ring with Proximity Sensing," arXiv:2105.14680v2, Dec. 23, 2021, 16 pages.

H. Truong et al., "DEMO: Low-Power Capacitive Sensing Wristband for Hand Gesture Recognition," Proceedings of the 9th ACM Workshop on Wireless of the Students, by the Students, and for the Students, Oct. 2017, p. 21.

H. Truong et al., "Capacitive Sensing 3D-printed Wristband for Enriched Hand Gesture Recognition," Proceedings of the 2017 Workshop on Wearable Systems and Applications, Jun. 2017, 5 pages.

H. Truong et al., "CapBand: Battery-Free Successive Capacitance Sensing Wristband for Hand Gesture Recognition," Proceedings of the 16th ACM Conference on Embedded Networked Sensor Systems, Nov. 2018, pp. 54-67.

H.-R. Tsai et al., "ThumbRing: Private Interactions Using One-Handed Thumb Motion Input on Finger Segments," Proceedings of the 18th International Conference on Human-Computer Interaction with Mobile Devices and Services Adjunct, Sep. 2016, 8 pages.

Ultraleap, "The World's Most Advanced Hand Tracking," https://www.ultraleap.com/tracking/, Accessed Oct. 7, 2024, 7 pages.

A. Waghmare et al., "Z-Ring: Single-Point Bio-Impedance Sensing for Gesture, Touch, Object and User Recognition," Proceedings of the 2023 CHI Conference on Human Factors in Computing Systems, Apr. 2023, 18 pages.

E. Wu et al., "Back-Hand-Pose: 3D Hand Pose Estimation for a Wrist-Worn Camera via Dorsum Deformation Network," Proceedings of the 33rd Annual ACM Symposium on User Interface Software and Technology, Oct. 2020, pp. 1147-1160.

(56) References Cited

OTHER PUBLICATIONS

X. Xu et al., "Enabling Hand Gesture Customization on Wrist-Worn Devices," Proceedings of the 2022 CHI Conference on Human Factors in Computing Systems, Apr. 2022, 19 pages.
Yeo et al., "Opisthenar: Hand Poses and Finger Tapping Recognition by Observing Back of Hand Using Embedded Wrist Camera," UIST'19, Association of Computing Machinery, Oct. 20-23, 2019, pp. 963-971.
Y. Zhang et al., "Tomo: Wearable, Low-Cost Electrical Impedance Tomography for Hand Gesture Recognition," Proceedings of the 28th Annual ACM Symposium on User Interface Software & Technology, Nov. 5, 2015, pp. 167-173.
Y. Zhang et al., "Advancing Hand Gesture Recognition with High Resolution Electrical Impedance Tomography," Proceedings of the 29th Annual Symposium on User Interface Software and Technology, Oct. 2016, pp. 843-850.
H. Zhou et al., "Learning on the Rings: Self-Supervised 3D Finger Motion Tracking Using Wearable Sensors," Proceedings of the ACM on Interactive, Mobile, Wearable and Ubiquitous Technologies, vol. 6, No. 2, Jun. 2022, pp. 90:1-90:31.
L. Zhou et al., "Towards Automatic Learning of Procedures From Web Instructional Videos," The Thirty-Second AAAI Conference on Artificial Intelligence, Feb. 2018, pp. 7590-7598.
C. Zimmermann et al., "Learning to Estimate 3D Hand Pose from Single RGB Images," Proceedings of the IEEE International Conference on Computer Vision, Oct. 2017, pp. 4903-4911.
R.-D. Vatavu et al., "GestuRING: A Web-based Tool for Designing Gesture Input with Rings, Ring-Like, and Ring-Ready Devices," The 34th Annual ACM Symposium on User Interface Software and Technology, Oct. 2021, pp. 710-723.
A. Bedri et al., "Toward Silent-Speech Control of Consumer Wearables," Computer, vol. 48, No. 10, Oct. 2015, pp. 54-62.
L. A. Cheah et al., "A Wearable Silent Speech Interface based on Magnetic Sensors with Motion-Artefact Removal," 11th International Conference on Biomedical Electronics and Devices, Jan. 2018, pp. 56-62.
Bose, "QuietComfort 45 Noise Cancelling Smart Headphones," https://www.bose.com/pxp/bose-quietcomfort-45-headphones?srsltid=AfmBOopTn36boc58vSfai3X5lsoxGJnZO4zTa5tzKMcTldXaj_EZY2bh, Accessed Oct. 7, 2024, 16 pages.
T. G. Csapo et al., "DNN-Based Ultrasound-to-Speech Conversion for a Silent Speech Interface," Interspeech, Aug. 2017, pp. 3672-3676.
B. Denby et al., "Prospects for a Silent Speech Interface using Ultrasound Imaging," IEEE International Conference on Acoustics Speech and Signal Processing Proceedings, May 2006, 4 pages.
J. A. Gonzalez et al., "Direct Speech Reconstruction From Articulatory Sensor Data by Machine Learning," IEEE/ACM Transactions on Audio, Speech, and Language Processing, Dec. 2017, 13 pages.
R. Hofe et al., "Small-vocabulary Speech Recognition using a Silent Speech Interface Based on Magnetic Sensing," Speech Communication, vol. Feb. 1, 555, 2012, pp. 22-32.
C. Q. Howard et al., "A Review of Current Ultrasound Exposure Limits," The Journal of Occupational Health and Safety of Australia and New Zealand, Sep. 8, 2004, 9 pages.
Adesso, "Xtream G1 Stereo Gaming Headset with Microphone," https://www.adesso.com/products/stereo-gaming-headphones-with-microphone/, Datasheet, Accessed Oct. 7, 2024, 1 page.
Razer Inc., "Razer Kraken," https://www.razer.com/gaming-headsets/razer-kraken-v3, Accessed Oct. 7, 2024, 9 pages.
E. M. Juanpere et al., "Ultrasound-Based Silent Speech Interface Using Convolutional and Recurrent Neural Networks," vol. 105, Acta Acustica United with Acustica, Jul. 3, 2019, pp. 587-590.
A. Kapur et al., "AlterEgo: A Personalized Wearable Silent Speech Interface," International Conference on Intelligent User Interfaces, Mar. 2018, pp. 43-53.
A. Kapur et al., "Non-Invasive Silent Speech Recognition in Multiple Sclerosis with Dysphonia," Proceedings of Machine Learning Research, vol. 116, Dec. 2019, pp. 25-38.
M. Kim et al., "Speaker-Independent Silent Speech Recognition from Flesh-Point Articulatory Movements Using an LSTM Neural Network," IEEE/ACM Transactions on Audio, Speech, and Language Processing, vol. 25, No. 12, Dec. 2017, 32 pages.
M. Kim et al., "Preliminary Test of a Wireless Magnetic Tongue Tracking System for Silent Speech Interface," IEEE Biomedical Circuits and Systems Conference (BioCAS), Oct. 2018, 4 pages.
N. Kimura et al., "Mobile, Hands-Free, Silent Speech Texting Using SilentSpeller," Extended Abstracts of the 2021 CHI Conference on Human Factors in Computing Systems, May 2021, 4 pages.
N. Kimura et al., "SilentSpeller: Towards Mobile, Hands-Free, Silent Speech Text Entry Using Electropalatography," Proceedings of the 2022 CHI Conference on Human Factors in Computing Systems, Apr. 2022, 19 pages.
N. Kimura et al., "SottoVoce: An Ultrasound Imaging-Based Silent Speech Interaction Using Deep Neural Networks," arXiv:2303.01758v1, Mar. 3, 2023, 10 pages.
R. Li et al., "TongueBoard: An Oral Interface for Subtle Input," Proceedings of the 10th Augmented Human International Conference, Mar. 2019, 9 pages.
G. S. Meltzner et al., "Development of sEMG Sensors and Algorithms for Silent Speech Recognition," Journal of Neural Engineering—Author Manuscript, Aug. 2018, 23 pages.
H. Sahni et al., "The Tongue and Ear Interface: A Wearable System for Silent Speech Recognition," Proceedings of the 2014 ACM International Symposium on Wearable Computers, Sep. 2014, pp. 47-54.
T. Srivastava et al., "Mutelt: Jaw Motion Based Unvoiced Command Recognition Using Earable," Proceedings of the ACM on Interactive, Mobile, Wearable and Ubiquitous Technologies, vol. 6, No. 3, Sep. 2022, pp. 140:1-140:26.
L. Tóth et al., "Multi-Task Learning of Speech Recognition and Speech Synthesis Parameters for Ultrasound-based Silent Speech Interfaces," Interspeech 2018, Sep. 2018, pp. 3172-3176.
Y. Wang et al., "Silent Speech Decoding Using Spectrogram Features Based on Neuromuscular Activities," Brain Sciences, vol. 10, No. 7, Jul. 11, 2020, 14 pages.
R. Zhang et al., "SpeeChin: A Smart Necklace for Silent Speech Recognition," Proceedings of the ACM on Interactive, Mobile, Wearable and Ubiquitous Technologies, vol. 5, No. 4, Dec. 2021, p. 192:1-192:23.
Y. Zhang et al., "CELIP: Ultrasonic-based Lip Reading with Channel Estimation Approach for Virtual Reality Systems," Adjunct Proceedings of the 2021 ACM International Joint Conference on Pervasive and Ubiquitous Computing and Proceedings of the 2021 ACM International Symposium on Wearable Computers, Sep. 2021, p. 580-585.
A. Abedin et al., "Attend and Discriminate: Beyond the State-of-the-Art for Human Activity Recognition Using Wearable Sensors," arXiv:2007.07172v1, Jul. 14, 2020, 15 pages.
L. Bao et al., "Activity Recognition from User-Annotated Acceleration Data," International Conference on Pervasive Computing, Apr. 2004, 17 pages.
W. Price et al., "UnweaveNet: Unweaving Activity Stories," IEEE/CVF Conference on Computer Vision and Pattern Recognition (CVPR), Jun. 2022, pp. 13770-13779.
H. Qian et al., "A Novel Distribution-Embedded Neural Network for Sensor-Based Activity Recognition," Proceedings of the Twenty-Eighth International Joint Conference on Artificial Intelligence, Aug. 2019, 7 pages.
V. Radu et al., "Multimodal Deep Learning for Activity and Context Recognition," Proceedings of the ACM on Interactive, Mobile, Wearable and Ubiquitous Technologies, vol. 1, No. 4, Dec. 2017, pp. 157:1-157:27.
A. Saeed et al., "Federated Self-Supervised Learning of Multi-Sensor Representations for Embedded Intelligence," IEEE Internet of Things Journal, arXiv:2007.13018v1, Jul. 25, 2020, 11 pages.
M. Saquib Sarfraz et al., "Temporally-Weighted Hierarchical Clustering for Unsupervised Action Segmentation," IEEE/CVF Conference on Computer Vision and Pattern Recognition (CVPR), Jun. 2021, pp. 11225-11234.

(56) References Cited

OTHER PUBLICATIONS

R. R. Selvaraju et al., "Grad-CAM: Visual Explanations from Deep Networks via Gradient-based Localization," arXiv:1610.02391v4, Dec. 3, 2019, 23 pages.
N. Srivastava et al., "Dropout: A Simple Way to Prevent Neural Networks from Overfitting," Journal of Machine Learning Research, vol. 15, Jun. 2014, pp. 1929-1958.
D. Strömbäck et al., "MM-Fit: Multimodal Deep Learning for Automatic Exercise Logging across Sensing Devices," Proceedings of the ACM on Interactive, Mobile, Wearable and Ubiquitous Technologies, vol. 4, No. 4, Dec. 2020, pp. 168:1-168:22.
C. Tang et al., "Are Accelerometers for Activity Recognition a Dead-end?" arXiv:2001.08111v2, Jan. 30, 2020, 6 pages.
M. Tanjid Hasan Tonmoy et al., "Hierarchical Self Attention Based Autoencoder for Open-Set Human Activity Recognition," arXiv:2103.04279v1, Mar. 7, 2021, 12 pages.
Y. Vaizman et al., "Context Recognition In-the-Wild: Unified Model for Multi-Modal Sensors and Multi-Label Classification," Proceedings of the ACM on Interactive, Mobile, Wearable and Ubiquitous Technologies, vol. 1, No. 4, Dec. 2017, pp. 1:1-1:27.
T. Wang et al., "C-FMCW Based Contactless Respiration Detection Using Acoustic Signal," Proceedings of the ACM on Interactive, Mobile, Wearable and Ubiquitous Technologies, vol. 1, No. 4, Dec. 2017, pp. 170:1-170:20.
J. A. Ward et al., "Activity Recognition of Assembly Tasks Using Body-Worn Microphones and Accelerometers," IEEE Transactions on Pattern Analysis and Machine Intelligence, Mar. 20, 2006, Draft, 37 pages.
J. Wu et al., "Automatic Class Discovery and One-Shot Interactions for Acoustic Activity Recognition," Proceedings of the 2020 CHI Conference on Human Factors in Computing Systems, Apr. 2020, pp. 1-14.
B. Xu et al., "Empirical Evaluation of Rectified Activations in Convolution Network," arXiv:1505.00853v2, Nov. 27, 2015, 5 pages.
S. Yao et al., "SADeepSense: Self-Attention Deep Learning Framework for Heterogeneous On-Device Sensors in Internet of Things Applications," IEEE Conference on Computer Communications, May 2019, 9 pages.
C. Zhang et al., "FingerSound: Recognizing Unistroke Thumb Gestures Using a Ring," Proceedings of the ACM on Interactive, Mobile, Wearable and Ubiquitous Technologies, vol. 1, No. 3, Sep. 2017, pp. 120:1-120:19.
D. Zhang et al., "anucvml/vidat—Video Annotation Tool," https://github.com/anucvml/vidat, Accessed Jul. 25, 2024, 7 pages.
R. Zhang et al., "EatingTrak: Detecting Fine-grained Eating Moments in the Wild Using a Wrist-mounted IMU," Proceedings of the ACM on Human-Computer Interaction, vol. 6, No. MHCI, Sep. 2022, 22 pages.
Microsoft, "Kinect for Windows," https://learn.microsoft.com/en-us/windows/apps/design/devices/kinect-for-windows, Aug. 30, 2022, 4 pages.
K. Ahuja et al., "Vid2Doppler: Synthesizing Doppler Radar Data from Videos for Training Privacy-Preserving Activity Recognition," Proceedings of the 2021 CHI Conference on Human Factors in Computing Systems, May 7, 2021, 10 pages.
K. Ahuja et al., "Pose-on-the-Go: Approximating User Pose with Smartphone Sensor Fusion and Inverse Kinematics," Proceedings of the 2021 CHI Conference on Human Factors in Computing Systems, May 7, 2021, 12 pages.
K. Ahuja et al., "ControllerPose: Inside-Out Body Capture with VR Controller Cameras," Proceedings of the 2022 CHI Conference on Human Factors in Computing Systems, Apr. 2022, 13 pages.
T. Babic et al., "Simo: Interactions with Distant Displays by Smartphones with Simultaneous Face and World Tracking," Extended Abstracts of the 2020 CHI Conference on Human Factors in Computing Systems, Apr. 25, 2020, 12 pages.
Z. Cao et al., "Realtime Multi-Person 2D Pose Estimation using Part Affinity Fields," IEEE Conference on Computer Vision and Pattern Recognition (CVPR), Jul. 2017, pp. 7291-7299.
K. He et al., "Mask R-CNN," IEEE International Conference on Computer Vision, Oct. 2017, pp. 2961-2969.
R. Hori et al., "Silhouette-Based Synthetic Data Generation for 3D Human Pose Estimation With a Single Wrist-Mounted 360° Camera," IEEE International Conference on Image Processing (ICIP), Sep. 2021, 5 pages.
D.-Y. Hsiao et al., "Proactive Sensing for Improving Hand Pose Estimation," Proceedings of the 2016 CHI Conference on Human Factors in Computing Systems, May 7, 2016, pp. 2348-2352.
D.-H. Hwang et al., "MonoEye: Monocular Fisheye Camera-based 3D Human Pose Estimation," IEEE Conference on Virtual Reality and 3D User Interfaces (VR), Mar. 2019, 2 pages.
S. S. Intille et al., "Acquiring In Situ Training Data for Context-Aware Ubiquitous Computing Applications," Proceedings of the SIGCHI Conference on Human Factors in Computing Systems, Apr. 25, 2004, 8 pages.
W. Jiang et al., "Coherent Reconstruction of Multiple Humans from a Single Image," IEEE/CVF Conference on Computer Vision and Pattern Recognition (CVPR), Jun. 2020, pp. 82-91.
W. Jiang et al., "Towards3DHumanPoseConstructionUsingWiFi," Proceedings of the 26th Annual International Conference on Mobile Computing and Networking, Sep. 2020, 14 pages.
A. Kanazawa et al., "End-to-end Recovery of Human Shape and Pose," IEEE/CVF Conference on Computer Vision and Pattern Recognition (CVPR), Jun. 2018, pp. 7122-7131.
H. Kong et al., "m3Track: mmWave-based Multi-User 3D Posture Tracking," Proceedings of the 20th Annual International Conference on Mobile Systems, Applications and Services, Jun. 2022, pp. 491-503.
W. Li et al., "MHFormer: Multi-Hypothesis Transformer for 3D Human Pose Estimation," IEEE/CVF Conference on Computer Vision and Pattern Recognition (CVPR), Jun. 2022, pp. 13147-13156.
Z. Liu et al., "Disentangling and Unifying Graph Convolutions for Skeleton-Based Action Recognition," IEEE/CVF Conference on Computer Vision and Pattern Recognition (CVPR), Jun. 2020, pp. 143-152.
D. Mehta et al., "Monocular 3D Human Pose Estimation in the Wild Using Improved CNN Supervision," arXiv:1611.09813v5, Oct. 4, 2017, 16 pages.
V. Mollyn et al., "IMUPoser: Full-Body Pose Estimation using IMUs in Phones, Watches, and Earbuds," Proceedings of the 2023 CHI Conference on Human Factors in Computing Systems, Apr. 2023, 12 pages.
G. Moon et al., "V2V-PoseNet: Voxel-to-Voxel Prediction Network for Accurate 3D Hand and Human Pose Estimation from a Single Depth Map," IEEE/CVF Conference on Computer Vision and Pattern Recognition, Jun. 2018, pp. 5079-5088.
R. Nandakumar et al., "FingerIO: Using Active Sonar for Fine-Grained Finger Tracking," Proceedings of the 2016 CHI Conference on Human Factors in Computing Systems, May 2016, pp. 1515-1525.
E. Ng et al., "You2Me: Inferring Body Pose in Egocentric Video via First and Second Person Interactions," arXiv:1904.09882v2, Mar. 28, 2020, 14 pages.
G. Papandreou et al., "Towards Accurate Multi-person Pose Estimation in the Wild," IEEE Conference on Computer Vision and Pattern Recognition (CVPR), Jul. 2017, pp. 4903-4911.
D. Pavllo et al. "3D Human Pose Estimation in Video with Temporal Convolutions and Semi-supervised Training," IEEE/CVF Conference on Computer Vision and Pattern Recognition (CVPR), Jun. 2019, pp. 7753-7762.
Y. Ren et al., "Winect: 3D Human Pose Tracking for Free-Form Activity Using Commodity WiFi," Proceedings of the ACM on Interactive, Mobile, Wearable and Ubiquitous Technologies, vol. 5, No. 4, Dec. 2021, pp. 172:1-172:29.
Y. Ren et al., "GoPose: 3D Human Pose Estimation Using WiFi," Proceedings of the ACM on Interactive, Mobile, Wearable and Ubiquitous Technologies, vol. 6, No. 2, Jun. 2022, pp. 69:1-69:25.
M. Sandler et al., "MobileNetV2: Inverted Residuals and Linear Bottlenecks," IEEE/CVF Conference on Computer Vision and Pattern Recognition (CVPR), Jun. 2018, pp. 4510-4520.

(56) References Cited

OTHER PUBLICATIONS

P. H. Schonemann, "A Generalized Solution of the Orthogonal Procrustes Problem," Psychometrika, vol. 31, No. 1, Mar. 1966, 10 pages.
D. Tome et al., "xR-EgoPose: Egocentric 3D Human Pose from an HMD Camera," IEEE/CVF International Conference on Computer Vision (ICCV), Oct. 2019, pp. 7728-7738.
Ultraleap, "Leap Motion Controller 2," https://www.ultraleap.com/product/leap-motion-controller/, Accessed Oct. 3, 2024, 6 pages.
B. Wandt et al., "ElePose: Unsupervised 3D Human Pose Estimation by Predicting Camera Elevation and Learning Normalizing Flows on 2D Poses," arXiv:2112.07088v1, Dec. 14, 2021, 11 pages.
W. Wang et al., "Device-Free Gesture Tracking Using Acoustic Signals," Proceedings of the 22nd Annual International Conference on Mobile Computing and Networking, Oct. 2016, pp. 82-94.
W. Xie et al., "Acoustic-based Upper Facial Action Recognition for Smart Eyewear," Proceedings of the ACM on Interactive, Mobile, Wearable and Ubiquitous Technologies, vol. 5, No. 2, Jun. 2021, pp. 41:1-41:28.
F. Xiong et al., "A2J: Anchor-to-Joint Regression Network for 3D Articulated Pose Estimation from a Single Depth Image," IEEE/CVF International Conference on Computer Vision (ICCV), Oct. 2019, pp. 793-802.
H. Xu et al., "GHUM & GHUML: Generative 3D Human Shape and Articulated Pose Models," IEEE/CVF Conference on Computer Vision and Pattern Recognition (CVPR), Jun. 2020, pp. 6184-6193.
W. Xu et al., "Mo2Cap2: Real-time Mobile 3D Motion Capture with a Cap-mounted Fisheye Camera," arXiv:1803.05959v2, Jan. 23, 2019, 9 pages.
J. Yang et al., ". HybridTrak: Adding Full-Body Tracking to VR Using an Off-the-Shelf Webcam," Proceedings of the 2022 CHI Conference on Human Factors in Computing Systems, Apr. 2022, 13 pages.
F. Yin et al., "Accurate Estimation of Body Height From a Single Depth Image via a Four-Stage Developing Network," IEEE/CVF Conference on Computer Vision and Pattern Recognition (CVPR), Jun. 2020, 10 pages.
Y. Zhan et al., "Ray3D: Ray-based 3D Human Pose Estimation for Monocular Absolute 3D Localization," IEEE/CVF Conference on Computer Vision and Pattern Recognition (CVPR), Jun. 2022, pp. 13116-13125.
L. Zhao et al., "Semantic Graph Convolutional Networks for 3D Human Pose Regression," IEEE/CVF Conference on Computer Vision and Pattern Recognition (CVPR), Jun. 2019, pp. 3425-3435.
M. Zhao et al., "Through-Wall Human Pose Estimation Using Radio Signals," IEEE/CVF Conference on Computer Vision and Pattern Recognition, Jun. 2018, pp. 7356-7365.
M. Zhao et al., "RF-Based 3D Skeletons," Proceedings of the 2018 Conference of the ACM Special Interest Group on Data Communication, Aug. 2018, pp. 267-281.
W. Zhao et al., "GraFormer: Graph Convolution Transformer for 3D Pose Estimation," IEEE/CVF Conference on Computer Vision and Pattern Recognition (CVPR), Jun. 2022, pp. 20438-20447.
Pytorch, "PyTorch Mobile," https://pytorch.org/mobile/home/, Accessed Oct. 3, 2024, 3 pages.
T. Ando et al., "CanalSense: Face-Related Movement Recognition System based on Sensing Air Pressure in Ear Canals," Proceedings of the 30th Annual ACM Symposium on User Interface Software and Technology, Oct. 2017, 11 pages.
M. T. I. Aumi et al., "DopLink: Using the Doppler Effect for Multi-Device Interaction," Proceedings of the 2013 ACM international Joint Conference on Pervasive and Ubiquitous Computing, Sep. 2013, 4 pages.
Bitfoic Electronics, "OWR-05049T-38D," https://www.bitfoic.com/detail/owr05049t38d-14578, Accessed Oct. 3, 2024, 4 pages.
T. Chen et al., "C-Face: Continuously Reconstructing Facial Expressions by Deep Learning Contours of the Face with Ear-mounted Miniature Cameras," Proceedings of the 33rd Annual ACM Symposium on User Interface Software and Technology, Oct. 2020, 14 pages.

Bose, "Bose Frames Tempo," https://support.bose.com/s/product/bose-frames-tempo/01t8c00000Oyd9mAAB?language=en_US, Accessed Oct. 3, 2024, 37 pages.
R. Cowie et al., "Emotion Recognition in Human-Computer Interaction," IEEE Signal Processing Magazine, vol. 18, No. 1, Jan. 2001, pp. 33-80.
A. Dementyev et al., "DualBlink: A Wearable Device to Continuously Detect, Track, and Actuate Blinking For Alleviating Dry Eyes and Computer Vision Syndrome," Proceedings of the ACM on Interactive, Mobile, Wearable and Ubiquitous Technologies, Mar. 2017, vol. 1, No. 1, pp. 1:1-1:19.
Epson, "Moverio BT-35ES Smart Glasses," https://epson.com/For-Work/Wearables/Smart-Glasses/Moverio-BT-35ES-Smart-Glasses/p/V11H935020AL, Accessed Oct. 3, 2024, 5 pages.
P.-L. Hsieh et al., "Unconstrained Realtime Facial Performance Capture," IEEE Conference on Computer Vision and Pattern Recognition (CVPR), Jun. 2015, pp. 1675-1683.
Y. Hu et al., "Demo Abstract: Wireless Glasses for Non-contact Facial Expression Monitoring," 19th ACM/IEEE International Conference on Information Processing in Sensor Networks, Apr. 2020, pp. 367-368.
E. P. Ijjina et al., "Facial Expression Recognition using Kinect Depth Sensor and Convolutional Neural Networks," 13th International Conference on Machine Learning and Applications, Dec. 2014, pp. 392-396.
Apple Inc., "Tracking and Visualizing Faces," https://developer.apple.com/documentation/arkit/arkit_in_ios/content_anchors/tracking_and_visualizing_faces, Accessed Oct. 3, 2024, 8 pages.
TDK Corporation, "ICS-43434," https://invensense.tdk.com/products/ics-43434/, Accessed Oct. 3, 2024, 7 pages.
S. A. Kahou et al., "Combining Modality Specific Deep Neural Networks for Emotion Recognition in Video," Proceedings of the 15th ACM on International Conference on Multimodal Interaction, Dec. 2013, 8 pages.
D. E. King, "Dlib-ml: A Machine Learning Toolkit," Journal of Machine Learning Research, vol. 10, Jul. 2009, pp. 1755-1758.
Knowles Electronics, "SR6438NWS-000," https://www.knowles.com/docs/default-source/model-downloads/sr6438nws-000.pdf, Accessed Oct. 3, 2024, 2 pages.
J. Kwon et al., "Emotion Recognition Using a Glasses-Type Wearable Device via Multi-Channel Facial Responses," IEEE Access, vol. 9, Oct. 19, 2021, pp. 146392-146403.
Y.-H. Lai et al., "Emotion-Preserving Representation Learning via Generative Adversarial Network for Multi-view Facial Expression Recognition," 13th IEEE International Conference on Automatic Face & Gesture Recognition, May 2018, pp. 263-270.
M. Lankes et al., "Facial Expressions as Game Input with Different Emotional Feedback Conditions," Proceedings of the 2008 International Conference on Advances in Computer Entertainment Technology, Dec. 2008, pp. 253-256.
Lenovo, "ThinkReality A3 Smart Glasses," https://www.lenovo.com/US/en/p/smart-devices/virtual-reality/thinkreality-a3-pc-edition/wmd00000500, Accessed Oct. 3, 2024, 13 pages.
J. Lian et al., "EchoSpot: Spotting Your Locations via Acoustic Sensing," Proceedings of the ACM on Interactive, Mobile, Wearable and Ubiquitous Technologies, vol. 5, No. 3, pp. 113:1-113:21.
J. Liu et al., "BlinkListener: "Listen" to Your Eye Blink Using Your Smartphone," Proceedings of the ACM on Interactive, Mobile, Wearable and Ubiquitous Technologies, vol. 5, No. 2, Jun. 2021, pp. 73:1-73:27.
M. Liu et al., "Non-Contact, Real-Time Eye Blink Detection with Capacitive Sensing," arXiv:2211.05541v1, Nov. 10, 2022, 5 pages.
M. Liu et al., "Learning Expressionlets on Spatio-Temporal Manifold for Dynamic Facial Expression Recognition," IEEE Conference on Computer Vision and Pattern Recognition, Jun. 2014, pp. 4321-4328.
P. Liu et al., "Facial Expression Recognition via a Boosted Deep Belief Network," IEEE Conference on Computer Vision and Pattern Recognition, Jun. 2014, 8 pages.
L. Lu et al., "Lip Reading-Based User Authentication Through Acoustic Sensing on Smartphones," IEEE/ACM Transactions on Networking, vol. 27, No. 1, Feb. 2019, pp. 447-460.

(56) References Cited

OTHER PUBLICATIONS

D. J. C. Matthies et al., "EarFieldSensing: A Novel In-Ear Electric Field Sensing to Enrich Wearable Gesture Input through Facial Expressions," Proceedings of the 2017 CHI Conference on Human Factors in Computing Systems, May 2017, pp. 1911-1922.
Niora, "Microsoft HoloLens," https://www.niora.net/en/p/microsoft_hololens, Accessed Oct. 3, 2024, 18 pages.
amazon.com, Inc., "Echo Frames and Carrera Smart Glasses Battery Life and Testing Information," https://www.amazon.com/gp/help/customer/display.html?nodeId=GSVK3ZY3G43K435E, Accessed Oct. 3, 2024, 3 pages.
J. Park et al., "Dry Eye Syndrome in Thyroid Eye Disease Patients: The Role of iIncreased Incomplete Blinking and Meibomian Gland Loss," Acta Ophthalmologica, vol. 97, Aug. 2019, pp. e800-e806.
V. Rantanen et al., "Capacitive Facial Movement Detection for Human-Computer Interaction to Click By Frowning and Lifting Eyebrows," Medical and Biological Engineering and Computing, Dec. 17, 2009, 9 pages.
M. A. Ranzato et al., "On Deep Generative Models with Applications to Recognition," Conference on Computer Vision and Pattern Recognition (CVPR), Jun. 2011, pp. 2857-2864.
S. Rifai et al., "Disentangling Factors of Variation for Facial Expression Recognition," European Conference on Computer Vision, Oct. 2012, pp. 802-822.
J. Scheirer et al., "Expression Glasses: A Wearable Device for Facial Expression Recognition," Proceedings of the SIGCHI conference on Human Factors in Computing Systems, May 1999, pp. 262-263.
J. Scott-Thomas, "Ray-Ban Stories Smart Glasses use Two Frame Mounted Cameras to Capture Images in a First Step towards Augmented Reality," https://www.techinsights.com/blog/ray-ban-stories-smart-glasses-cameras, Accessed Oct. 3, 2024, 6 pages.
N. Sebe et al., "Authentic Facial Expression Analysis," Image and Vision Computing, vol. 25, No. 12, Dec. 3, 2007, 8 pages.
Nordic Semiconductor, "The Complete Guide to Bluetooth Low Energy," https://response.nordicsemi.com/the-complete-guide-to-bluetooth-low-energy, Accessed Oct. 3, 2024, 21 pages.
B.-S. Lin et al., "Design of an Inertial-Sensor-Based Data Glove for Hand Function Evaluation," Sensors, vol. 18, No. 1545, May 13, 2018, 17 pages.
I. Loshchilov et al., "SGDR: Stochastic Gradient Descent with Warm Restarts," Proceedings of the International Conference on Learning Representations, arXiv:1608.03983v5, May 3, 2017, 16 pages.
A. Krizhevsky et al., "ImageNet Classification with Deep Convolutional Neural Networks," Advances in Neural Information Processing Systems, vol. 25, Dec. 2012, 9 pages.
I. Oikonomidis et al., "Efficient Model-based 3D Tracking of Hand Articulations using Kinect," Proceedings of the British Machine Vision Conference, Sep. 2011, 11 pages.
M. Z. Khan et al., "A Realistic Image Generation of Face From Text Description Using the Fully Trained Generative Adversarial Networks," IEEE Access, vol. 9, Jan. 5, 2021, pp. 1250-1260.
C. R. Pittman et al., "Multiwave: Complex Hand Gesture Recognition Using the Doppler Effect," Proceedings of the 43rd Graphics Interface Conference, Jun. 2017, 7 pages.
T. Hirahara et al., "Silent-speech Enhancement using Body-conducted Vocal-tract Resonance Signals," Speech Communication, Apr. 2010, Author Manuscript, 22 pages.
G. Rogez et al., "3D Hand Pose Detection in Egocentric RGB-D Images," arXiv:1412.0065v1, Nov. 29, 2014, 14 pages.
A. Garg et al., "Lip Reading using CNN and LSTM," Technical report, Stanford University, CS231, Mar. 2016, 9 pages.
K. Seo et al., "AirPincher: A Handheld Device for Recognizing Delicate Mid-Air Hand Gestures," Proceedings of the Adjunct Publication of the 27th Annual ACM symposium on User Interface Software and Technology, Oct. 2014, pp. 83-84.
T. Sharp et al., "Accurate, Robust, and Flexible Realtime Hand Tracking," Proceedings of the 33rd Annual ACM Conference on Human Factors in Computing Systems, Apr. 2015, 10 pages.

T. Simon et al., "Hand Keypoint Detection in Single Images using Multiview Bootstrapping," Proceedings of the IEEE conference on Computer Vision and Pattern Recognition, Jul. 2017, pp. 1145-1153.
A. Spurr et al., "Cross-modal Deep Variational Hand Pose Estimation," Proceedings of the IEEE Conference on Computer Vision and Pattern Recognition, Jun. 2018, pp. 89-98.
S. Sridhar et al., "WatchSense: On- and Above-Skin Input Sensing through a Wearable Depth Sensor," CHI Conference on Human Factors in Computing Systems, May 2017, pp. 3891-3902.
T. Stamer et al., "Real-Time American Sign Language Recognition Using Desk and Wearable Computer Based Video," IEEE Transactions on Pattern Analysis and Machine Intelligence, vol. 20, No. 12, Dec. 1998, pp. 1371-1375.
H. Su et al., "Multi-view Convolutional Neural Networks for 3D Shape Recognition," Proceedings of IEEE International Conference on Computer Vision, Dec. 2015, pp. 945-953.
L. Sun et al., "WiDraw: Enabling Hands-free Drawing in the Air on Commodity WiFi Devices," Proceedings of the 21st Annual International Conference on Mobile Computing and Networking, Sep. 2015, 13 pages.
J. Taylor et al. "Efficient and Precise Interactive Hand Tracking Through Joint, Continuous Optimization of Pose and Correspondences," ACM Transactions on Graphics, vol. 35, No. 4, Jul. 2016, 12 pages.
J. Tompson et al., "Real-Time Continuous Pose Recovery of Human Hands Using Convolutional Networks," ACM Transactions on Graphics, vol. 33, No. 5, Aug. 2014, 10 pages.
A. Vardy et al., "The WristCam as Input Device," International Symposium on Wearable Computers, Oct. 1999, 4 pages.
T. Li et al., "Reconstructing Hand Poses Using Visible Light," PACM on Interactive, Mobile, Wearable and Ubiquitous Technologies, vol. 1, No. 3, Article 71. Sep. 2017, 20 pages.
Y. Fan et al., "Video-Based Emotion Recognition using CNN-RNN and C3D Hybrid Networks," Proceedings of the 18th ACM International Conference on Multimodal Interaction, Oct. 2016, 6 pages.
A. Bozhurt et al., "Safety Assessment of Near Infrared Light Emitting Diodes for Diffuse Optical Measurements," BioMedical Engineering OnLine, Mar. 22, 2004, 10 pages.
Y. Zhang et al., "Wearing-independent Hand Gesture Recognition Method Based on EMG Armband," Personal and Ubiquitous Computing, vol. 22, May 11, 2018, pp. 511-524.
S. Hickson et al., "Eyemotion: Classifying Facial Expressions in VR Using Eye-tracking Cameras," arXiv:1707.07204v2, Jul. 28, 2017, 10 pages.
U.S. Environment Protection Agency Office of Noise Abatement and Control, "Information on Levels of Environmental Noise Requisite to Protect Public Health and Welfare with Adequate Margin of Safety," EPA/ONAC 550/9-74-004, Mar. 1974, 242 pages.
Y. Zhao et al., "Demo: Finger and Hand Gesture Recognition using Smartwatch," 13th Annual International Conference on Mobile Systems, Applications, and Services, May 18, 2015, p. 471.
L. E. Emokpae et al., "UREAL: Underwater Reflection Enabled Acoustic-based Localization," IEEE Sensors Journal, Nov. 2014, 11 pages.
D. Ashbrook et al., "Nenya: Subtle and Eyes-Free Mobile Input with a Magnetically-Tracked Finger Ring," Proceedings of the SIGCHI Conference on Human Factors in Computing Systems, May 2011, pp. 2043-2046.
D. A. Bowman et al., "Design and Evaluation of Menu Systems for Immersive Virtual Environments," Proceedings IEEE Virtual Reality, Mar. 2001, pp. 149-156.
D. Barolet et al., "Infrared and Skin: Friend or Foe," Journal of Photochemistry & Photobiology, B: Biology, vol. 155, Feb. 2016, pp. 78-85.
K.-Y. Chen et al., "uTrack: 3D Input Using Two Magnetic Sensors," Proceedings of the 26th Annual ACM Symposium on User Interface Software & Technology, Oct. 2013, pp. 237-244.
H. Liang et al., "AR in Hand: Egocentric Palm Pose Tracking and Gesture Recognition for Augmented Reality Applications," Proceedings of the 23rd ACM international conference on Multimedia, Oct. 2015, pp. 743-744.

(56) References Cited

OTHER PUBLICATIONS

M. Fan et al., "Eyelid Gestures on Mobile Devices for People with Motor Impairments," Proceedings of the 22nd International Acm Sigaccess Conference on Computers and Accessibility, Oct. 2020, No. 15, 8 pages.
J. S. Brumberg et al., "Brain-Computer Interfaces for Speech Communication," Speech Communication, Apr. 2010, Author Manuscript, 22 pages.
W. Chan et al., "Listen, Attend and Spell," arXiv:1508.01211v2, Aug. 20, 2015, 16 pages.
A. Gupta et al., "RotoSwype: Word-Gesture Typing using a Ring," Proceedings of the 2019 CHI Conference on Human Factors in Computing Systems, May 2, 2019, 12 pages.
J. Chorowski et al., "Attention-Based Models for Speech Recognition," arXiv:1506.07503v1, Jun. 24, 2015, 19 pages.
D.-Y. Huang et al., "DigitSpace: Designing Thumb-to-Fingers Touch Interfaces for One-Handed and Eyes-Free Interactions," Proceedings of the 2016 CHI Conference on Human Factors in Computing Systems, May 2016, pp. 1526-1537.
M. Kianpisheh et al., "Face Recognition Assistant for People with Visual Impairments," Proceedings of the ACM on Interactive, Mobile, Wearable and Ubiquitous Technologies, Sep. 9, 2019, 26 pages.
W. Kienzle et al., "LightRing: Always-Available 2D Input on Any Surface," Proceedings of the 27th Annual ACM Symposium on User Interface Software and Technology, Oct. 2014, 4 pages.
Y. Kubo et al., "Audio Touch: Minimally Invasive Sensing of Micro-Gestures via Active Bio-Acoustic Sensing," Proceedings of the 21st International Conference on Human-Computer Interaction with Mobile Devices and Services, Oct. 2019, No. 36, 13 pages.
A. Kulshreshth et al., "Exploring the Usefulness of Finger-Based 3D Gesture Menu Selection," Proceedings of the SIGCHI Conference on Human Factors in Computing Systems, Apr. 2014, pp. 1093-1102.
V. Cuculo et al., "OpenFACS : An Open Source FACS-based 3D Face Animation System," International Conference on Image and Graphics, Aug. 2019, 11 pages.
F. M. Li et al, "FMT: A Wearable Camera-Based Object Tracking Memory Aid for Older Adults, " Proceedings of the ACM on Interactive, Mobile, Wearable and Ubiquitous Technologies, Sep. 2019, 25 pages.
M. Li et al., "BrailleSketch: A Gesture-based Text Input Method for People with Visual Impairments," Proceedings of the 19th International ACM SIGACCESS Conference on Computers and Accessibility, Oct. 2017, pp. 12-21.
C. Loclair et al., "PinchWatch: A Wearable Device for One-Handed Microinteractions," 12th International Conference on Human Computer Interaction with Mobile Devices and Services, Sep. 2010, 4 pages.
Z. Lu et al., "A Hand Gesture Recognition Framework and Wearable Gesture-Based Interaction Prototype for Mobile Devices," IEEE Transactions on Human-Machine Systems, vol. 44, No. 2, Apr. 2014, pp. 293-299.
A. Mujibiya et al., "The Sound of Touch: On-body Touch and Gesture Sensing Based on Transdermal Ultrasound Propagation," Proceedings of the 2013 ACM International Conference on Interactive Tabletops and Surfaces, Oct. 2013, pp. 189-198.
B. Denby et al., "Silent Speech Interfaces," Speech Communication, Apr. 2011, Accepted Manuscript, 64 pages.
M. El-Gohary et al., "Shoulder and Elbow Joint Angle Tracking with Inertial Sensors," IEEE Transactions on Biomedical Engineering, vol. 59, No. 9, Sep. 2012, pp. 2635-2641.
H. Lim et al., "BodyTrak: Inferring Full-Body Poses from Body Silhouettes Using a Miniature Camera on a Wristband," Proceedings of the ACM on Interactive, Mobile, Wearable and Ubiquitous Technologies, vol. 6, No. 3, Sep. 2022, p. 154:1-21.
J. Roggendorf et al., "Arm Swing Asymmetry in Parkinson's Disease Measured with Ultrasound Based Motion Analysis during Treadmill Gait," Gait Posture, vol. 35, Jan. 2012, pp. 116-120.

Y. Gao et al., "SonicFace: Tracking Facial Expressions Using a Commodity Microphone Array," . Proceedings of the ACM on Interactive, Mobile, Wearable and Ubiquitous Technologies, vol. 5, No. 4, Dec. 2021, pp. 156:1-156:33.
A. Gruebler et al., "Measurement of Distal EMG Signals Using a Wearable Device for Reading Facial Expressions," 32nd Annual International Conference of the IEEE Engineering in Medicine and Biology, Aug.-Sep. 2010, pp. 4594-4597.
S. He et al., "Facial Expression Recognition using Deep Boltzmann Machine from Thermal Infrared Images," 2013 Humaine Association Conference on Affective Computing and Intelligent Interaction, Sep. 2013, pp. 239-244.
K. Masai et al., "Facial Expression Recognition in Daily Life by Embedded Photo Reflective Sensors on Smart Eyewear," Proceedings of the International Conference on Intelligent User Interfaces, Mar. 2016, pp. 317-326.
D. B. M. Yin et al., "A Proposed Approach for Biometric-Based Authentication Using of Face and Facial Expression Recognition," IEEE International Conference on Communication and Information Systems, Dec. 2018, pp. 28-33.
J. A. M. Paro et al., "Video-Based Self-Review: Comparing Google Glass and GoPro Technologies," Annals of Plastic Surgery, vol. 74, Supplement 1, May 2015, pp. S:71-S:74.
J.-W. Lin et al., "BackHand: Sensing Hand Gestures via Back of the Hand," Proceedings of the 28th Annual ACM Symposium on User Interface Software & Technology, Nov. 2015, pp. 557-564.
J. Lai et al., "AcousticPose: Acoustic-Based Human Pose Estimation," Wireless Sensor Networks, Jan. 2022, pp. 59-62.
D. Purves est al, "The Audible Spectrum," Neuroscience, 2001, Abstract Only.
T. Chen et al., "NeckFace: Continuously Tracking Full Facial Expressions on Neck-mounted Wearables," Proceedings of the ACM on Interactive, Mobile, Wearable and Ubiquitous Technologies, vol. 5, No. 2, Abstract Only.
J. McIntosh et al., "SensIR: Detecting Hand Gestures with a Wearable Bracelet using Infrared Transmission and Reflection," Proceedings of the 30th Annual ACM Symposium on User Interface Software and Technology, Oct. 2017, pp. 593-597.
S. Oh et al., "VibEye: Vibration-Mediated Object Recognition for Tangible Interactive Applications," Proceedings of the 2019 CHI Conference on Human Factors in Computing Systems, No. 676, May 2019, pp. 1-12.
J. Xie et al., "mm3DFace: Nonintrusive 3D Facial Reconstruction Leveraging mmWave Signals," Proceedings of the Annual International Conference on Mobile Systems, Applications and Services, Jun. 2023, pp. 462-474.
N. Harte et al., "TCD-TIMIT: An Audio-Visual Corpus of Continuous Speech," IEEE Transactions on Multimedia, vol. 17, No. 5, May 2015, pp. 603-615.
N. Kimura et al., "TieLent: A Casual Neck-Mounted Mouth Capturing Device for Silent Speech Interaction," Proceedings of the International Conference on Advanced Visual Interfaces, Sep.-Oct. 2020, 8 pages.
H. Manabe et al., "Unvoiced Speech Recognition using EMG— Mime Speech Recognition," Conference on Human Factors in Computing Systems, Apr. 2003, pp. 794-795.
T. Schultz, "ICCHP Keynote: Recognizing Silent and Weak Speech Based on Electromyography," International Conference of Computers Helping People with Special Needs, Jul. 2010, pp. 595-604.
K. Xu et al., "Ultrasound-Based Silent Speech Interface Using Sequential Convolutional Auto-Encoder," Proceedings of the 27th ACM International Conference on Multimedia, Oct. 2019, pp. 2194-2195.
M. Hosseini et al., "Towards a Consensus Gesture Set: A Survey of Mid-Air Gestures in HCI for Maximized Agreement Across Domains," Proceedings of the 2023 CHI Conference on Human Factors in Computing Systems, Apr. 2023, 24 pages.
W. Mao et al., "CAT: High-Precision Acoustic Motion Tracking," Proceedings of the 22nd Annual International Conference on Mobile Computing and Networking, Oct. 2016, 13 pages.
R. Takahashi et al., "TelemetRing: A Batteryless and Wireless Ring-Shaped Keyboard Using Passive Inductive Telemetry," Pro-

(56) References Cited

OTHER PUBLICATIONS ceedings of the 33rd Annual ACM Symposium on User Interface Software and Technology, Oct. 2020, pp. 1161-1168.
Y. Jin et al., "SonicASL: An Acoustic-based Sign Language Gesture Recognizer Using Earphones," Proceedings of the ACM on Interactive, Mobile, Wearable and Ubiquitous Technologies, vol. 5, No. 2, Jun. 2021, pp. 67:1-67:30.
W. Ruan et al., "AudioGest: Enabling Fine-Grained Hand Gesture," Proceedings of the 2016 ACM International Joint Conference on Pervasive and Ubiquitous Computing, Sep. 2016, pp. 474-485.
H. Hiraki et al., "SilentMask: Mask-Type Silent Speech Interface with Measurement of Mouth Movement," Augmented Humans Conference, Feb. 2021, pp. 86-90.
Y. Igarashi et al., "Silent Speech Eyewear Interface: Silent Speech Recognition Method Using Eyewear and an Ear-Mounted Microphone with Infrared Distance Sensors," Sensors, vol. 24, No. 7368, Nov. 19, 2024, 16 pages.
J. Rekimoto et al., "Derma: Silent Speech Interaction Using Transcutaneous Motion Sensing," Augmented Humans Conference, Feb. 2021, 10 pages.
C. Hennessey et al., "Long Range Eye Tracking: Bringing Eye Tracking into the Living Room," Proceedings of the Symposium on Eye Tracking Research and Applications, Mar. 2012, pp. 249-252.
B. Noris et al., "A Wearable Gaze Tracking System for Children in Unconstrained Environments," Computer Vision and Image Understanding, vol. 115, No. 4, Apr. 2011, pp. 476-486.
S. Masood et al., "Real-Time Sign Language Gesture (Word) Recognition from Video Sequences Using CNN and RNN," Intelligent Engineering Informatics, Apr. 11, 2018, pp. 623-632.
J. Cha et al., "An IR-based Facial Expression Tracking Sensor for Head-Mounted Displays," IEEE Sensors, Oct. 2016, 3 pages.
H. R. Schiffman, "Sensation and Perception: An Integrated Approach," John Wiley & Sons, 1990, Excerpts Only.
Nordic Semiconductor, "nRF52840," Product Specification, vol. 1.10, https://www.nordicsemi.com/Products/nRF52840, Jul. 4, 2024 980 pages.
K. Sun et al., "VSkin: Sensing Touch Gestures on Surfaces of Mobile Devices Using Acoustic Signals," Proceedings of the 24th Annual International Conference on Mobile Computing and Networking, Oct. 2018, 15 pages.
J. Thies et al., "Real-time Expression Transfer for Facial Reenactment," ACM Transactions on Graphics (TOG), vol. 34, No. 6, 14 pages.
U. Von Agris et al., "The Significance of Facial Features for Automatic Sign Language Recognition," 8th IEEE International Conference on Automatic Face & Gesture Recognition, Sep. 2008, 6 pages.
S.-E. Wei et al., "VR Facial Animation via Multiview Image Translation," ACM Transactions on Graphics (TOG), vol. 38, No. 4, Jul. 2019, pp. 67:1-67:16.
Wikipedia, "Google Glass," https://en.wikipedia.org/wiki/Google_Glass, Sep. 9, 2024, 28 pages.
C. Wu et al., "An Anatomically-constrained Local Deformation Model for Monocular Face Capture," ACM Transactions on Graphics (TOG), vol. 35, No. 4, Jul. 2016, 12 pages.
W. Wu et al., "Look at Boundary: A Boundary-Aware Face Alignment Algorithm," IEEE/CVF Conference on Computer Vision and Pattern Recognition (CVPR), Jun. 2018, pp. 2129-2138.
Y. Wu et al., "BioFace-3D: Continuous 3d Facial Reconstruction through Lightweight Single-Ear Biosensors," Proceedings of the 27th Annual International Conference on Mobile Computing and Networking, Jan. 2022, pp. 350-363.
S. Xiong et al., "iBlink: Smart Glasses for Facial Paralysis Patients," Proceedings of the 15th Annual International Conference on Mobile Systems, Applications, and Services, Jun. 2017, pp. 359-370.
X. Xu et al., "EarBuddy: Enabling On-Face Interaction via Wireless Earbuds," Proceedings of the 2020 CHI Conference on Human Factors in Computing Systems, Apr. 2020, 14 pages.
S. Yun et al., "Strata: Fine-Grained Acoustic-based Device-Free Tracking," Proceedings of the 15th Annual International Conference on Mobile Systems, Applications, and Services, Jun. 2017, 14 pages.
Y. Zhang et al., "Endophasia: Utilizing Acoustic-Based Imaging for Issuing Contact-Free Silent Speech Commands," Proceedings of the ACM on Interactive, Mobile, Wearable and Ubiquitous Technologies, vol. 4, No. 1, Mar. 2020, pp. 37:1-37:26.
Y. Zhang et al., "Vernier: Accurate and Fast Acoustic Motion Tracking Using Mobile Devices, " IEEE Conference on Computer Communications, Apr. 2018, pp. 1709-1717.
B. Amento et al., "The Sound of One Hand: A Wrist-Mounted Bio-Acoustic Fingertip Gesture Interface," CHI '02 Extended Abstracts on Human Factors in Computing Systems, Apr. 2002, pp. 724-725.
S. Bhattacharya et al., "Leveraging Sound and Wrist Motion to Detect Activities of Daily Living with Commodity Smartwatches," Proceedings of the ACM on Interactive, Mobile, Wearable and Ubiquitous Technologies, vol. 6, No. 2, Jun. 2022, pp. 42:1-42:28.
W. Chen et al., "ViFin: Harness Passive Vibration to Continuous Micro Finger Writing with a Commodity Smartwatch," Proceedings of the ACM on Interactive, Mobile, Wearable and Ubiquitous Technologies, vol. 5, No. 1, Jun. 2022, pp. 46:1-46:25.
D. Damen et al., "Scaling Egocentric Vision: The Epic-Kitchens Dataset," European Conference on Computer Vision, Sep. 2018, 17 pages.
D. Damen et al., "Rescaling Egocentric Vision: Collection, Pipeline and Challenges for Epic-Kitchens-100," International Journal of Computer Vision, Oct. 20, 2021, vol. 130, pp. 33-55.
P. Das et al., "A Thousand Frames in Just a Few Words: Lingual Description of Videos through Latent Topics and Sparse Object Stitching," IEEE Conference on Computer Vision and Pattern Recognition, Oct. 2013, pp. 2634-2641.
A. Dementyev et al., "WristFlex: Low-Power Gesture Input with Wrist-Worn Pressure Sensors," Proceedings of the 27th Annual ACM Symposium on User Interface Software and Technology, Oct. 2014, 6 pages.
N. Devrio et al., "DiscoBand: Multiview Depth-Sensing Smartwatch Strap for Hand, Body and Environment Tracking," The 35th Annual ACM Symposium on User Interface Software and Technology, Oct. 2022, 13 pages.
T. Deyle et al., "Hambone: A Bio-Acoustic Gesture Interface," 11th IEEE International Symposium on Wearable Computers, Oct. 2007, 8 pages.
Y. Du et al., "Semi-Supervised Learning for Surface EMG-based Gesture Recognition," Proceedings of the Twenty-Sixth International Joint Conference on Artificial Intelligence, Aug. 2017, pp. 1624-1630.
J. Fan et al., "What is That in Your Hand? Recognizing Grasped Objects via Forearm Electromyography Sensing," Proceedings of the ACM on Interactive, Mobile, Wearable and Ubiquitous Technologies, vol. 2, No. 4, Dec. 2018, pp. 161:1-161:24.
L. Ge et al., "3D Hand Shape and Pose Estimation from a Single RGB Image," IEEE/CVF Conference on Computer Vision and Pattern Recognition (CVPR), Jun. 2019, pp. 10833-10842.
J. Gong et al., "Acustico: Surface Tap Detection and Localization Using Wrist-Based Acoustic TDOA Sensing," Proceedings of the 33rd Annual ACM Symposium on User Interface Software and Technology, Oct. 2020, pp. 406-441.
J. Gong et al., "WristWhirl: One-Handed Continuous Smartwatch Input Using Wrist Gestures," Proceedings of the 29th Annual Symposium on User Interface Software and Technology, Oct. 2016, 12 pages.
C. Harrison et al., "Skinput: Appropriating the Body as an Input Surface," Proceedings of the SIGCHI Conference on Human Factors in Computing Systems, Apr. 2010, pp. 453-462.
F. Hu et al., "FingerTrak: Continuous 3D Hand Pose Tracking by Deep Learning Hand Silhouettes Captured by Miniature Thermal Cameras on Wrist," Proceedings of the ACM on Interactive, Mobile, Wearable and Ubiquitous Technologies, vol. 4, No. 2, Jun. 2020, pp. 71:1-71:24.
Tap Systems, Inc., "Tap Strap 2," https://www.tapwithus.com/product/tap-strap-2/, Accessed Oct. 7, 2024, 3 pages.

(56) References Cited

OTHER PUBLICATIONS

Intel, "Intel RealSense Technology," https://www.intel.com/content/www/us/en/architecture-and-technology/realsense-overview.html, Accessed Oct. 7, 2024, 5 pages.
Y. Iravantchi et al., "BeamBand: Hand Gesture Sensing with Ultrasonic Beamforming," Proceedings of the 2019 CHI Conference on Human Factors in Computing Systems, May 2019, 10 pages.
F. Kerber et al., "User-Independent Real-Time Hand Gesture Recognition Based on Surface Electromyography," Proceedings of the 19th International Conference on Human-Computer Interaction with Mobile Devices and Services, Sep. 2017, 7 pages.
D. Kim et al., "EtherPose: Continuous Hand Pose Tracking with Wrist-Worn Antenna Impedance Characteristic Sensing," The 35th Annual ACM Symposium on User Interface Software and Technology, Oct. 2022, 12 pages.
D. Kim et al., "Digits: Freehand 3D Interactions Anywhere Using a Wrist-Worn Gloveless Sensor," Proceedings of the 25th Annual ACM Symposium on User Interface Software and Technology, Oct. 2012, pp. 167-176.
J. Kim et al., "The Gesture Watch: A Wireless Contact-free Gesture based Wrist Interface," 11th IEEE International Symposium on Wearable Computers, Oct. 2007, 8 pages.
H. Lim et al., "D-Touch: Recognizing and Predicting Fine-Grained Hand-Face Touching Activities Using a Neck-Mounted Wearable," Proceedings of the 28th International Conference on Intelligent User Interfaces, Mar. 2023, pp. 569-583.
Y. Liu et al., "WR-Hand: Wearable Armband Can Track User's Hand," Proceedings of the ACM on Interactive, Mobile, Wearable and Ubiquitous Technologies, vol. 5, No. 3, Sep. 2021, pp. 118:1-118:27.
Y. Liu et al., "NeuroPose: 3D Hand Pose Tracking Using EMG Wearables," Proceedings of the Web Conference 2021, Apr. 2021, 12 pages.
C. Lugaresi et al., "MediaPipe: A Framework for Building Perception Pipelines," arXiv:1906.08172v1, Jun. 14, 2019, 9 pages.
J. McIntosh et al., "EchoFlex: Hand Gesture Recognition Using Ultrasound Imaging," Proceedings of the 2017 CHI Conference on Human Factors in Computing Systems, May 2017, pp. 1923-1934.
Microsoft, "Kinect for Windows," https://learn.microsoft.com/en-us/windows/apps/design/devices/kinect-for-windows, Aug. 30, 2022, 3 pages.
F. Mueller et al., "GANerated Hands for Real-Time 3D Hand Tracking from Monocular Rgb," IEEE/CVF Conference on Computer Vision and Pattern Recognition, Jun. 2018, pp. 49-59.
K. Ohnishi et al., "Recognizing Activities of Daily Living with a Wrist-Mounted Camera," IEEE Conference on Computer Vision and Pattern Recognition (CVPR), Jun. 2016, pp. 3103-3111.
I. Oikonomidis et al., "Full DOF Tracking of a Hand Interacting with an Object by Modeling Occlusions and Physical Constraints," International Conference on Computer Vision, Nov. 2011, 8 pages.
F. S. Parizi et al., "AuraRing: Precise Electromagnetic Finger Tracking," Communications of the ACM, vol. 65, No. 10, Oct. 2022, pp. 85-92.
J. Park et al., "HandOccNet: Occlusion-Robust 3D Hand Mesh Estimation Network," IEEE/CVF Conference on Computer Vision and Pattern Recognition (CVPR), Jun. 2022, pp. 1496-1505.
J. K. Perng et al., "Acceleration Sensing Glove," Third International Symposium on Wearable Computers, Oct. 1999, 3 pages.
F. Quivira et al., "Translating sEMG Signals to Continuous Hand Poses using Recurrent Neural Networks," IEEE Embs International Conference on Biomedical & Health Informatics (BHI), Mar. 2018, 4 pages.
S. Shi et al., "Passive Detection of Situations from Ambient FM-radio Signals," Proceedings of the 2012 ACM Conference on Ubiquitous Computing, Sep. 2012, pp. 1049-1053.
J. R. Smith et al., "RFID-Based Techniques for Human-Activity Detection," Communications of the ACM, vol. 28, No. 9, Sep. 2005, pp. 39-44.
A. Spielberg et al., "RapID: A Framework for Fabricating Low-Latency Interactive Objects with RFID Tags," Proceedings of the 2016 CHI Conference on Human Factors in Computing Systems, May 2016, 12 pages.
Y. Yokokohji et al., "Motion Capture from Demonstrator's Viewpoint and Its Application to Robot Teaching," IEEE International Conference on Robotics and Automation, May 2002, pp. 1551-1558.
W. J. Staszewski et al., "Structural Health Monitoring using Scanning Laser Vibrometry: I. Lamb Wave Sensing," Smart Materials and Structures, vol. 13, No. 2, Feb. 4, 2004, pp. 251-260.
J. Sung et al., "Unstructured Human Activity Detection from RGBD Images," arXiv:1107.0169v2, Feb. 14, 2012, 8 pages.
H. Tabatabai et al., "Novel Applications of Laser Doppler Vibration Measurements to Medical Imaging," Sensing and Imaging: An International Journal, vol. 14, Aug. 13, 2013, pp. 13-28.
E. M. Tapia et al., "Activity Recognition in the Home Setting Using Simple and Ubiquitous Sensors," International Conference on Pervasive Computing, Apr. 2004, 18 pages.
E. M. Tapia et al., "Portable Wireless Sensors for Object Usage Sensing in the Home: Challenges and Practicalities," European Conference on Ambient Intelligence, Nov. 2007, 18 pages.
A. A. Veber et al, "Laser Vibrometry Based on Analysis of the Speckle Pattern from a Remote Object," Applied Physics B, vol. 105, Jun. 4, 2011, pp. 613-617.
J. F. Vignola et al., "Characterization of Silicon Micro-Oscillators by Scanning Laser Vibrometry," Review of Scientific Instruments, vol. 73, No. 10, Oct. 2002, pp. 3584-3588.
H. Wang et al., "Human Respiration Detection with Commodity WiFi Devices: Do User Location and Body Orientation Matter?" Proceedings of the 2016 ACM International Joint Conference on Pervasive and Ubiquitous Computing, Sep. 2016, pp. 25-36.
H. Wang et al., "RT-Fall: A Real-Time and Contactless Fall Detection System with Commodity WiFi Devices," IEEE Transactions on Mobile Computing, vol. 16, No. 2, Feb. 2017, pp. 511-526.
Z. Wang et al., "Wi-Fi CSI based Behavior Recognition: From Signals, Actions to Activities," IEEE Communications Magazine, vol. 56, No. 5, Nov. 2017, 10 pages.
D. Wilson et al., "Simultaneous Tracking and Activity Recognition (STAR) Using Many Anonymous, Binary Sensors," International Conference on Pervasive Computing, May 8, 2005, 18 pages.
R. Zhang et al., "Retrieval and Timing Performance of Chewing-Based Eating Event Detection in Wearable Sensors," Sensors, vol. 20, No. 2, Jan. 20, 2020, 17 pages.
Z. Zalevsky et al., "Simultaneous Remote Extraction of Multiple Speech Sources and Heart Beats from Secondary Speckles Pattern," Optics Express, vol. 17, No. 24, Nov. 2009, 15 pages.
C. Zhang et al., "RGB-D Camera-based Daily Living Activity Recognition," Signal & Information Processing Association Annual Summit and Conference, Jan. 2012, 7 pages.
Y. Zhang et al., "Vibrosight: Long-Range Vibrometry for Smart Environment Sensing," The 31st Annual ACM Symposium on User Interface Software and Technology, Oct. 2018, 12 pages.
Y. Zhang et al., "Occupant Activity Level Estimation Using Floor Vibration," Proceedings of the 2018 ACM International Joint Conference and 2018 International Symposium on Pervasive and Ubiquitous Computing and Wearable Computers, Oct. 2018, pp. 1355-1363.
Y. Zhang et al., "Wall++ Room-Scale Interactive and Context-Aware Sensing," Proceedings of the 2018 CHI Conference on Human Factors in Computing Systems, Apr. 2018, 15 pages.
Z. Zhou et al., "Activity Analysis, Summarization, and Visualization for Indoor Human Activity Monitoring," IEEE Transactions on Circuits and Systems for Video Technology, vol. 18, No. 11, Nov. 2008, pp. 1489-1498.
L. Zipser et al., "Laser-scanning Vibrometry for Ultrasonic Transducer Development," Sensors and Actuators A: Physical, vol. 110, Feb. 2004, pp. 264-268.
G. Bailly et al., "ShoeSense: A New Perspective on Hand Gestures and Wearable Applications," Proceedings of the SIGCHI Conference on Human Factors in Computing Systems, May 2012, pp. 1239-1248.

(56) References Cited

OTHER PUBLICATIONS

K.-M. Cheung et al., "Shape-From-Silhouette Across Time Part I: Theory and Algorithms," International Journal of Computer Vision, vol. 62, Nov. 1, 2004, 51 pages.
K.-M. Cheung et al., "Shape-From-Silhouette Across Time Part II: Applications to Human Modeling and Markerless Motion Tracking," International Journal of Computer Vision, vol. 63, Apr. 1, 2005, 39 pages.
L. Ballan et al., "Motion Capture of Hands in Action using Discriminative Salient Points," European Conference on Computer Vision, Oct. 2012, 14 pages.
B. G. Baumgart, "Geometric Modeling for Computer Vision," Technical Report, Stanford University, Prepared for Office of Naval Research, Oct. 1974, 144 pages.
J.-B. Chossat et al., "Wearable Soft Artificial Skin for Hand Motion Detection with Embedded Microfluidic Strain Sensing," IEEE International Conference on Robotics and Automation, May 2015, pp. 2568-2573.
S. Ciotti et al., "A Synergy-Based Optimally Designed Sensing Glove for Functional Grasp Recognition," Sensors, vol. 16, No. 811, Jun. 2, 2016, 17 pages.
R. Zhang et al., "Diet Eyeglasses: Recognising Food Chewing Using EMG and Smart Eyeglasses," 13th International Conference on Wearable and Implantable Body Sensor Networks, Jun. 2016, 6 pages.
M. De La Gorce et al., "Model-Based 3D Hand Pose Estimation from Monocular Video," IEEE Transactions on Pattern Analysis and Machine Intelligence, Sep. 1, 2011, 15 pages.
S. Zhang et al., "When Generalized Eating Detection Machine Learning Models Fail in the Field," Proceedings of the 2017 ACM International Joint Conference on Pervasive and Ubiquitous Computing and Proceedings of the 2017 ACM International Symposium on Wearable Computers, Sep. 2017, pp. 613-622.
G. Du et al., "Markerless Kinect-Based Hand Tracking for Robot Teleoperation," International Journal of Advanced Robotic Systems, vol. 9, Jul. 13, 2012, 10 pages.
R. Fukui et al., "Hand Shape Classification with a Wrist Contour Sensor: Development of a Prototype Device," Proceedings of the 13th International Conference on Ubiquitous Computing, Sep. 2011, pp. 311-314.
L. Ge et al., "Hand PointNet: 3D Hand Pose Estimation using Point Sets," Conference on Computer Vision and Pattern Recognition, Jun. 2018, pp. 8417-8426.
S. Zhang et al., "I Sense Overeating: Motif-based Machine Learning Framework to Detect Overeating Using Wrist-worn Sensing," Procedia Computer Science, vol. 00, 2017, pp. 1-16.
S. Zhang et al., "NeckSense: A Multi-Sensor Necklace for Detecting Eating Activities in Free-Living Conditions," Proceedings of the ACM on Interactive, Mobile, Wearable and Ubiquitous Technologies, vol. 4, No. 2, Jun. 2020, 47 pages.
O. Glauser et al., "A Stretch-Sensing Soft Glove for Interactive Hand Pose Estimation," ACM SIGGRAPH Emerging Technologies, Aug. 2019, 2 pages.
M. Holl et al., "Efficient Physics-Based Implementation for Realistic Hand-Object Interaction in Virtual Reality," IEEE Annual International Symposium Virtual Reality, Mar. 2018, 8 pages.
P. J. Huber, "Robust Estimation of a Location Parameter," Annals of Mathematical Statistics, vol. 335, No. 1, Mar. 1964, pp. 73-101.
U. Iqbal et al., "Hand Pose Estimation via Latent 2.5D Heatmap Regression," European Conference on Computer Vision, Sep. 2018, 17 pages.
B. Kellogg et al., "Bringing Gesture Recognition to All Devices," 11th USENIX Symposium on Networked Systems Design and Implementation, Apr. 2014, pp. 303-316.
S. Hochreiter et al., "Long Short-term Memory," Neural Computation, vol. 9, No. 8, Nov. 15, 1997, pp. 1735-1780.
H. Li et al., "Facial Performance Sensing Head-Mounted Display," ACM Transactions on Graphics, vol. 34, No. 4, Jul. 27, 2015, 9 pages.
J. A. Russell, "Is There Universal Recognition of Emotion From Facial Expression? A Review of the Cross-Cultural Studies," Psychological Bulletin, vol. 115, No. 1, Jan. 1994, pp. 102-141.
T. Maekawa et al., "WristSense: Wrist-worn Sensor Device with Camera for Daily Activity Recognition," Mar. 2012, pp. 510-512.
J. Li et al., "Identification and Classification of Construction Equipment Operators' Mental Fatigue Using Wearable Eye-tracking Technology," Automation in Construction, Pre-Published Version, Jul. 2020, 36 pages.
Y. Jin et al., "TransASL: A Smart Glass based Comprehensive ASL Recognizer in Daily Life," Proceedings of the 28th International Conference on Intelligent User Interfaces, Mar. 2023, pp. 802-818.
S. Iwakiri et al., "User Authentication Method for Wearable Ring Devices using Active Acoustic Sensing," Proceedings of the 2023 ACM International Symposium on Wearable Computers, Oct. 2023, pp. 17-21.

\* cited by examiner

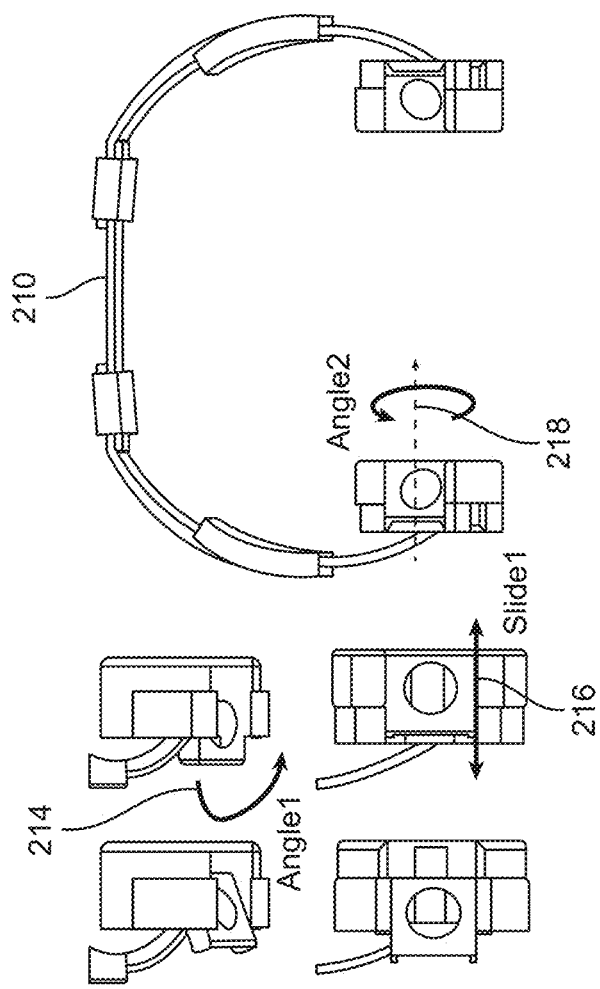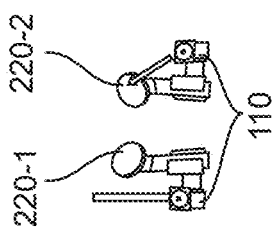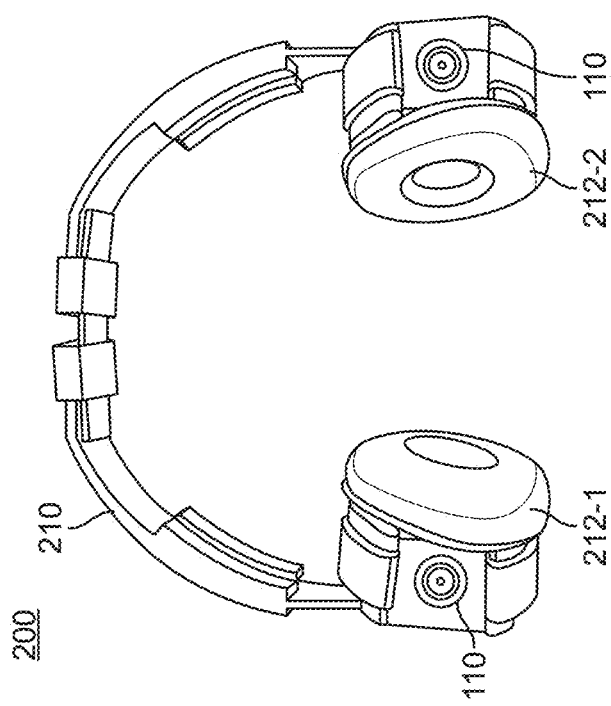
Figure 2A
Figure 2B

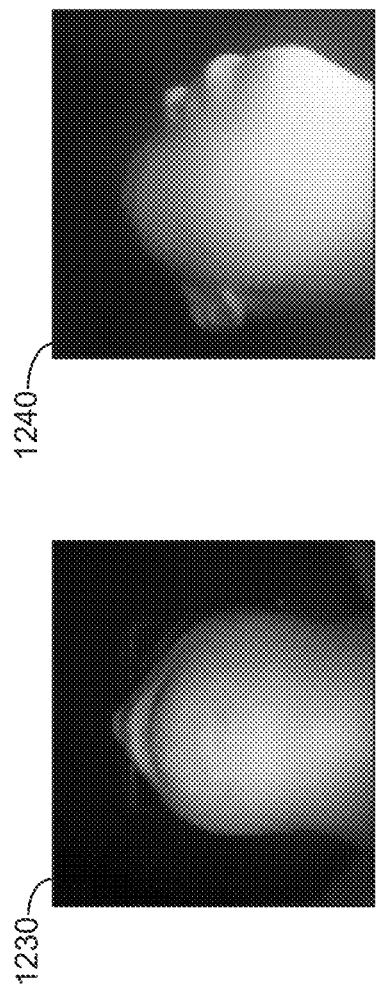
Figure 12B
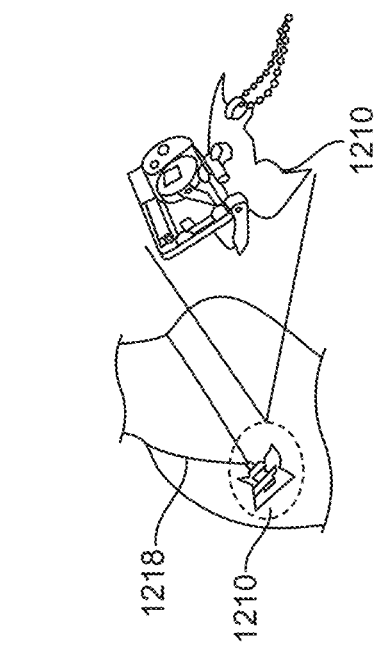
Figure 12C
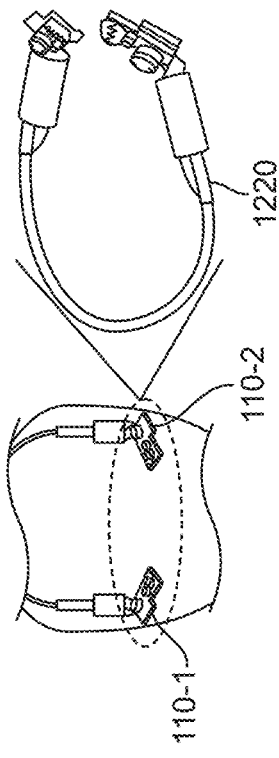
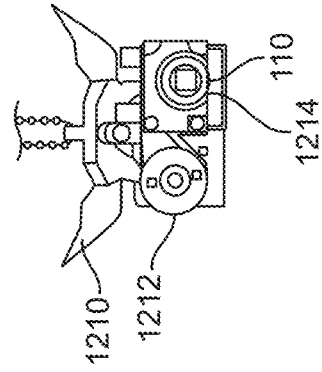
Figure 12A

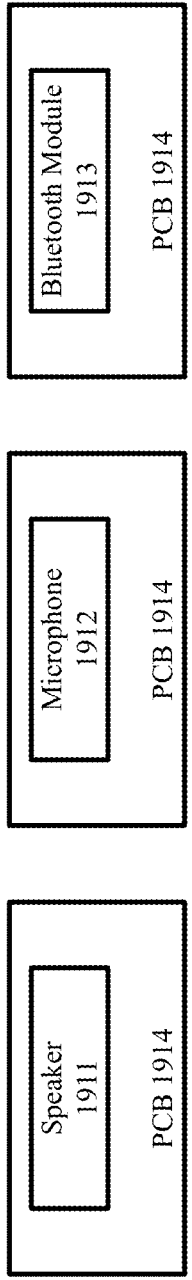
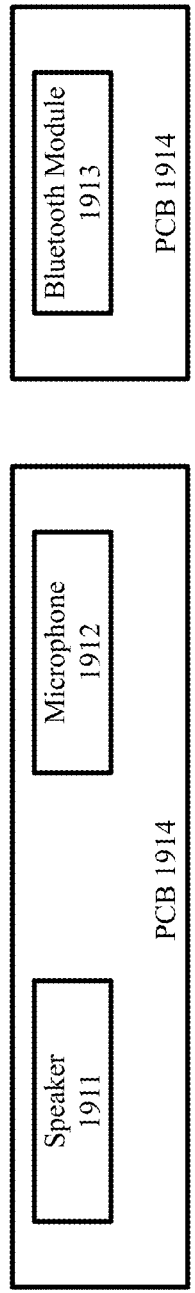
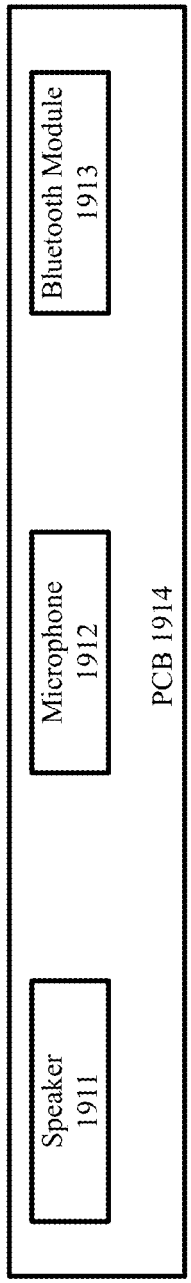
Figure 20A
Figure 20B
Figure 20C

WEARABLE FACIAL MOVEMENT TRACKING DEVICES

CROSS-REFERENCE TO RELATED APPLICATIONS

This application claims the benefit of U.S. Provisional Patent Application No. 63/343,023, filed May 17, 2022 and entitled "Wearable Facial Movement Tracking Devices" and is a continuation-in-part of PCT Patent Application No. PCT/US2021/032511, filed May 14, 2021 and entitled "Wearable Devices For Facial Expression Recognition," which claims the benefit of U.S. Provisional Patent Application No. 63/025,979, filed May 15, 2020 and entitled "C-Face: Continuously Reconstructing Facial Expressions By Deep Learning Contours Of The Face With Ear-Mounted Miniature Cameras." The entire contents of the above-identified priority applications are hereby fully incorporated herein by reference.

TECHNICAL FIELD

This disclosure relates to systems and methods to reconstruct facial expressions and to track facial movements from head or neck-mounted wearable devices.

BACKGROUND

Humans use facial expressions as a natural mode of communication. The ability to continuously record and understand facial movements can improve interactions between humans and computers in a variety of applications.

Conventional facial reconstruction methods require a camera to be positioned in front of a user's face with a specified position and angle relative to the user's face. To achieve reliable facial reconstruction, the camera needs an entire view of the face without occlusions. Conventional facial reconstruction methods do not perform well if the user is in motion, the camera is not appropriately set up, the camera is not in front of the user, or the user's face is partially occluded or not fully visible to the camera due to the camera's position or angle relative to the user's face.

As an alternative to frontal camera systems, wearable devices for facial expression reconstruction have been developed using sensing techniques, such as acoustic interference, pressure sensors, electrical impedance tomography, and electromyography. These wearable devices use instrumentation that is mounted directly on a user's face. These conventional devices often cover the user's face and only recognize discrete facial expressions. Examples of these conventional wearable devices include face masks with built-in ultrasonic transducers or electrodes secured to a human face with electromyography or capacitive sensing abilities. These wearable devices are attached directly to the user's face or body and may block the field of vision and interfere with normal daily activities, such as eating or socializing.

Another alternative to frontal camera systems is smart eyewear including smart glasses, augmented reality glasses, and virtual reality headsets. However, these smart eyewear devices cannot track high-quality facial movements continuously. For example, virtual reality devices cannot depict 3D avatars in virtual worlds with facial expressions of the user.

BRIEF DESCRIPTION OF THE DRAWINGS

FIGS. 2A and 2B are perspective views of head-mounted wearable devices for facial expression reconstruction.

FIGS. 12A, 12B, and 12C are perspective views of neck-mounted wearable devices for facial expression reconstruction.

FIG. 20A is a block diagram depicting a first embodiment of an acoustic sensor system. FIG. 20B is a block diagram depicting a second embodiment of an acoustic sensor system. FIG. 20C is a block diagram depicting a third embodiment of an acoustic sensor system.

DETAILED DESCRIPTION

Overview

Figure 1:
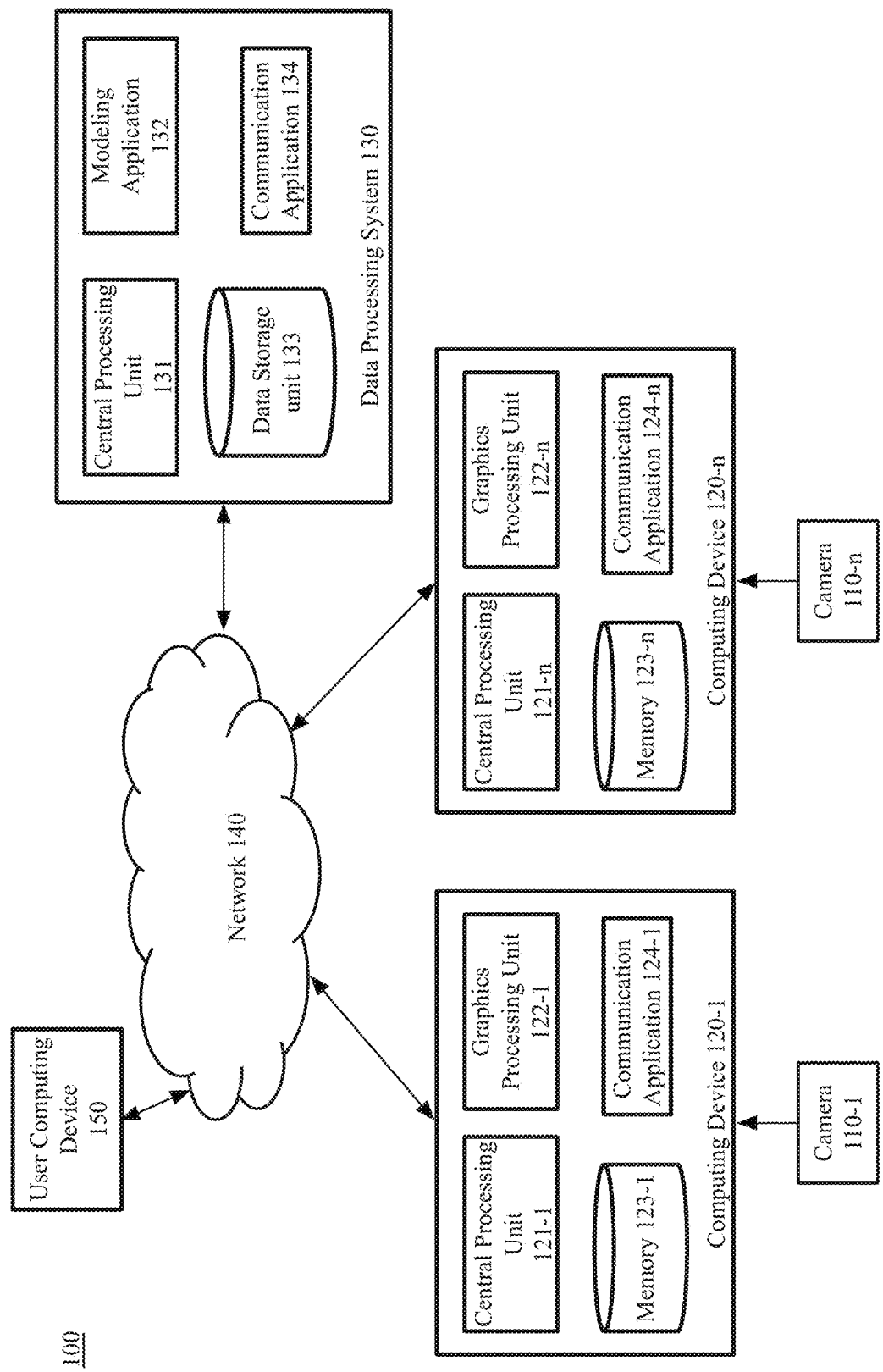
FIG. 1 is a block diagram depicting a facial expression reconstruction system.

The present technology allows reconstruction of facial expressions and tracking of facial movements using non-obtrusive, wearable devices that capture optical or acoustical images of facial contours, chin profiles, or skin deformation of a user's face. The wearable devices include head-mounted technology that continuously reconstruct full facial expressions by capturing the positions and shapes of the mouth, eyes, and eyebrows. Miniature cameras capture contours of the sides of the face, which are used to train a deep-learning model to predict facial expressions. An alternate embodiment of this technology includes a neck-mounted technology to continuously reconstruct facial expressions. Infrared cameras capture chin and face shapes underneath the neck, which are used to train a deep-learning model to predict facial expressions.

Additional embodiments include various camera types or acoustic imaging systems for the wearable devices. The acoustic imaging systems may comprise microphones and speakers. For example, the wearable devices may use the microphones and speakers to transmit and receive acoustical signals to determine skin deformation of a user. Full facial movements and expressions can be reconstructed from subtle skin deformations. The wearable devices may comprise ear mounted devices, eye mounted devices, or neck mounted devices.

The systems of this technology include wearable devices configured with miniature cameras or acoustical imaging systems in communication with computing devices to transmit images or acoustical signals from the cameras or acoustical imaging systems to a remote server, data acquisition system, or data processing device for facial expression reconstruction or to track facial movement. The wearable devices include headphone, earbud, necklace, neckband, glasses, virtual reality ("VR") headsets, augmented reality ("AR") headsets, and other form factors. Each of the form factors include miniature cameras or acoustical imaging systems and micro computing devices, such as Raspberry Pi™.

The exemplary headphone device includes two cameras and may include functionality with Bluetooth or Wi-Fi connectivity and speakers embedded within the earpieces of the headphone. The cameras are attached to the earpieces of the headphone device and are connected to a computing device to transmit acquired images to a remote server. The headphone device is configured to acquire images of the contours of a user's face by directing the cameras at adjustable angles and positions.

The exemplary earbud devices are constructed for wear as a left-side earbud and a right-side earbud. Both the left and right earbud devices include a camera to acquire images of the contours of a user's face. Each camera is connected to a computing device to transmit acquired images to a remote server.

The exemplary necklace device includes an infrared ("IR") camera with an IR LED and an IR bandpass filter. The necklace device is configured to acquire images of a user's chin profile by directing the camera at the profile of a user's chin. The IR LED projects IR light onto a user's chin to enhance the quality of the image captured by the camera. The IR bandpass filter filters visible light such that the camera captures infrared light reflected by a user's skin. The camera is connected a computing device to transmit acquired images to a remote server.

The exemplary neckband device includes two cameras fashioned to be positioned on the left and right sides of a user's neck. The neckband device includes IR LEDs and IR bandpass filters configured in proximity to each camera, similar to the necklace device. Each camera is connected a computing device to transmit acquired images to a remote server.

Using one of the wearable devices, facial expressions can be reconstructed from images acquired from the cameras within the devices. A data training set is created using frontal view images of a user in a machine learning algorithm. Multiple frontal view images of a user are acquired with a variety of facial expressions. The frontal view images are transmitted to a data processing system to create the data training set.

The wearable device captures one or more facial digital image(s) and transmits the digital images to data acquisition computing devices connected to each of the cameras of the wearable device. The data acquisition computing devices subsequently transmit the images to a remote server or data processing system. The data processing system reconstructs facial expressions using the images. The data processing system pre-processes the images by reducing the image size, removing noise from the image, extracting skin color from the background of the image, and binarizing each the image. In some embodiments, a wearable imaging system comprises one or more imaging sensor(s), wherein the one or more imaging sensor(s) are positioned to capture one or more image(s) with incomplete side contours of a face (for example, from ear(s) and/or from neck), a processor, and a non-transitory machine-readable storage medium comprising machine-readable instructions executed by the processor to extract a plurality of features (for example, landmarks or parameters) from the one or more image(s), compare the extracted features and/or changes of the extracted features with features from a ground truth, and output one or more recognition or prediction result(s), wherein the results comprise a word or a phrase spoken by a user, an emoji of a facial expression of a user, and/or a real-time avatar of a facial expression of a user.

The data processing system applies a deep-learning model to the pre-processed images for facial expression reconstruction. The reconstructed facial expressions may be used in applications such as silent speech and emoji recognition.

In an alternate embodiment, acoustic sensing technology can be used to reconstruct facial expressions using an array of microphones and speakers and deep-learning models. Acoustic sensing technology is small, lightweight and, therefore, suitable to mount to a variety of wearable devices. Facial movements may be tracked by detecting skin deformations observed from different positions on a user's head. When a user performs facial movements, the skin on the face deforms with unique patterns. Using acoustic sensing technology, skin deformations may be captured without capturing images of the entire face. The acoustic technology comprises a wearable device such as headphones, earbuds, necklaces, neckbands, and any other suitable form factors such that the microphones and speakers can be mounted or attached to the wearable device. The positions of the microphones and speakers may be adjustable to optimize the recording of reflected signals.

The acoustic wearable device actively sends signals from the speakers towards a user's face. The signals are reflected by the user's face and captured by the microphones on the acoustic wearable device. The signals are reflected differently back towards the microphones based on different facial expressions or movements. The acoustic wearable device sends the transmitted and reflected signals to a computing device for further processing. An echo profile is calculated based on the transmitted and reflected acoustic signals. The echo profile is calculated by calculating a cross-correlation between the received acoustic signals and the transmitted acoustic signals, which can display the deformations of the skin in temporal and spatial domains. The echo profile is input into a deep learning module to reconstruct the facial expressions of the user.

While acoustic sensing technology may be used to determine facial expressions by detecting skin deformations, acoustic sensing technology may also be used to directly determine other outputs associated with skin deformation without the need to first determine facial expressions. For example, the acoustic sensing technology may track blinking patterns and eyeball movements of a user. Blinking patterns and eyeball movements can be applied to the diagnosis and treatment processes of eye diseases. The acoustic sensing technology may detect movements of various parts of the face associated with speech, whether silent or voiced. While speaking, different words and/or phrases lead to subtle, yet distinct, skin deformations. The acoustic sensing technology can capture the skin deformation to recognize silent speech or to vocalize sound. The acoustic sensing technology may also be used to recognize and track physical activities. For example, while eating, a user opens the mouth, chews, and swallows. During each of those movements, the user's skin deforms in a certain way such that opening the mouth is distinguishable from chewing and from swallowing. The detected skin deformations may be used to determine the type and quantity of food consumed by a user. Similar to eating, a type and quantity of a consumed drink may be determined by skin deformation. The acoustic sensing technology may also be used to determine an emotional status of a user. An emotional status may be related to skin deformations. By detecting skin deformations, an emotional status can be determined and reported to corresponding applications.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples of the technology are described in detail.

FIG. 1 is a block diagram depicting a facial expression reconstruction system 100, in accordance with certain examples. As depicted in FIG. 1, the facial expression reconstruction system 100 comprises cameras 110-1 through 110-$n$, computing devices 120-1 through 120-$n$, data processing system 130, and user computing device 150. Computing devices 120, data processing system 130, and user computing device 150 are configured to communicate via a network 140.

In example embodiments, network 140 includes one or more wired or wireless telecommunications system(s) by which network devices may exchange data. For example, the network 140 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages.

Facial expression reconstruction system 100 comprises cameras 110 that may be any suitable sensors for capturing images. For example, cameras 110 may include depth cameras, red-green-blue ("RGB") cameras, infrared ("IR") sensors, acoustic cameras or sensors, speakers, microphones, thermal imaging sensors, charge-coupled devices ("CCDs"), complementary metal oxide semiconductor ("CMOS") devices, active-pixel sensors, radar imaging sensors, fiber optics, and any other suitable image device technology.

The image frame resolution of the camera 110 may be defined by the number of pixels in a frame. The image resolution of the camera 110 may comprise any suitable resolution, including of the following resolutions, without limitation: 32×24 pixels; 32×48 pixels; 48×64 pixels; 160× 120 pixels, 249×250 pixels, 250×250 pixels, 320×240 pixels, 420×352 pixels, 480×320 pixels, 640×480 pixels, 720× 480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. The resolution of the camera 110 may comprise a resolution within a range defined by any two of the preceding pixel resolutions, for example, within a range from 32×24 pixels to 250×250 pixels (for example, 249×250 pixels). In some embodiments, at least one dimension (the height and/or the width) of the image resolution of the camera 110 can be any of the following, including but not limited to 8 pixels, 16 pixels, 24 pixels, 32 pixels, 48 pixels, 72 pixels, 96 pixels, 108 pixels, 128 pixels, 256 pixels, 360 pixels, 480 pixels, 720 pixels, 1080 pixels, 1280 pixels, 1536 pixels, or 2048 pixels. The camera 110 may have a pixel size smaller than 1 micron, 2 microns, 3 microns, 5 microns, 10 microns, 20 microns, and the like. The camera 110 may have a footprint (for example, a dimension in a plane parallel to a lens) on the order of 10 mm×10 mm, 8 mm×8 mm, 5 mm×5 mm, 4 mm×4 mm, 2 mm×2 mm, or 1 mm×1 mm, 0.8 mm×0.8 mm, or smaller.

Each camera 110 is in communication with a computing device 120. Each camera 110 is configured to transmit images or data to a computing device 120. Each camera 110 may be communicatively coupled to a computing device 120. In an alternate example, each camera 110 may communicate wirelessly with a computing device 120, such as via near field communication ("NFC") or other wireless communication technology, such as Bluetooth, Wi-Fi, infrared, or any other suitable technology.

Computing devices 120 comprise a central processing unit 121, a graphics processing unit 122, a memory 123, and a communication application 124. In an example, computing devices 120 may be small, single-board computing devices, such as a Raspberry Pi™ device. Computing devices 120 function to receive images or data from cameras 110 and to transmit the images via network 140 to a data processing system 130.

Computing device 120 comprises a central processing unit 121 configured to execute code or instructions to perform the operations and functionality described herein, manage request flow and address mappings, and perform calculations and generate commands. Central processing unit 121 may be configured to monitor and control the operation of the components in the computing device 120. Central processing unit 121 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. Central processing unit 121 may be a single processing unit, multiple processing units, a single processing core, multiple processing cores, special purpose processing cores, co-processors, or any combination thereof. Central processing unit 121 along with other components of the computing device 120 may be a virtualized computing machine executing within one or more other computing machine(s).

Computing device 120 comprises a graphics processing unit 122 that serves to accelerate rendering of graphics and images in two- and three-dimensional spaces. Graphics processing unit 122 can process multiple images, or data, simultaneously for use in machine learning and high-performance computing.

Computing device 120 comprises a memory 123. Memory 123 may include non-volatile memories, such as read-only memory ("ROM"), programmable read-only memory ("PROM"), erasable programmable read-only memory ("EPROM"), flash memory, or any other device capable of storing program instructions or data with or without applied power. Memory 123 may also include volatile memories, such as random access memory ("RAM"), static random access memory ("SRAM"), dynamic random access memory ("DRAM"), and synchronous dynamic random access memory ("SDRAM"). Other types of RAM also may be used to implement memory 123. Memory 123 may be implemented using a single memory module or multiple memory modules. While memory 123 is depicted as being part of the computing device 120, memory 123 may be separate from the computing device 120 without departing from the scope of the subject technology.

Computing device 120 comprises a communication application 124. Communication application 124 interacts with web servers or other computing devices or systems connected via network 140, including data processing system 130.

Facial expression reconstruction system 100 comprises a data processing system 130. Data processing system 130 serves to receive images or data from cameras 110 via computing devices 120 and network 140. Data processing system 130 comprises a central processing unit 131, a modeling application 132, a data storage unit 133, and a communication application 134.

Data processing system 130 comprises central processing unit 131 configured to execute code or instructions to perform the operations and functionality described herein, manage request flow and address mappings, and perform calculations and generate commands. Central processing unit 131 may be configured to monitor and control the operation of the components in the data processing system 130. Central processing unit 131 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. Central processing unit 131 may be a single processing unit, multiple processing units, a single processing core, multiple processing cores, special purpose processing cores, co-processors, or any combination thereof. Central processing unit 131 along with other components of the data processing system 130 may be a virtualized computing machine executing within one or more other computing machine(s).

Data processing system 130 comprises a modeling application 132. The modeling application 132 employs a variety of tools, applications, and devices for machine learning applications. The modeling application 132 may receive a continuous or periodic feed of images or data from one or more of the computing device(s) 120, the central processing unit 131, or the data storage unit 133. Collecting the data allows the modeling application 132 to leverage a rich dataset to use in the development of a training set of data or ground truth for further use in facial expression reconstructions. The modeling application 132 may use one or more machine learning algorithm(s) to develop facial expression reconstructions, such as a convolution neural network ("CNN"), Naïve Bayes Classifier, K Means Clustering, Support Vector Machine, Apriori, linear regression, logistic regression, decision trees, random forest, or any other suitable machine learning algorithm.

Data processing system 130 comprises a data storage unit 133. Data storage unit 133 may be accessible by the modeling application 132 and the communication application 134. The example data storage unit 133 can include one or more tangible computer-readable storage device(s). The data storage unit 133 can be within the data processing system 130 or can be logically coupled to the data processing system 130. For example, the data storage unit 133 can include on-board flash memory and/or one or more removable memory device(s) or removable flash memory. In certain embodiments, the data storage unit 133 may reside in a cloud-based computing system.

Data processing system 130 comprises a communication application 134. Communication application 134 interacts with web servers or other computing devices or systems connected via network 140, include the computing devices 120 and user computing device 150.

User computing device 150 is a computing device configured to receive and communicate results of facial expression reconstruction or facial movement. The results of the facial expression reconstruction may be displayed as a graphical representation of a facial expression, such as 630 of FIG. 6, a predicted facial expression with three-dimensional visualization, such as 730 of FIG. 7, a three-dimensional facial expression, such as 1530A of FIG. 15, an emoji, text or audio representing silent speech recognition, or any other suitable display of facial expression reconstructions results. The user computing device 150 also may comprise a speaker to audibly communicate the facial expression reconstructions results directed to silent speech recognition. In an alternate embodiment by tracking facial movement, user computing device 150 may determine skin deformation or stretching and, subsequently, directly determine one or more of facial expression(s), eyeball movement, or eye-related disease. By tracking facial movement, user computing device 150 may recognize, or make audible, silent speech, and recognize and track human activities involving facial movements such as eating or drinking. By tracking facial movement, user computing device 150 may synthesize a user's voice or determine a user's emotional status.

FIGS. 2A and 2B are perspective views of head-mounted wearable devices 210, 220, respectively, for facial expression reconstruction, in accordance with certain examples.

FIG. 2A depicts a headphone-style wearable device 210 (herein referred to as headphone device 210) as a form factor to acquire images or data for use in facial expression reconstruction, in accordance with certain examples. Headphone device 210 comprises two cameras 110-1 and 110-2 to acquire images of a left and a right contour, respectively. Cameras 110 were previously described herein with reference to FIG. 1. In an example, headphone device 210 is a device constructed of a band 211 suitable to wear across the top of a user's head with a left-side ear piece 212-1 and a right-side ear piece 212-2. In an example, headphone device 210 may be over-the-ear headphones or outside-the-ear headphones. In an example, headphone device 210 may include functionality with Bluetooth or Wi-Fi connectivity and speakers embedded within the earpieces 212. Camera 110-1 is connected to left-side ear piece 212-1, and camera 110-2 is connected to right-side ear piece 212-2. In an alternate example, two cameras 110 are connected to each of the left-side ear piece 212-1 and right-side ear piece 212-2. Any suitable number of cameras may be connected to each of the ear pieces 212. Each camera 110 is in communication with a computing device 120, as previously described with respect to FIG. 1. In an example, computing device 120 may be connected to each camera 110 and be embedded within the headphone device 210. In an alternate example, each camera 110 may communicate with a computing device 120 via a wireless technology, such as Bluetooth or Wi-Fi.

Headphone device 210 is configured to acquire images of a left and a right contour of a user's face by directing cameras 110-1 and 110-2 at adjustable angles and positions. Each of the cameras 110 are independently adjustable by a first angle 214, a slide 216, and second angle 218. First angle 214 adjusts a tilt of the position of the camera 110 relative to a plane parallel to an exterior surface of a user's ear. The first angle 214 may be adjusted so that the camera 110/earpiece 212 assembly is tilted closer to a user's ear, or the first angle 214 may be adjusted so that the camera 110 via the earpiece 212 is tilted farther away or offset from a user's ear. In an example, first angle 214 may be 0° indicating that the camera 110/earpiece 212 assembly is in a vertical position relative to a plane parallel to the exterior surface of a user's ear. First angle 214 may be adjusted by −10°, −20°, −30°, −40°, or any suitable angle measure relative to the plane parallel to the exterior surface of a user's ear, such that each camera 110 may be aligned with the left and right contours of a user's face.

Slide 216 adjusts a position of the camera 110 relative to the earpiece 212 in a direction that is perpendicular to a plane parallel to the exterior surface of a user's ear, in other words, the position of the camera 110 may change along the slide 216 while the position of the earpiece 212 is fixed. The position of the camera 110 via the slide 216 may be adjusted such that the earpiece 212 is in close contact with an exterior surface of a user's ear. The position of the camera 110 via the slide 216 may be adjusted such that the camera 110 is extended a distance away from the plane parallel to the exterior surface of a user's ear. In an example, the extended distance may be 1 cm, 2 cm, 3 cm, or any suitable distance away from the plane parallel to the exterior surface of a user's ear. The slide 216 positions the cameras 110 in a manner similar to positioning the earpieces 212 of the headphone device 210. In some embodiments, the position of an imaging sensor or a camera (for example, the optical center of the lens in the camera) is less than 5 cm, less than 4 cm, less than 3 cm, less than 2 cm, less than 1 cm, or less than 0.5 cm away from the surface plane of a user's ear. In some embodiments, the position of an imaging sensor or a camera projected to the closest skin surface is within the region of a user's ear or less than 5 cm, less than 4 cm, less than 3 cm, less than 2 cm, or less than 1 cm away from the nearest contour edge of a user's ear. In some embodiments, the system comprises at least one, at least two, or at least three imaging sensors (for example, cameras) located in different positions as described above. In some embodiments, an imaging sensor, such as a camera, is positioned below a chin of a user and less than 25 cm, less than 20 cm, less than 15 cm, less than 10 cm, or less than 5 cm away from the chin of a user, or 2-30 cm below and away from the chin of the user.

Second angle 218 adjusts a rotational position of the camera 110 along a horizontal axis through earpieces 212-1 and 212-2. In an example, second angle 218 adjusts an angular position of the camera 110 relative to the horizontal axis while the position of the earpiece 212 remains unchanged. In an alternate example, second angle 218 adjusts an angular position of the camera 110/earpiece 212 assembly. Relative to a left or right contour of a user's face, second angle 218 may be 0° indicating that the camera 110 is in a horizontal position. A second angle 218 of 10° indicates that the camera 110 is directed 10° upwards. A second angle 218 of −10° indicates that the camera 110 is directed 10° downwards. Any suitable measure of second angle 218 may be used to align the cameras 110 with the contour of a user's face.

Each of the cameras 110 are independently adjustable by the first angle 214 and the second angle 218, by any suitable mechanism, for example, by mounting the cameras 110 to the headphone device 210 via rotational positioning devices allowing incremental changes of the direction of the cameras 110.

FIG. 2B depicts earbud-style wearable devices 220-1 and 220-2 (herein referred to as earbud devices 220) as a form factor to acquire images or data for use in facial expression reconstruction, in accordance with certain examples. Earbud device 220-1 is constructed for wear as a left-side earbud, and earbud device 220-2 is constructed for wear as a right-side earbud. In an example, earbud device 220 may be ear pods, earphones, or in-the-ear ("ITE") headphones. Earbud device 220-1 comprises a camera 110-1, and earbud device 220-2 comprises a camera 110-2 to acquire images of a left and a right contour, respectively, of a user's face by directing cameras 110-1 and 110-2 at the left and right contours of a user's face. Cameras 110-1 and 110-2 were previously described in reference to FIG. 1. In an example, earbud devices 220 may include functionality with Bluetooth or Wi-Fi connectivity and speakers embedded within the earbuds 220. Each camera 110 is in communication with a computing device 120, as previously described with respect to FIG. 1. In an example, a computing device 120 may be connected to each camera 110 and be embedded within each earbud device 220. In an alternate example, each camera 110 may communicate with a computing device 120 via a wireless technology, such as Bluetooth or Wi-Fi.

The camera 110 position for each earbud device 220 may be controlled by twisting and/or rotating the earbud device 220 in the user's ear. The earbud device 220 may be rotated such that the camera 110 is angled closer to the contour of a user's face. In an alternate example, the camera 110 may be attached to the earbud device 220 such that the camera 110 may be positioned independently of the earbud device 220. The camera 110 may be attached to the earbud device 220 with a ball and socket joint or any other suitable attachment method such that the position of the camera 110 may be adjusted independently of the earbud device 220.

Figure 3C:
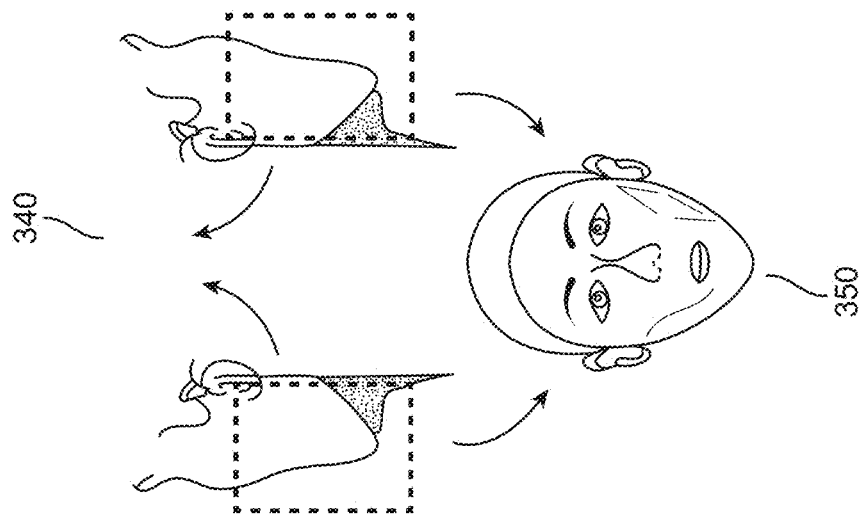
FIGS. 3A, 3B, and 3C are illustrations depicting examples of head-mounted wearable devices on a user.
Figure 3B:
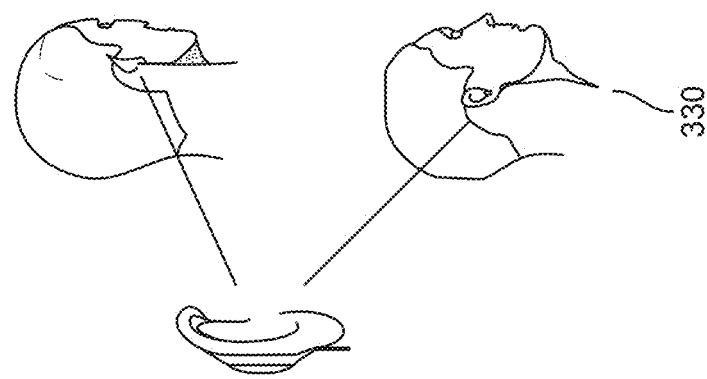
Figure 3A:
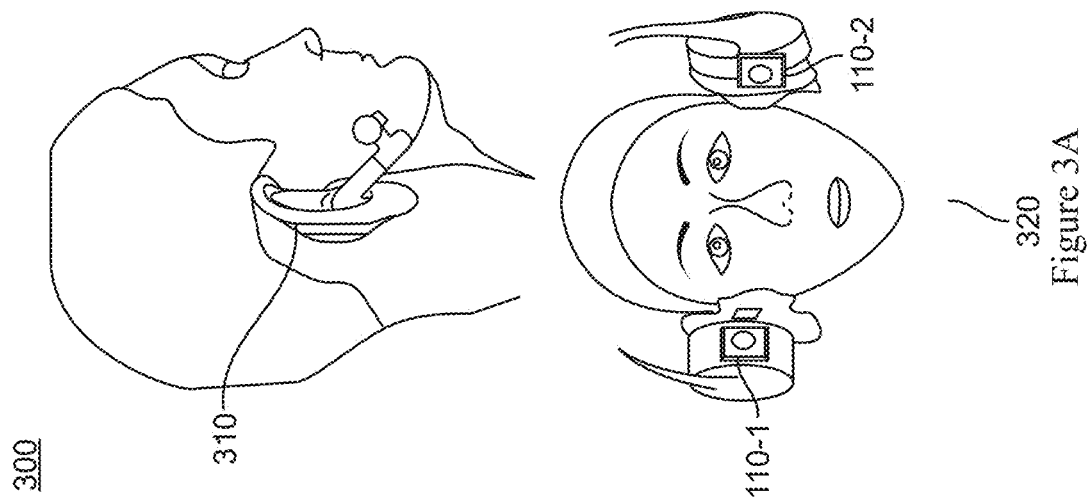

FIGS. 3A, 3B, and 3C are illustrations depicting examples 310-350 of head-mounted, wearable devices 210, 220 on a user, camera views 330, captured facial contours 340, and corresponding facial expressions 350, in accordance with certain examples. In FIG. 3A, earbuds 220 are illustrated in a closeup view of the back of a user's ear. Camera 110 of the earbuds 220 is illustrated in this example as being positioned in a forward direction towards a right contour of a user's face. Although not depicted in FIG. 3A, a second earbud 210 is worn by the user in the opposite, left ear, having a camera 110 positioned in a forward direction towards a left contour of the user's face.

Also, in FIG. 3A, alternative headphone 210 is illustrated in a closeup view from a front perspective of the user. Cameras 110-1 and 110-2 of the headphone 210 are illustrated in this example as being positioned in a forward direction towards left and right contours of a user's face.

FIG. 3B depicts a back and side view of a user to illustrate the contour of the user's face from the point of view of a camera 110 in either the earbud device 220 or headphone device 210 depicted in FIG. 3A.

FIG. 3C depicts the left and right contours of a user's face as captured by cameras 110 through the use of the headphone 210 or the earbuds 220. FIG. 3B also depicts the facial expression of a user a reconstructed through the images captured by cameras 110 through the use of the headphone 210 or the earbuds 220.

Figure 31:
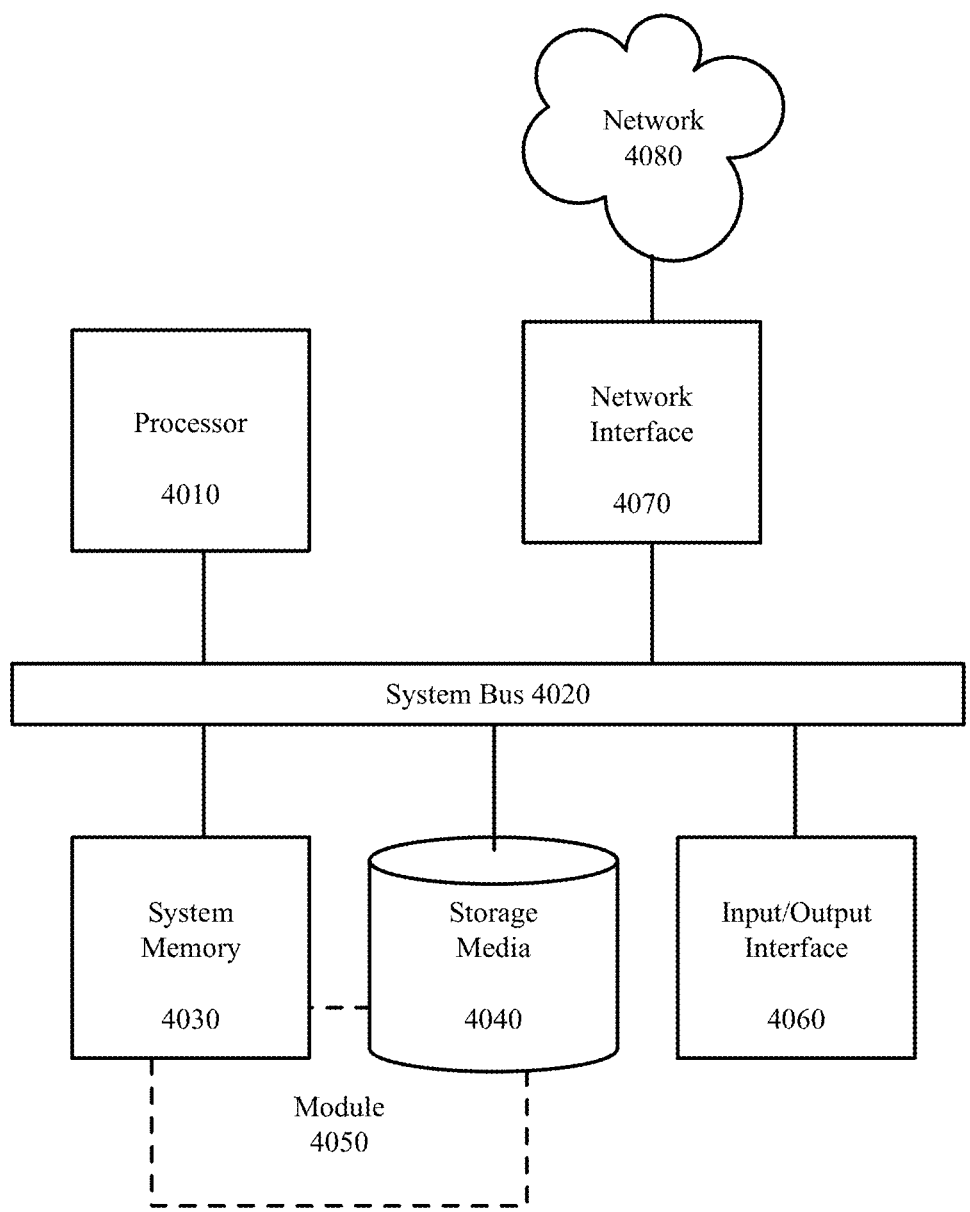
FIG. 31 is a block diagram depicting a computing machine and a module.

The computing devices 120, 130, and 150 and any other network computing devices other computing machines associated with the technology presented herein may be any type of computing machine, such as, but not limited to, those discussed in more detail with respect to FIG. 31. For example, each device can include any suitable processor-driven device.

Furthermore, any functions, applications, or components associated with any of these computing machines, such as those described herein or others (for example, scripts, web content, software, firmware, hardware, or modules) associated with the technology presented herein may be any of the components discussed in more detail with respect to FIG. 31.

The network connections illustrated are examples and other means of establishing a communications link between the computers and devices can be used. The computing machines discussed herein may communicate with one another, as well as with other computing machines or communication systems over one or more network(s). Each network may include various types of data or communications networks, including any of the network technology discussed with respect to FIG. 31.

Additionally, those having ordinary skill in the art having the benefit of the present disclosure will appreciate that the devices illustrated in the figures may have any of several other suitable computer system configurations.

Example Processes

The methods illustrated in FIGS. 4 through 11 are described hereinafter with respect to the components of facial expression reconstruction system 100, headphone device 210 of FIG. 2A, and earbud devices 220 of FIG. 2B. The methods of FIGS. 4 through 11 may also be performed with other systems and in other environments. The operations described with respect to FIGS. 4 through 11 can be implemented as executable code stored on a computer- or machine-readable, non-transitory, tangible storage medium (for example, floppy disk, hard disk, ROM, EEPROM, nonvolatile RAM, CD-ROM, etc.) that are completed based on execution of the code by a processor circuit implemented using one or more integrated circuit(s); the operations described herein also can be implemented as executable logic that is encoded in one or more non-transitory, tangible media for execution (for example, programmable logic arrays or devices, field programmable gate arrays, programmable array logic, application specific integrated circuits, etc.).

Figure 4:
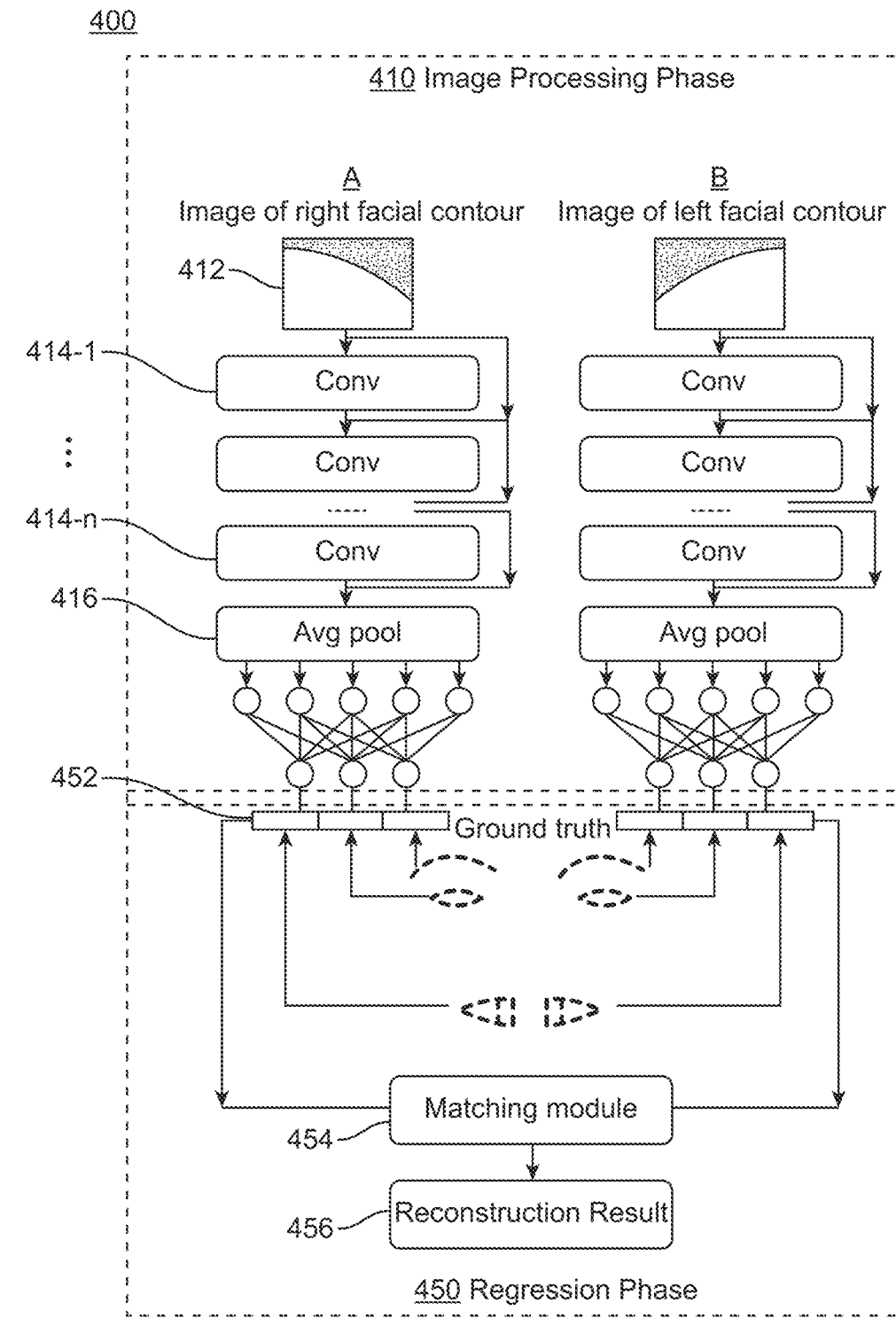
FIG. 4 is a block diagram depicting a deep-learning model process.

FIG. 4 is a block diagram depicting a deep-learning model process 400, in accordance with certain examples. The deep-learning model process 400 may be performed by the modeling application 132 of the data processing system 130, previously described herein in reference to FIG. 1. In an example where the machine learning algorithm is a convolution neural network ("CNN"), the deep-learning model process 400 receives images as an input and assigns importance (learnable weights and biases) to various aspects/objects in the images. The CNN reduces the images into a form that is easier to process without losing the features of the images that are used to get a good prediction. In the current example, the prediction is a reconstructed facial expression based on the received right and left contour facial images.

The deep-learning model process 400 comprises an image processing phase 410 and a regression phase 450. In the image processing phase 410, image processing is divided into two parallel paths. Path A is directed to processing an image of a right facial contour, and path B is directed to processing an image of a left facial contour. The right facial contour images and left facial contour images are processed independently of each other and combined in block 454 of the deep-learning model process 400.

In block 412, the data processing system 130 receives an input of an image of a right facial contour and an input of an image of a left facial contour. Example right facial contour images are depicted in row 640 of FIGS. 6 and 7, and example left facial contour images are depicted in row 650 of FIGS. 6 and 7. The images are transmitted through blocks 414-1 through 414-n. Blocks 414-1 through 414-n comprise layers of the CNN that include multiple convolution filtering operations. In an example, the CNN may comprise between 32 and 512 layers to extract features from the images. The first convolution layer in block 414-1 captures low-level features, such as edges, color, and gradient orientation. As the process progresses through the additional layers to layer 414-n, higher-level features are captured such that the object of the image is captured. In the current example, the object of the image is a facial contour.

From block 414-n, the process proceeds to block 416. Block 416 is a pooling layer. The pooling layer may be a Max Pooling that returns a maximum value from the image. The pooling layer may be an Average Pooling that returns an average of all of the values from the image. The pooling layer of block 416 outputs a vector representation of each input image (in other words, a right image vector for the right facial contour and a left image vector for the left facial contour).

The right image vector and the left image vector are received as inputs to the regression phase 450. Within the regression phase 450, the right image vector and the left image vector are inputs into two fully connected layers 452 with a rectified linear unit ("ReLU") between the fully connected layer 452. The fully connected layer 452 learns facial landmarks of the right image vector and the left image vector based on facial landmarks in a training data set, or ground truth, set of facial expressions. The fully connected layer 452 compares features of the right image vector to right side facial landmarks in the training data set of facial expressions to match the features of the right image vector to a right side facial expression in the training data set. Similarly, the fully connected layer 452 compares features of the left image vector to left side facial landmarks in the training data set of facial expressions to match the features of the left image vector to a left side facial expression in the training data set. The fully connected layer 452 outputs landmarks of both the right and left side of a user's face. The output landmarks are inputs to a matching module 454. The matching module 454 concatenates the landmarks from the right and left sides by aligning key landmarks that are present in both the right and left sides using translation and scaling. The matching module 454 outputs the final facial expression reconstruction, or predicted facial expression, as a set of facial landmarks as the reconstruction result in block 456. Examples of predicted facial expressions as a set of facial landmarks are depicted in row 630 of FIG. 6. In an alternate example, the facial expression reconstruction is further modeled to create a three-dimensional visualization of the predicted facial expression as depicted in row 730 of FIG. 7. The process 400 continues to repeat as additional right facial contour images and left facial contour images are received.

Figure 5:
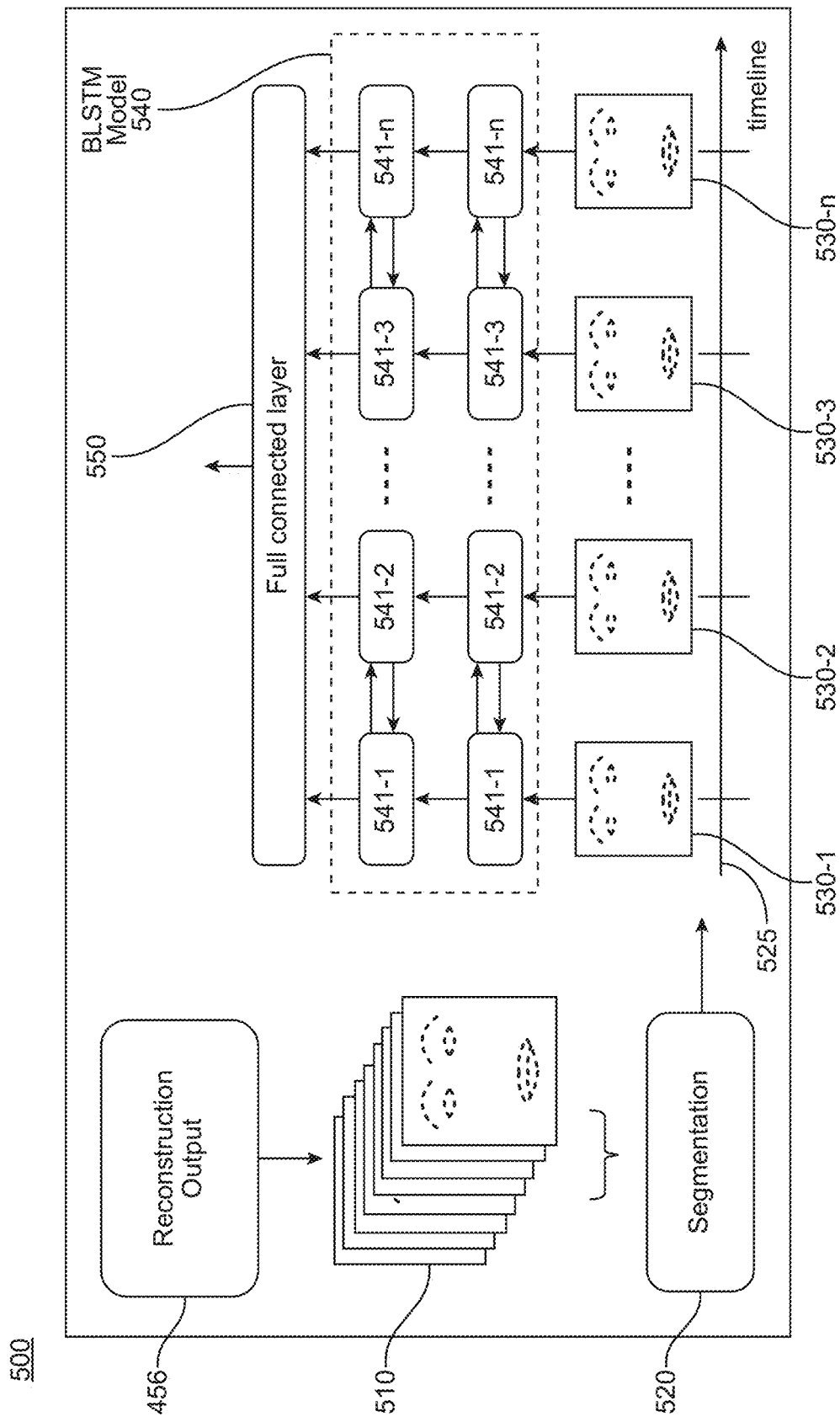
FIG. 5 is a block diagram depicting a classifier process.

FIG. 5 is a block diagram depicting a classifier process 500, in accordance with certain examples. The classifier process 500 classifies the facial expression reconstruction output 456 of the deep-learning model process 400 for use in applications such as silent speech recognition, emoji input, real-time avatar facial expressions, or other suitable applications. In block 510, the reconstruction output 456 from the deep-learning model process 400 (FIG. 4) is received as input to the classifier process 500. In block 510, a stream of landmark positions from the reconstruction output 456 are received as frames. In block 520, the landmark positions are segmented. Segmentation extracts an event from a stream of data and labels its start and end time. In the example of silent speech recognition, segmentation would identify the initial facial expression associated with the pronunciation of a word and the final facial expression associated with the pronunciation of the same word. For each frame, two indicators are calculated to measure the degree of transformation for the mouth and eyes, known as the Mouth Transformation Degree ("MTD") and Eye Transformation Degree ("ETD"). The MTD and ETD are calculated by summing the differences between the landmarks outlining the mouth or eye/eyebrow at the time and the landmarks of the natural facial expression. Then, a lowpass filter is applied to filter out high-frequency noise. When an event happens, the MTD or ETD raises to a single peak or a primary peak with several secondary peaks. A peaking seeking algorithm is applied to find the peaks in the stream. Thresholds are set for peak height, peak prominence, and peak width to filter peaks that may be associated with noise. After finding peak positions, the first-order difference of the ETD and MTD are calculated. In the first-order difference sequence, the left nearest peak to the event is labeled as the beginning, and the right nearest valley to the event is labeled as the end. The frames associated with the event are placed sequentially on a timeline 525 as frames 530-1 through frames 530-n.

After the sequential placement of frames 530-1 through 530-n, the process 500 proceeds to block 540 where the frames are inputs into a Bidirectional Long Short-Term Memory ("BLSTM") model for classification. Block 540 depicts a two-layer BLSTM model. However, any suitable number of layers may be used. The blocks 541-1 through 541-n depicted within the BLSTM model 540 are recurrently connected memory blocks. Each of the blocks 541 have feedback connections such that sequences of data can be processed as opposed to single images or data points. As depicted in block 540, blocks 541-1 through 541-n comprise bidirectional connections within each of the blocks 541 in each layer of block 540. Processing sequences of data allows for speech recognition, emoji recognition, real-time avatar facial expressions, or other suitable applications. The output from block 540 is a vector representation of the input frames.

In block 550, the vector representation is received by a fully connected layer comprising a SoftMax function. The SoftMax function transforms the vector representation into a probability distribution to predict a facial event. The output from block 550 is an encoding of a facial event class. The facial event classification may be a facial expression. In the example of silent speech recognition, the facial event classification may be the pronunciation of a specific word or phrase, such as "hello" or "how are you." In the example of emoji recognition, the facial event classification may be an emoji indicating a smiling face, a frowning face, a crying face, or any other suitable emoji associated with a facial expression. In the example of real-time avatar facial expressions, the facial event classification may be a three-dimensional visualization of a facial expression.

Figure 6:
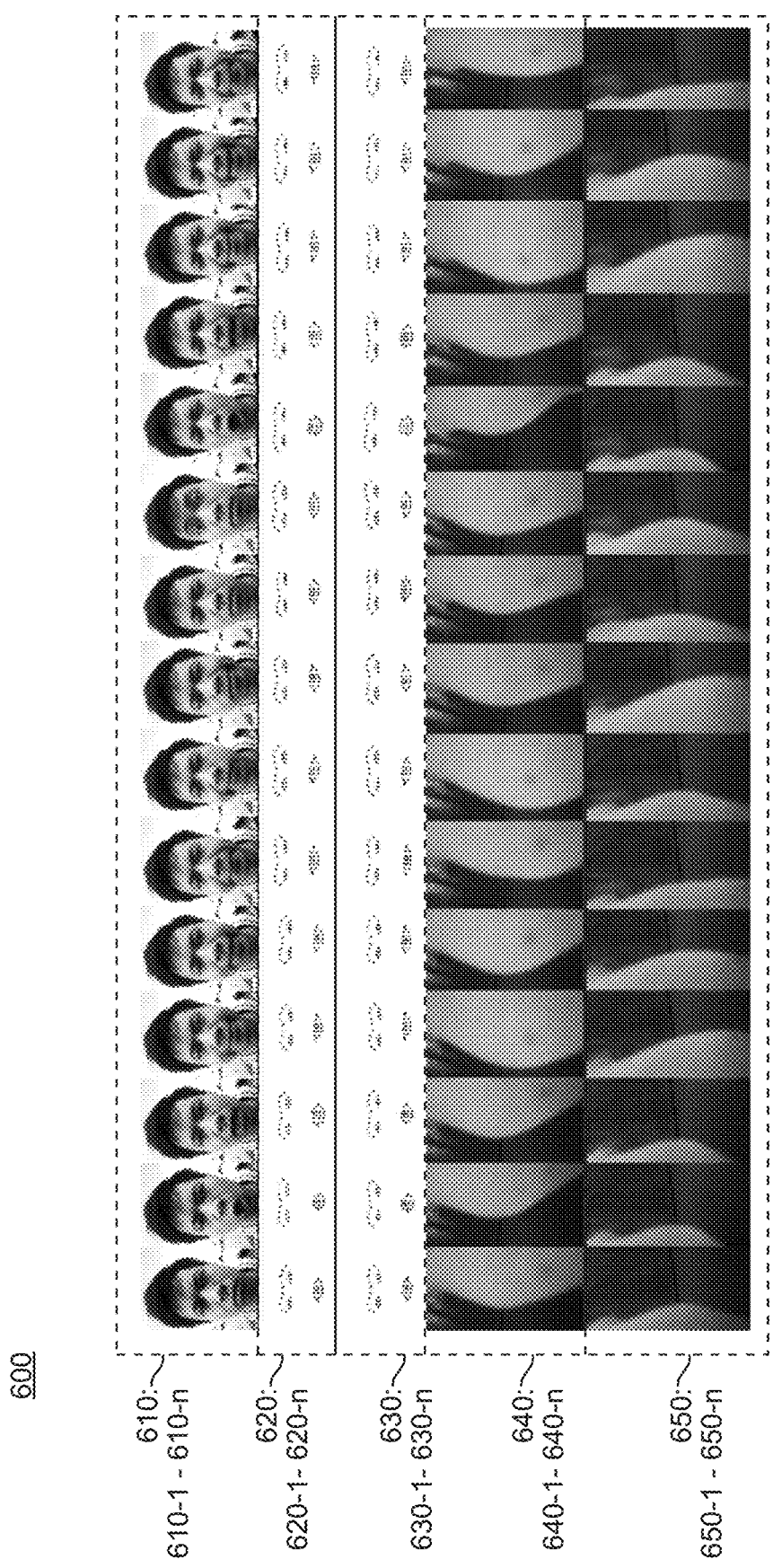
FIG. 6 is a diagram depicting the correlation between frontal view camera images, landmark training data, predicted facial expression landmarks, and right and left facial contour images.

FIG. 6 is a diagram 600 depicting the correlation between frontal view camera images 610, landmark training data 620, predicted facial expressions 630, and captured right and left facial contour images 640, 650, in accordance with certain examples. Row 610 illustrates frontal view camera images of a user. To construct a training data set or "ground truth," frontal view camera images of a user are acquired, via an imaging capturing device, with the user making various different facial expressions as depicted in images 610-1 through 610-n. The method to create the training data set from the frontal view camera images is described herein in greater detail with reference to method 810 of FIG. 9. Row 620 illustrates a training data set in the form of facial landmarks. The landmark training data images depicted in images 620-1 through 620-n correlate with images 610-1 through 610-*n*. The landmark training data images 620 are the output of method 810 of FIG. 9.

Row 640 depicts right facial contour images 640-1 through 640-*n* captured by a head-mounted, wearable device, such as headphone device 210 or earbud device 220 described herein with reference to FIG. 2. Row 650 depicts left facial contour images 650-1 through 650-*n* captured by a head-mounted, wearable device, such as headphone device 210 or earbud device 220 described herein with reference to FIG. 2. The right and left facial contour images 640, 650 are synchronized such that the images are representing the same facial expression. The synchronization of the images is described in greater detail herein with reference to block 1020 of FIG. 10. The synchronized images are used as inputs to the deep-learning process 400, previously described herein with reference to FIG. 4.

The right facial contour images 640, the left facial contour images 650, and the landmark training data images 620 are used in the deep-learning model process 400 to construct the predicted facial expressions in row 630. The predicted facial expressions 630 are depicted as landmark images in images 630-1 through 630-*n*. The predicted facial expressions 630 are illustrated in FIG. 6 beneath the landmark training data images 620 to illustrate the accuracy of predicting facial expressions using right facial contour images 640 and left facial contour images 650 acquired from headphone device 210 or earbud device 220.

Figure 7:
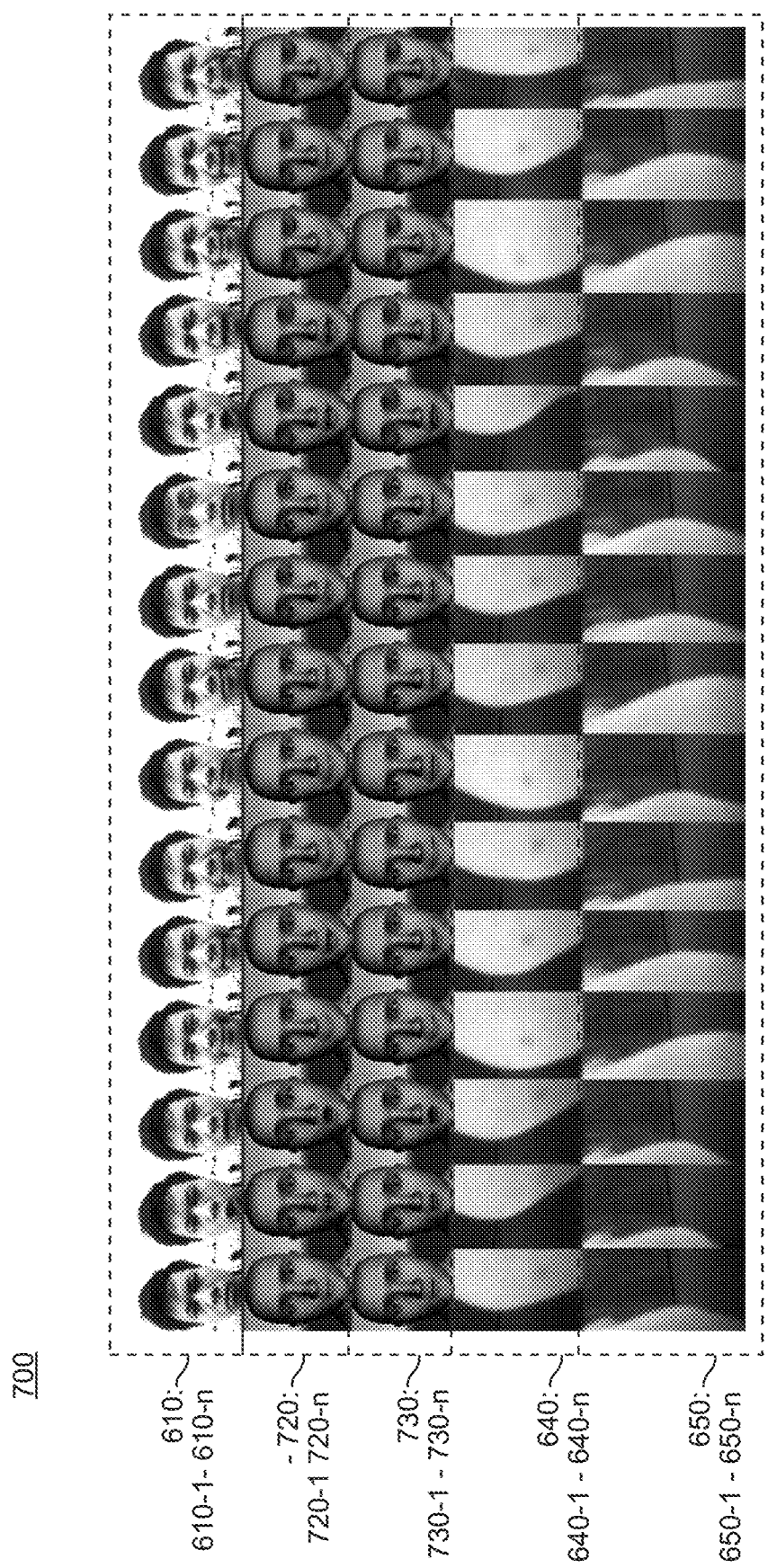
FIG. 7 is a diagram depicting the correlation between frontal view camera images, two-dimensional training data, predicted two-dimensional facial expressions, and right and left facial contour images.

FIG. 7 is a diagram 700 depicting the correlation between frontal view camera images 610, training data with three-dimensional visualization 720, predicted facial expressions with three-dimensional visualization 730, and right and left facial contour images 640, 650, in accordance with certain examples. FIG. 7 is an alternate embodiment of FIG. 6, wherein training data images with three-dimensional visualization are depicted in row 720 and predicted facial expressions with three-dimensional visualization are depicted in row 730. The training data images 720-1 through 720-*n* are correlated with predicted facial expression images 730-1 through 730-*n*. The three-dimensional visualizations depicted in blocks 720 and 730 are created using the facial landmarks described in rows 620 and 630 in reference to FIG. 6. The facial landmarks are input into a three-dimensional modeling application to create a three-dimensional visualization of the training data and the predicted facial expressions.

FIG. 6 and FIG. 7 present two-dimensional and three-dimensional correlations between training data and predicted facial expressions. Any suitable correlation can be made based on the type of camera used and the type of data collected. For example, correlations can be made based on imaging data such as thermal gradients or acoustic reflections.

Figure 8:
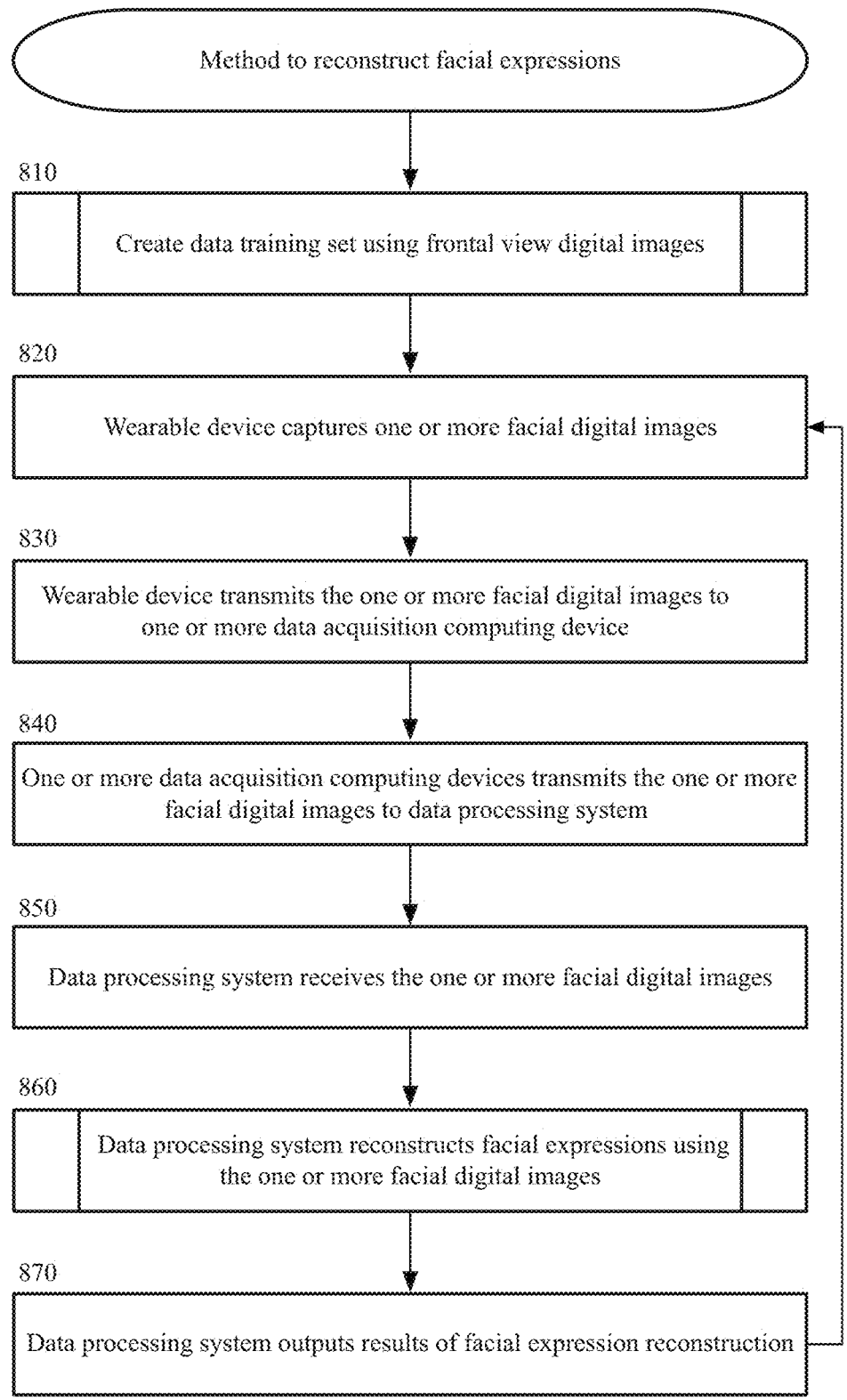
FIG. 8 is a block flow diagram depicting a method to reconstruct facial expressions.

FIG. 8 is a block flow diagram depicting a method 800 to reconstruct facial expressions, in accordance with certain examples. In block 810, a data training set is created using frontal view digital images. Block 810 is described in greater detail in method 810 of FIG. 9.

Figure 9:
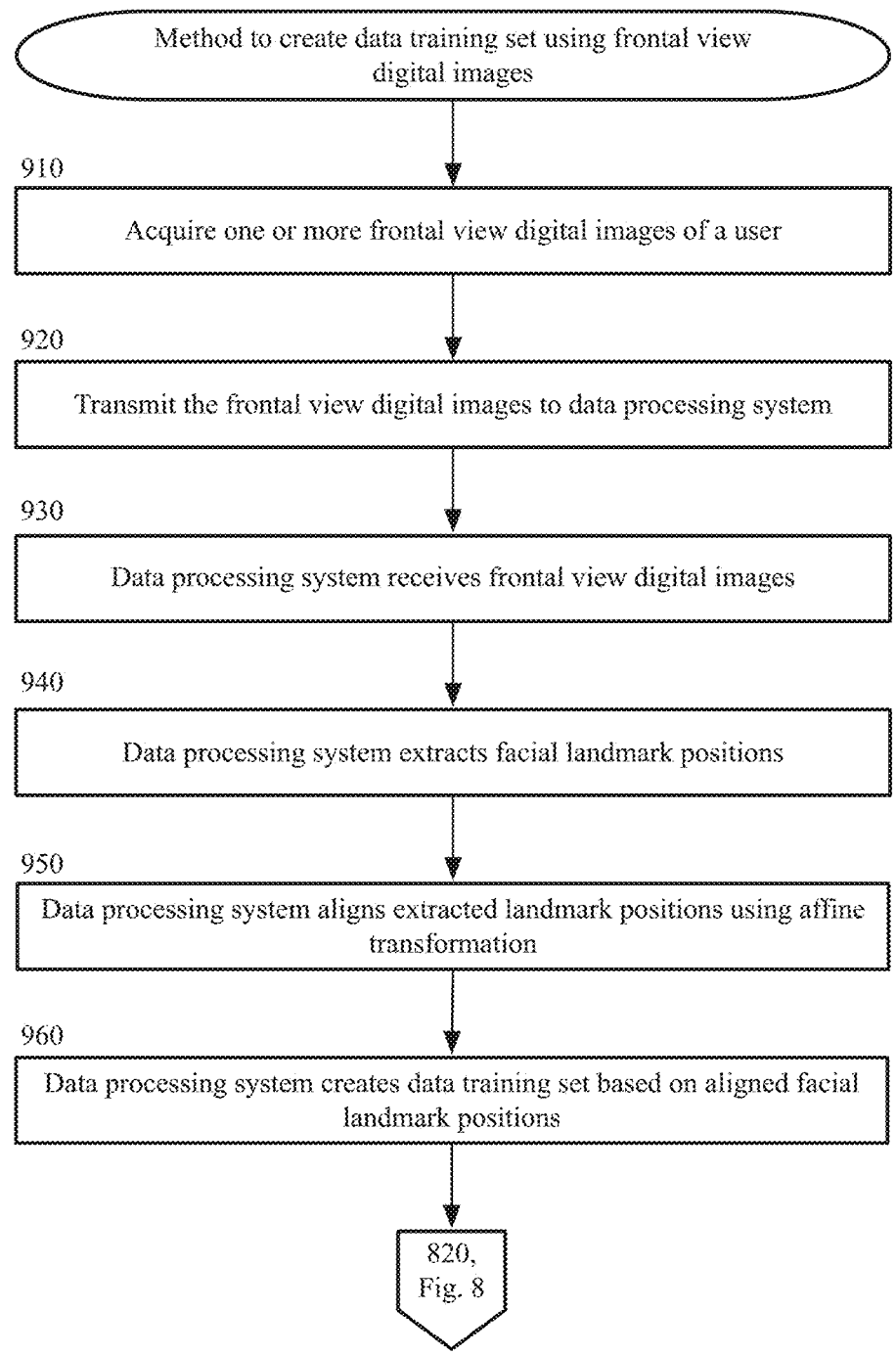
FIG. 9 is a block flow diagram depicting a method to create a data training set using frontal view digital images.

FIG. 9 is a block flow diagram depicting a method 810 to create a data training set using frontal view digital images, in accordance with certain examples. In block 910, one or more frontal view digital image(s) are acquired of a user. The one or more frontal view digital image(s) depict the user making a variety of facial expressions. For example, the user may smile, frown, squint, close one or both eyes, make an angry facial expression, raise one or both eyebrows, or any other suitable expressions such that the one or more frontal view digital image(s) represent a wide range of potential facial expressions. Example frontal view digital images are depicted in row 610 of FIG. 6. The user may take the one or more frontal view digital image(s) of himself, another person may take the one or more frontal view digital image(s), or any other suitable method to acquire the one or more frontal view digital image(s) may be used. The one or more frontal view digital image(s) may be taken by any device or sensor capable of capturing a digital image including, but not limited to, depth cameras, red-green-blue ("RGB") cameras, infrared ("IR") sensors, thermal imaging sensors, charge-coupled devices ("CCDs"), complementary metal oxide semiconductor ("CMOS") devices, active-pixel sensors, radar imaging sensors, fiber optics, and any other suitable image device technology.

In block 920, the frontal view digital images are transmitting to data processing system 130. The frontal view digital images may be transmitted to the data processing system 130 by a user's computing device, such as user computer device 150, or any other suitable device to transmit data.

In block 930, the data processing system 130 receives the frontal view digital images.

In block 940, the data processing system 130 extracts facial landmark positions. To extract the facial landmark positions, the data processing system 130 uses a computer vision library as a ground truth acquisition method. In an example, the computer vision library is a Dlib library. The computer vision library is used to extract key feature points or landmarks from the frontal view digital images. The computer vision library may extract 42, 68, or any suitable number of key feature points.

In block 950, the data processing system 130 aligns the extracted landmark positions using an affine transformation. Aligning the extracted landmark positions accounts for variations in a user's head position in the frontal view digital images. When a user acquires the frontal view digital images as described in block 910, the same facial expressions may vary if the user slightly changes his face orientation. To align the extracted landmark positions, a set of landmarks are selected whose relative positions change very little when making facial expressions. For example, the selected landmarks may be one or more of a right canthus, left canthus, or apex of the nose. The selected landmarks are used to calculate an affine matrix for each frontal view digital image. The landmark positions are aligned to the same range to reduce the influence of head position change when the frontal view digital images are acquired.

In block 960, the data processing system 130 creates the data training set based on the aligned facial landmark positions. In an example, after the extracted landmark positions are aligned, the data processing system 130 selects the most informative feature points from the extracted landmark positions. In an example, the Dlib library may extract 68 facial landmarks from each of the frontal view digital images. When making facial expressions, changes mainly occur in the areas around the mouth, eyes, and eyebrows. The less informative features points may be removed, leaving a smaller set of facial landmarks, such as 42 facial landmarks. Any suitable number of facial landmarks may be used. The data training set is the set of the most informative landmark positions for each facial expression from each of the frontal view digital images. Example data training set images are depicted in row 620 of FIG. 6. In an alternate example, the facial expression reconstruction is further modeled to create a three-dimensional visualization of the training data images as depicted in row 720 of FIG. 7. In an example, the data processing system saves the data training set in the data storage unit 133. In some embodiments, the system may extract information of at least 10, at least 20, at least 30, at least 40, at least 50, at least 60, at least 70, at least 80, at least 90, or at least 100 parameters or features from one or more image(s) captured by one or more imaging sensor(s) for a facial expression, wherein the parameters or features comprise facial landmark positions, shape parameters (for example, blendshape parameters), orientations (for example, head orientations), or any combination thereof.

FIG. 6 depicts frontal view digital images of a user at row 610, which are used to create the corresponding data training set depicted in row 620. In an alternate example, training data with three-dimensional visualization, as depicted in row 720 of FIG. 7, may be utilized. Any suitable method or visualization may be used to create the data training set.

From block 960, the method 810 returns to block 820 of FIG. 8.

Referring back to FIG. 8, in block 820, a wearable device captures one or more facial digital image(s). In an example, the wearable device may be a head-mounted device, such as headphone device 210 or earbud device 220, previously described herein with reference to FIG. 2. The head-mounted device is configured to capture right facial contour images and left facial contour images of a user's face directed towards the right and left cheekbones using two or more cameras 110. In the current example, the right and left facial contour images are two-dimensional images of the contour of a user's face. Example right and left facial contour images are depicted in rows 640 and 650, respectively, of FIGS. 6 and 7.

In an alternate example, the wearable device may be a neck-mounted device such as necklace device 1210 or neckband device 1220, described hereinafter with reference to FIG. 12. The neck-mounted device is configured to take digital images of the contour of a user's face directed towards the user's chin using one or more camera(s) 110.

In block 830, the wearable device transmits the one or more facial digital image(s) to one or more data acquisition computing device(s) 120. As depicted and described in reference to FIG. 1, each camera 110 is in communication with a data acquisition computing device 120.

In block 840, the one or more data acquisition computing device(s) 120 transmit the one or more facial digital image(s) to the data processing system 130.

In block 850, the data processing system 130 receives the one or more facial digital image(s).

In block 860, the data processing system 130 reconstructs facial expressions using the one or more facial digital image(s). Block 860 is described in greater detail herein with reference to method 860 of FIG. 10.

Figure 10:
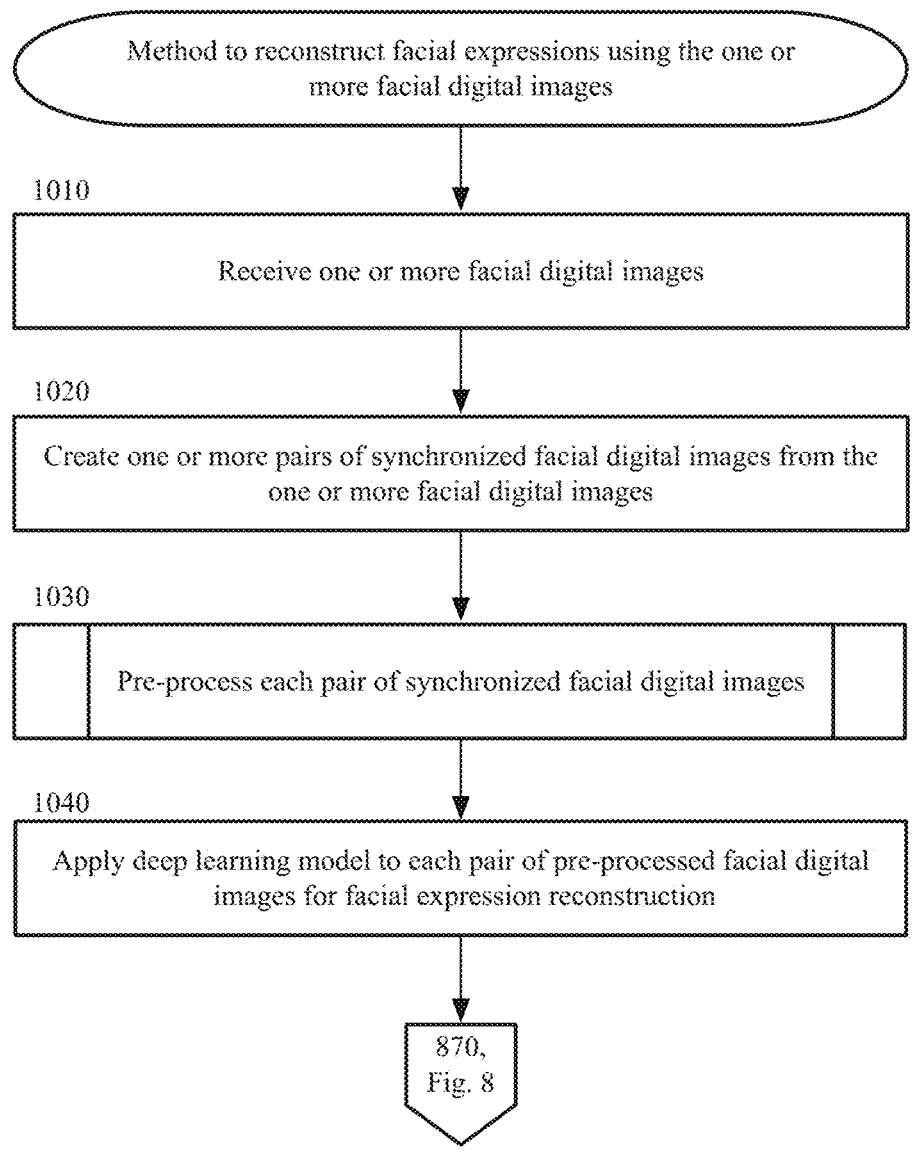
FIG. 10 is a block flow diagram depicting a method to reconstruct facial expressions using one or more facial digital image(s).

FIG. 10 is a block flow diagram depicting a method 860 to reconstruct facial expressions using one or more facial digital image(s), in accordance with certain examples. The examples of FIG. 10 are directed to the method to reconstruct facial expressions from one or more facial digital image(s) received from a head-mounted wearable device. An alternate method to reconstruct facial expressions from one or more facial digital image(s) received from a neck-mounted wearable device is described herein with reference to method 860' of FIG. 17.

In block 1010, the data processing system 130 receives the one or more facial digital image(s).

In block 1020, the data processing system 130 creates one or more pair(s) of synchronized facial digital images from the one or more facial digital image(s). In the example where the one or more facial digital image(s) are acquired from a head-mounted wearable device, the wearable device captures right facial contour images and left facial contour images. To accurately reconstruct a facial expression of a user, the data processing system 130 synchronizes the images from the left camera 110-1 and the right camera 110-2 such that each pair of right and left facial contour images represents a particular facial expression.

In block 1030, the data processing system 130 pre-processes each pair of synchronized facial digital images. Block 1030 is described in greater detail herein with reference to method 1030 of FIG. 11.

Figure 11:
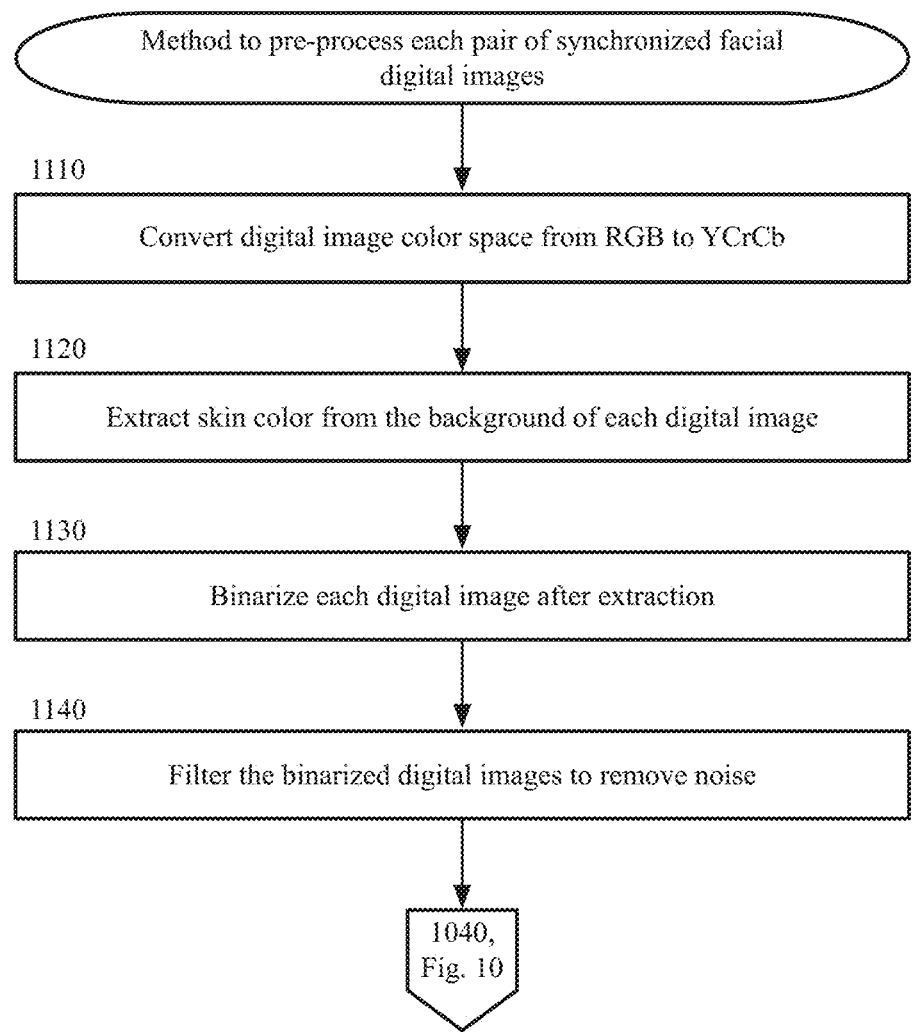
FIG. 11 is a block flow diagram depicting a method to pre-process each pair of synchronized facial digital images.

FIG. 11 is a block flow diagram depicting a method 1030 to pre-process each pair of synchronized facial digital images, in accordance with certain examples. In block 1110, the data processing system 130 converts a digital image color space of each pair of synchronized facial digital images from a red-green-blue ("RGB") color space to a luminance, chrominance (red-yellow), chrominance (blue-yellow) ("YCrCb") color space. The YCrCb color space is used to take advantage of a lower resolution with respect to luminosity amount of data stored with respect to each pair of synchronized facial digital images. The conversion from the RGB color space to the YCrCb color space is accomplished using a standard process.

In block 1120, the data processing system 130 extracts skin color from the background of each converted pair of facial digital images. In an example, the skin color is extracted using Otsu's thresholding method. Otsu's thresholding method determines whether pixels in an image fall into a foreground or a background. In the current example, the foreground represents a facial contour of each facial digital image, and the background represents an area of the image outside of the facial contour.

In block 1130, the data processing system 130 binarizes each facial digital image after the extraction of the skin color from the background. Image binarization is the process of taking the image in YCrCb color space and converting it to a black and white image. The binarization of the image allows for an object to be extracted from an image, which in this example is a facial contour.

In block 1140, the data processing system 130 filters the binarized digital images to remove noise from the images. Filtering the binarized digital images produces a smoother image to assist in more accurate facial expression reconstructions.

From block 1140, the method 1030 returns to block 1040 of FIG. 10. Referring back to FIG. 10, in block 1040, the data processing system 130 applies a deep-learning model to each pair of pre-processed facial digital images for facial expression reconstruction. The deep-learning model for facial expression reconstruction was described in detail herein in the deep-learning model process 400 with reference to FIG. 4 and in the classifier process 500 with reference to FIG. 5. The results of the facial expression reconstruction from block 1040 may include the reconstruction output from block 456 of FIG. 4 and/or the encoding of a facial event class from block 550 of FIG. 5. For example, the data processing system 130 may output from block 1040 the landmark images from the process 400 of FIG. 4. The data processing system 130 also, or alternatively, may further process the facial expression reconstruction such that the output from block 1040 comprises a three-dimensional visualization of the facial expression, silent speech recognition, an emoji associated with the facial expression reconstruction, and/or real-time avatar facial expressions associated with the facial expression reconstruction, such as described by the classifier process 500 of FIG. 5.

From block 1040, the method 860 returns to block 870 of FIG. 8. Referring back to FIG. 8, in block 870, the data processing system 130 outputs the results of the facial expression reconstruction. In an example, the results may be sent to user computing device 150 to be displayed visually or audibly to a user. In an example, the results of the facial expression reconstruction may be displayed as a graphical representation of a facial expression, such as row 630 of FIG. 6; a predicted facial expression with three-dimensional visualization, such as row 730 of FIG. 7; a three-dimensional facial expression, such as row 1530A of FIG. 15; an emoji; text representing silent speech recognition; or any other suitable display of facial expression reconstructions results. User computing device 150 may comprise a speaker to audibly communicate the facial expression reconstructions results directed to silent speech recognition.

From block 870 of FIG. 8, the method 800 returns to 820 where the method 800 repeats the process of reconstructing facial expressions by capturing additional facial digital images.

Other Example Architectures

FIGS. 12A, 12B, and 12C are perspective views of neck-mounted wearable devices 1210, 1220 for facial expression reconstruction with example IR images 1230 and 1240, in accordance with certain examples.

FIG. 12A depicts a necklace style neck-mounted wearable device 1210 (herein referred to as necklace device 1210) as a form factor to acquire images or data for use in facial expression reconstruction. Necklace device 1210 comprises a camera 110, previously described herein in reference to FIG. 1. In the current example, camera 110 is an infrared ("IR") camera. Necklace device 1210 also comprises an IR LED 1212 and an IR bandpass filter 1214. Necklace device 1210 is configured to acquire images of a user's chin profile by directing the camera 110 at the profile of a user's chin. The IR LED 1212 projects IR light onto a user's chin to enhance the quality of the image captured by camera 110. The IR bandpass filter 1214 filters visible light such that camera 110 captures infrared light reflected by the skin of a user.

Necklace device 1210 comprises a chain 1218 or other suitable device for securing the necklace device 1210 about the neck of a user. In an alternate example, necklace device 1210 may attach to a user's clothing instead of being secured about the neck of a user. In the current example, necklace device 1210 may be attached to a user's clothing underneath the user's chin. In an alternate example, multiple necklace devices 1210 may be attached to a user's clothing to capture camera 110 images from multiple viewpoints. In the current example, a necklace device 1210 may be attached on a user's clothing close to each shoulder of the user. The necklace device 1210 may comprise a clip, a pin, a clasp, or any other suitable device to attach necklace device 1210 to a user's clothing.

The camera 110 is in communication with a computing device 120, as previously described with respect to FIG. 1. In an example, a computing device 120 may be connected to the camera 110 and be embedded within the necklace device 1210. In an alternate example, the camera 110 may communicate with a computing device 120 via a wireless technology, such as Bluetooth or Wi-Fi.

FIG. 12B depicts a neckband style neck-mounted wearable device 1220 (herein referred to as neckband device 1220) as a form factor to acquire images or data for use in facial expression reconstruction. Neckband device 1220 comprises two cameras 110-1 and 110-2 fashioned to be positioned on the left and right sides of a user's neck. Neckband device 1220 also comprises IR LEDs and IR bandpass filters configured in proximity to each camera 110-1 and 110-2 (not depicted in FIG. 12). In an example, neckband device 1220 may include functionality with Bluetooth or Wi-Fi connectivity and speakers embedded within the neckband 1220. Each camera 110 is in communication with a computing device 120, as previously described with respect to FIG. 1. In an example, a computing device 120 may be connected to each camera 110 and be embedded within the neckband device 1220. In an alternate example, each camera 110 may communicate with a computing device 120 via a wireless technology, such as Bluetooth or Wi-Fi.

FIG. 12C depicts two example IR images 1230 and 1240. Example 1230 is an IR image acquired from necklace device 1210. Example 1240 is a right camera 110 IR image acquired from neckband device 1220. Additional examples of IR images acquired by either necklace device 1210 or neckband device 1220 are depicted in row 1540A of FIG. 15A and row 1540B of FIG. 15B.

Figure 13A:
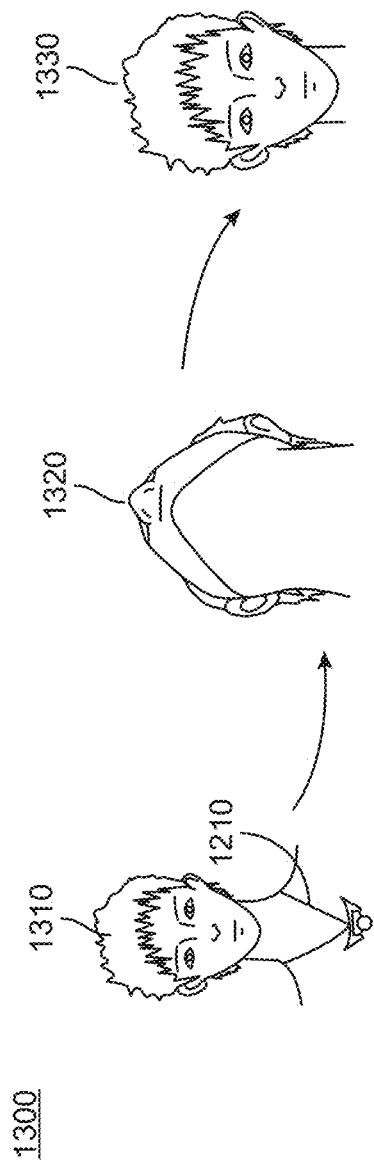
FIGS. 13A and 13B are illustrations depicting examples of neck-mounted wearable devices on a user.
Figure 13B:
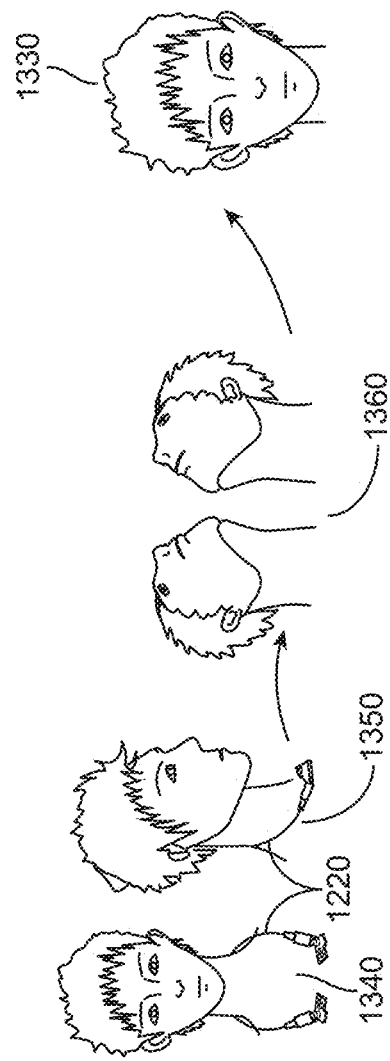

FIGS. 13A and 13B are illustrations 1300 depicting examples 1310-1360 of neck-mounted wearable devices 1210, 1220 on a user, camera views 1320 and 1360, and corresponding facial expressions 1330, in accordance with certain examples. In FIG. 13A, example 1310 illustrates a necklace device 1210 as being worn by a user in a front view of the user. Example 1320 illustrates a view of the user as captured by camera 110 of the necklace device 1210. The corresponding example 1330 illustrates a reconstructed facial expression based on IR images captured by the necklace device 1210.

In FIG. 13B, example 1340 illustrates a neckband device 1220 as being worn by a user in a front view of the user. Example 1350 illustrates a neckband device 1220 as being worn by a user in a right-side view of the user. Example 1360 illustrates two views of the user as captured by cameras 110-1 and 110-2 of the neckband device 1220. The corresponding example 1330 illustrates a reconstructed facial expression based on IR images captured by the necklace device 1220.

Other Example Processes

The methods illustrated in FIGS. 14 through 18 are described hereinafter with respect to the components of facial expression reconstruction system 100, necklace device 1210 of FIG. 12A, and neckband device 1220 of FIG. 12B. The methods of FIGS. 14 through 18 may also be performed with other systems and in other environments. The operations described with respect to FIGS. 14 through 18 can be implemented as executable code stored on a computer- or machine-readable, non-transitory, tangible storage medium (for example, floppy disk, hard disk, ROM, EEPROM, nonvolatile RAM, CD-ROM, etc.) that are completed based on execution of the code by a processor circuit implemented using one or more integrated circuit(s); the operations described herein also can be implemented as executable logic that is encoded in one or more non-transitory, tangible media for execution (for example, programmable logic arrays or devices, field programmable gate arrays, programmable array logic, application specific integrated circuits, etc.).

Figure 14:
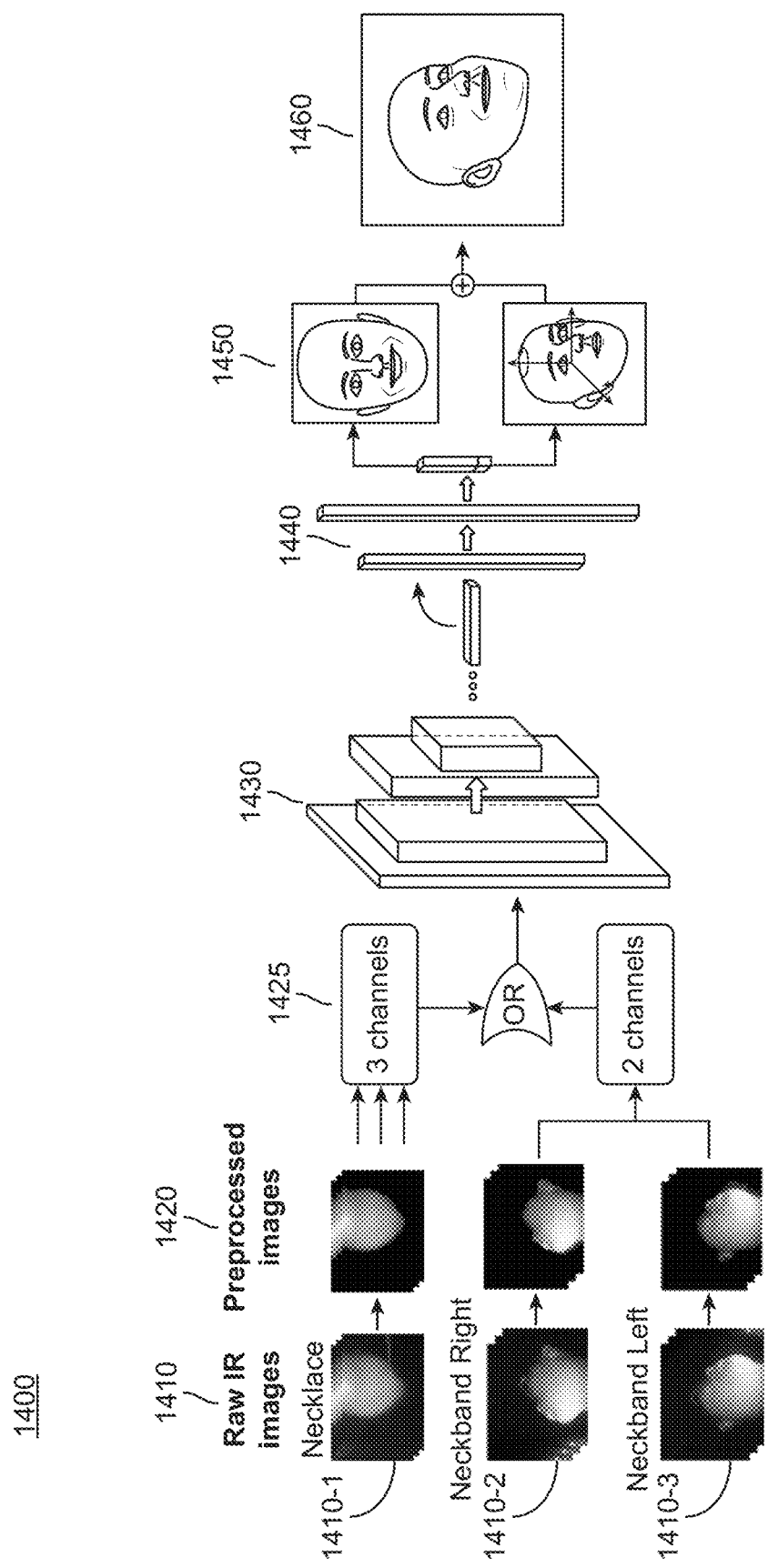
FIG. 14 is a block diagram depicting an alternate embodiment of a deep-learning model process.

FIG. 14 is a block diagram depicting an alternate embodiment of a deep-learning model process 1400, in accordance with certain examples. The deep-learning model process 1400 may be performed by the modeling application 132 of the data processing system 130, previously described herein with reference to FIG. 1. In an example where the machine learning algorithm is a convolution neural network ("CNN"), the deep-learning model process 1400 receives images as an input and assigns importance (learnable weights and biases) to various aspects/objects in the images. The CNN reduces the images into a form that is easier to process without losing the features of the images that are critical for getting a good prediction. In the current example, the prediction is a reconstructed facial expression based on received IR images of a user's chin profile.

In block 1410, the data processing system 130 receives IR images from either the necklace device 1210 or the neckband device 1220. Example necklace 1210 IR images are depicted at 1410-1. Example neckband 1220 IR images are depicted at 1410-2 and 1410-3 as the neckband acquires both a right and left side IR image of a user's chin profile. Other example IR images are depicted in row 1540A of FIG. 15A and row 1540B of FIG. 15B.

In block 1420, the data processing system 130 pre-processes the IR images. Pre-processing the IR images is described in greater detail in reference to method 1720 of FIG. 18.

In block 1425, the data processing system 130 duplicates the pre-processed IR images of the necklace device 1210 into three channels to improve the expressiveness and the ability to extract features of the model. As the neckband device 1220 already comprises two pre-processed images, the images are not duplicated into additional channels.

The pre-processed IR images are input into an image processing phase of the deep-learning model process 1400 depicted at block 1430. Block 1430 comprises convolution layers, normalization layers, and an averaging pooling layer. The processing of block 1430 is described in greater detail herein with reference to blocks 414 and 416 of FIG. 4. The output from block 1430 is a vector representation of each of the pre-processed IR images.

The vector representations of each of the pre-processed IR images are input into a regression phase 1440 of the deep-learning model process 1400. The architecture of the regression phase 1440 is similar to the architecture of regression phase 450, previously described herein with reference to FIG. 4. Within the regression phase 1440, the data processing system 130 extracts details from the vector representations of the pre-processed IR images regarding facial components including the cheek, mouth, eyes, eyebrows, chin, and nose and three-dimensional head rotation angles. The data processing system 130 represents each facial expression with blend shapes that are a three-dimensional representation of the vector representations. The parameters of the blend shapes and the three-dimensional head rotation angles, or Euler angles, are obtained by learning from the IR images captured from the neck. The data processing system 130 compares the blend shapes and Euler angles from the vector representations to the blend shapes and Euler angles of the data training set to match the blend shapes/Euler angles to a facial expression from the data training set.

In block 1450, the data processing system 130 combines the blend shapes with three-dimensional angles of rotation of the user's head. In an example, the three-dimensional angles of rotation are represented by Euler's angles of roll, yaw, and pitch. In block 1460, the final facial expression reconstruction is output as a three-dimensional image. Example three-dimensional facial expression reconstructions are depicted in row 1530A of FIG. 15A and row 1530B of FIG. 15B. In an example, the three-dimensional facial expression reconstructions may be further processed by a classifier process, such as classifier process 500 for applications such as silent speech recognition, emoji input, real-time avatar facial expressions, or any other suitable applications.

Figure 15A:
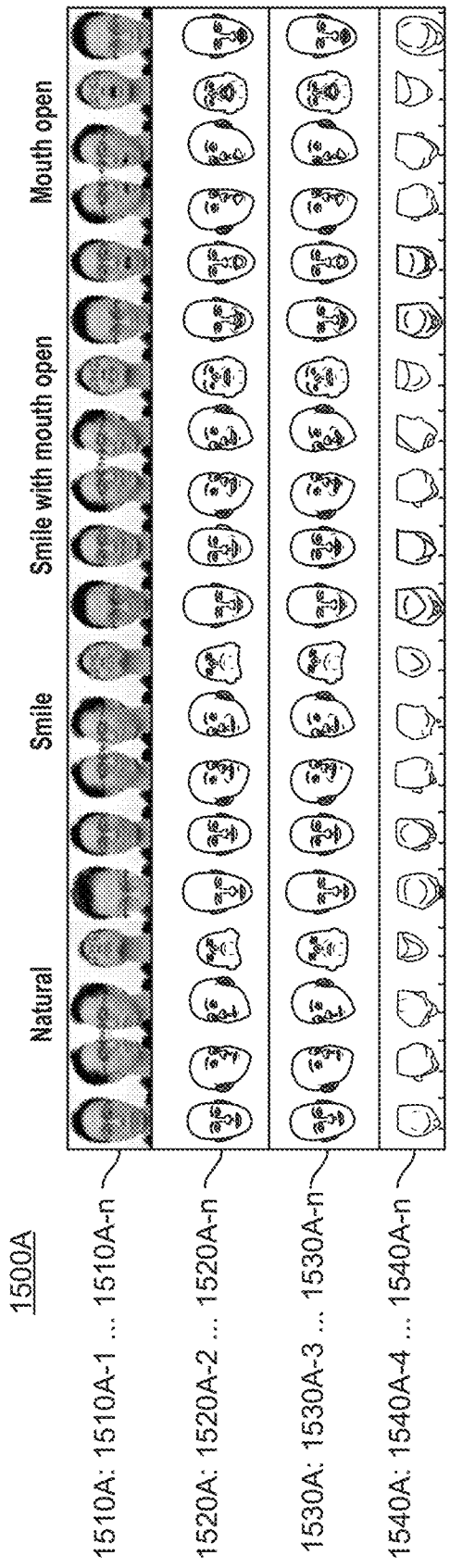
FIG. 15A is a diagram depicting the correlation between frontal view camera images, three-dimensional training data, predicted three-dimensional face expressions, and infrared facial images.

FIG. 15A is a diagram 1500A depicting the correlation between frontal view camera images 1510A, three-dimensional training data 1520A, predicted three-dimensional face expressions 1530A, and infrared facial images 1540A, in accordance with certain examples.

Row 1510A illustrates frontal view camera images of a user. To construct a training data set or ground truth, frontal camera images of a user are acquired with the user making various different facial expressions, as depicted in images 1510A-1 through 1510-n. The method to create the training data set from the frontal view camera images is described herein in greater detail with reference to method 810' of FIG. 16. Row 1520A illustrates three-dimensional training data in three-dimensional blend shapes and head rotation angles. The three-dimensional training data images depicted in images 1520A-1 through 1520A-n correlate with images 1510A-1 through 1510-n. The three-dimensional training data images 1520A are the output of method 810' of FIG. 16.

Row 1540A depicts IR images 1540A-1 through 1540A-n captured by a neck-mounted wearable device, such as necklace device 1210 or neckband device 1220 described herein in greater detail in reference to FIG. 12. The IR images 1540A, and the three-dimensional training data images 1520A are used in the deep-learning model process 1400 to construct the predicted facial expressions 1530A illustrated in row 1530A of FIG. 15A. The predicted facial expressions 1530A are depicted as three-dimensional images in images 1530A-1 through 1530A-n. The predicted facial expressions 1530A are illustrated in FIG. 15A beneath the three-dimensional training data images 1520A to illustrate the accuracy of predicting facial expressions using IR images 1540A acquired from necklace device 1210 or neckband device 1220.

Figure 15B:
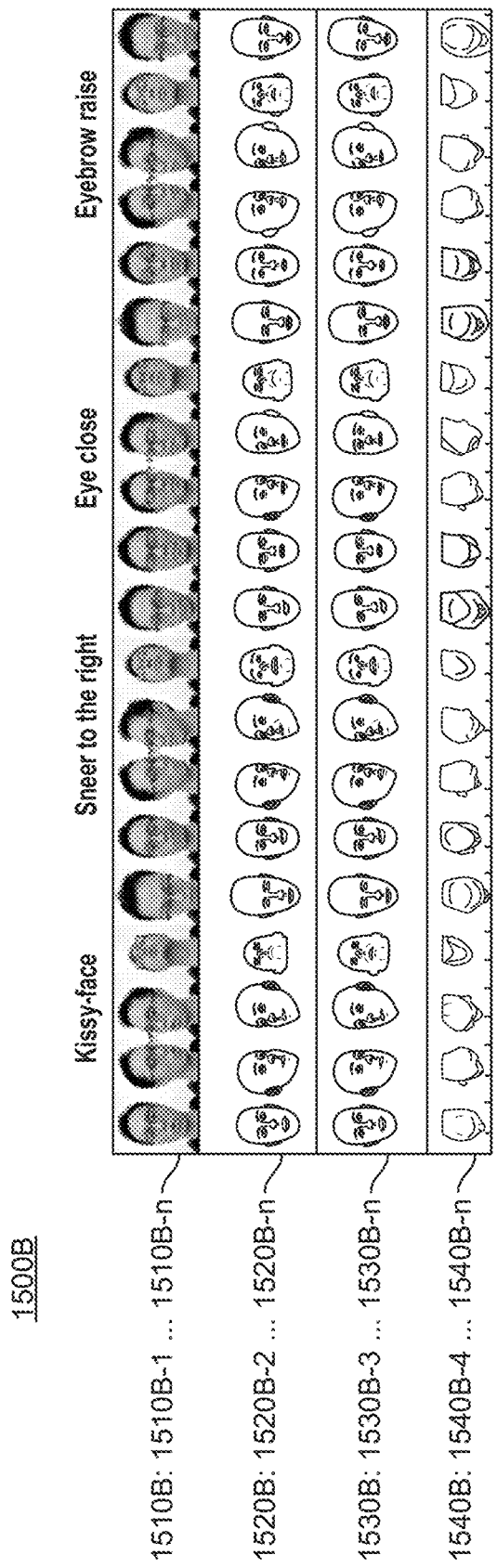
FIG. 15B is a diagram depicting the correlation between frontal view camera images, three-dimensional training data, predicted three-dimensional face expressions, and infrared facial images.

FIG. 15B is a diagram 1500B depicting the correlation between additional frontal view camera images 1510B, three-dimensional training data 1520B, predicted three-dimensional face expressions 1530B, and infrared facial images 1540B, in accordance with certain examples. Each of the frontal view camera images 1510B, three-dimensional training data 1520B, predicted three-dimensional face expressions 1530B, and infrared facial images 1540B correspond to the frontal view camera images 1510A, three-dimensional training data 1520A, predicted three-dimensional face expressions 1530A, and infrared facial images 1540A described herein with reference to FIG. 15A, except these items correlate to different facial expressions.

In this example, the images captured by the cameras of the neck-mounted devices can be processed for facial reconstruction similarly to the methods discussed previously with reference to FIGS. 8-11. Various alternatives to the methods of FIGS. 8-11 will be discussed.

Figure 16:
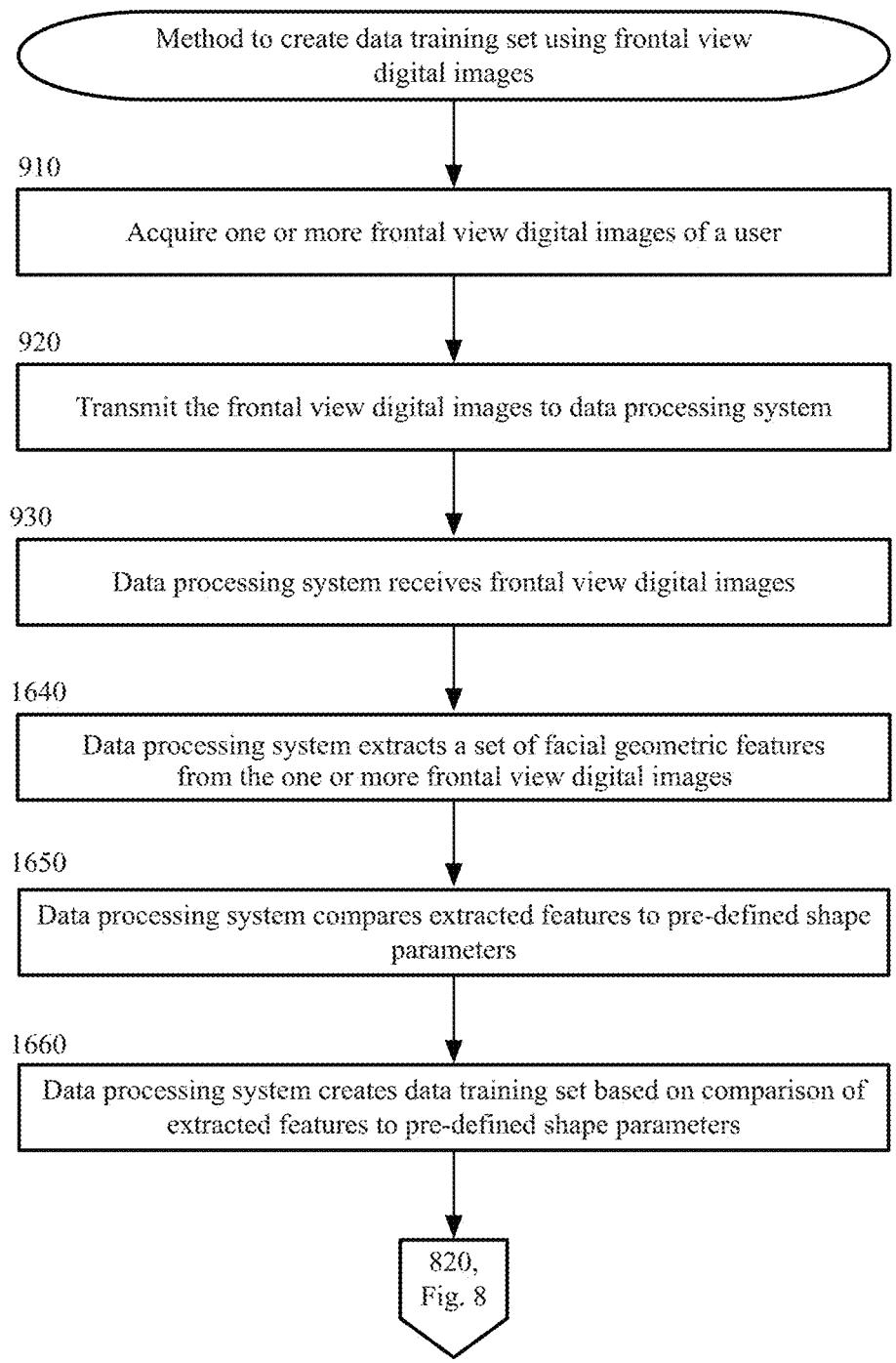
FIG. 16 is a block flow diagram depicting an alternative method to create a data training set using frontal view images.

FIG. 16 is a block flow diagram depicting an alternative method 810' to create a data training set using frontal view images, in accordance with certain examples.

Blocks 910, 920, and 930 of FIG. 16 were previously described herein with reference to FIG. 9.

In block 1640, the data processing system 130 extracts a set of facial geometric features from the one or more frontal view digital image(s). In an example, the one or more frontal view digital image(s) are three-dimensional digital images captured from a camera that provides depth data in real time along with visual information. Example frontal view digital images are depicted in rows 1510A and 1510B, respectively, of FIGS. 15A and 15B. In an example, the data processing system 130 extracts full facial expressions using an augmented reality ("AR") application. The AR application extracts high-quality and fine-grained details of facial expressions/movements of the eyes, eyebrows, cheeks, mouth, nose, and chin. The AR application can extract facial features such as facial geometry and rotation from a depth map associated with the three-dimensional digital images. In an example, the rotation is represented by Euler's angles of roll, yaw, and pitch.

In block 1650, the data processing system 130 compares the extracted features to pre-defined shape parameters. In an example, the AR application comprises pre-defined blend shapes as templates for complex facial animations. In the example, the AR application comprises blend shapes with features for left and right eyes, mouth and jaw movement, eyebrows, cheeks, nose, tongue, and any other suitable facial features.

In block 1660, the data processing system 130 creates a data training set based on the comparison of the extracted features to the pre-defined shape parameters. The data training set comprises a blend shape with a Euler angle of head rotation as depicted in block 1520A of FIG. 15A and block 1520B of FIG. 15B. In an example, the data processing system 130 stores the data training set in the data storage unit 133.

From block 1660, the method 810' returns to block 820 of FIG. 8.

Figure 17:
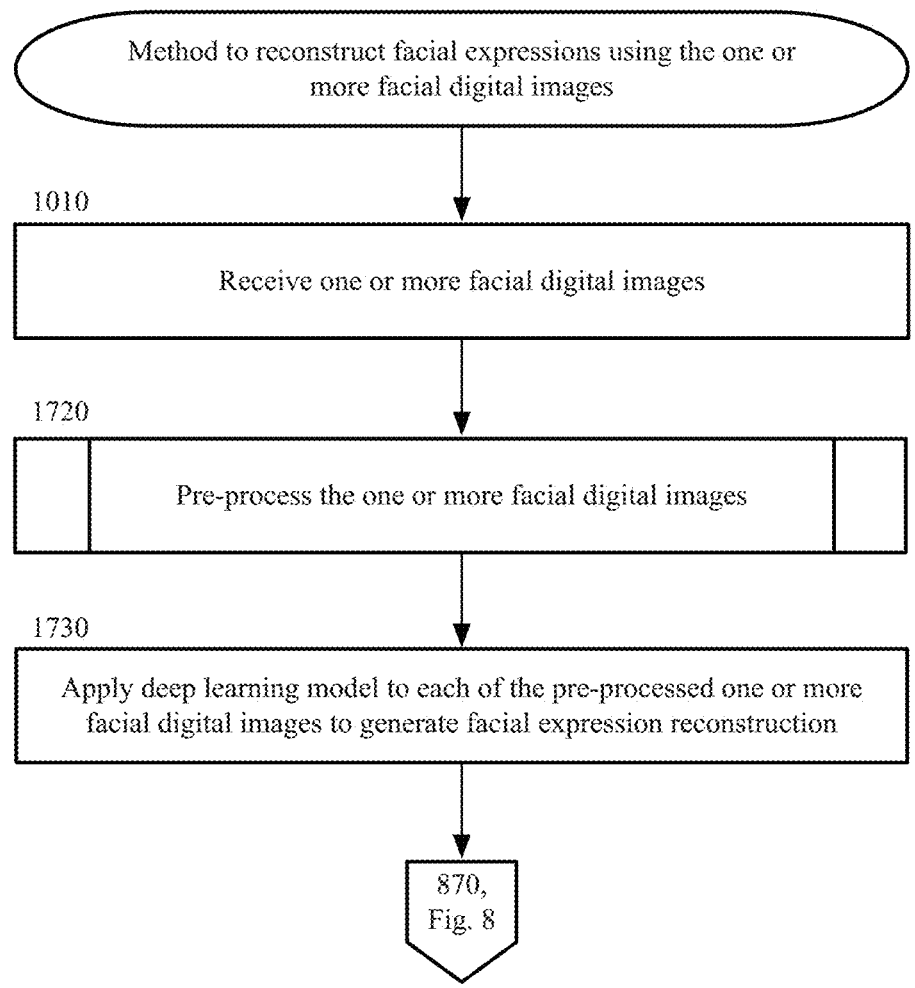
FIG. 17 is a block flow diagram depicting an alternative method to reconstruct facial expressions using one or more facial digital image(s).

FIG. 17 is a block flow diagram depicting an alternative method 860' to reconstruct facial expressions using one or more facial digital image(s), in accordance with certain examples.

Block 1010 of FIG. 17 was previously described herein with reference to FIG. 10.

In block 1720, the data processing system 130 pre-processes the one or more facial digital image(s). Example facial digital images are depicted in rows 1540A and 1540B of FIGS. 15A and 15B, respectively. Block 1720 is described in greater detail herein with reference to method 1720 of FIG. 18.

Figure 18:
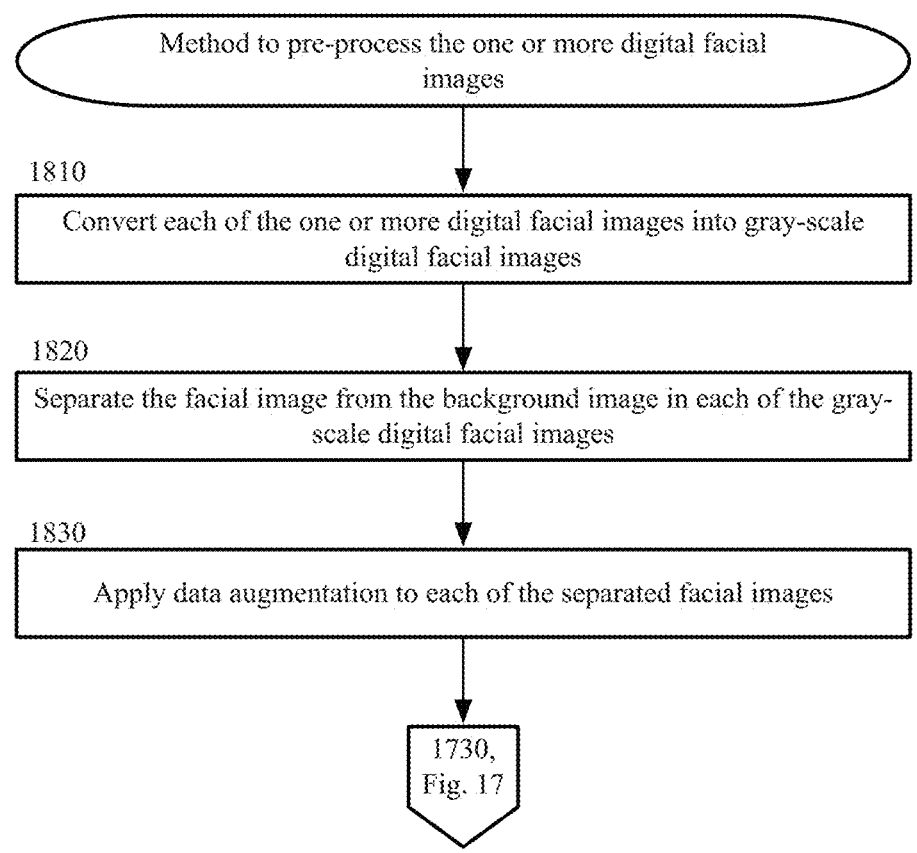
FIG. 18 is a block flow diagram depicting an alternative method to pre-process the one or more digital facial image (s).

FIG. 18 is a block flow diagram depicting an alternative method 1720 to pre-process the one or more digital facial image(s), in accordance with certain examples.

In block 1810, the data processing system 130 converts each of the one or more digital facial image(s) into gray-scale digital facial images. The one or more digital facial image(s) are converted to gray-scale to remove any potential color variance. As the IR bandpass filter 1214 only allows monochrome light into the camera 110, any color present in the one or more digital facial image(s) does not represent details related to the facial expression of the user.

In block 1820, the data processing system 130 separates the facial image from the background image in each of the gray-scale digital facial images. Using the IR technology previously discussed in reference to FIG. 12, the user's skin in the images appears brighter than the surrounding background. However, some light sources in the background may contain IR light that would introduce noise in the background. To remove the noise, the gray-scale digital facial images are binarized based on a set brightness threshold. The data processing system 130 separates the facial image as the brighter component of the gray-scale digital facial image.

In block 1830, the data processing system 130 applies data augmentation to each of the separated facial images. As a user wears a necklace device 1210 or a neckband device 1220 and performs activities, the position and angles of the cameras 110 of the necklace device 1210 and neckband device 1220 may not be constant. To mitigate the issue, a probability of 60% to conduct three types of image transformations is set, which can be caused by camera shifting causing translation, rotation, and scaling on the images. In an alternate example, any suitable probability may be used. Three Gaussian Models are deployed to generate the parameters for the translation ($\mu=0$, $\sigma^{2=30}$), rotation ($\mu=0$, $\sigma^2=10$), scaling ($\mu=1$, $\sigma^2=0.2$) on the synthesized training data. The data augmentation is performed on all the images in the training dataset during each training epoch before feeding the images into deep-learning model process 1400. Data augmentation improves the deep-learning model's ability to confront camera shifting and avoid over-fitting during model training.

From block 1830, the method 1720 returns to block 1730 of FIG. 17.

In block 1730, the data processing system 130 applies the deep-learning model to each of the pre-processed one or more facial digital image(s) to generate facial expression reconstruction. The deep-learning model for facial expression reconstruction was described in the deep-learning model process 1400 herein with reference to FIG. 14 and in the classifier process 500 with reference to FIG. 5. The results of the facial expression reconstruction from block 1730 may include the reconstruction output from block 1460 of FIG. 14 and/or the encoding of a facial event class from block 550 of FIG. 5. For example, the data processing system 130 may output from block 1730 the images from the process 1400 of FIG. 14. The data processing system 130 also, or alternatively, may further process the facial expression reconstruction such that the output from block 1730 comprises a three-dimensional visualization of the facial expression, silent speech recognition, an emoji associated with the facial expression reconstruction, and/or real-time avatar facial expressions associated with the facial expression reconstruction, such as described by the classifier process 500 of FIG. 5.

From block 1730, the method 860' returns to block 870 of FIG. 8 to output results of the facial reconstruction.

Cameras 110 were described herein with reference to FIG. 1 as any suitable sensors for capturing images. For example, cameras 110 may include depth cameras, red-green-blue ("RGB") cameras, infrared ("IR") sensors, acoustic cameras or sensors, microphones and speakers, thermal imaging sensors, charge-coupled devices ("CCDs"), complementary metal oxide semiconductor ("CMOS") devices, active-pixel sensors, radar imaging sensors, fiber optics, and any other suitable image device technology. While the examples herein described specific cameras for the headband device 210, earbud devices 220, necklace device 1210, and neckband device 1220, it should be appreciated that any type of camera can be used with any of the wearable devices. The methods to process the images and recreate the facial expressions are adjusted based on camera/image type and are not dependent on the type of device used to acquire the images.

The embodiments herein describe wearable devices in the form of head-mounted devices headband device 210 and earbud devices 220, and neck-mounted devices necklace device 1210 and neckband device 1220. Any suitable wearable device may be used such that the one or more camera(s) may be directed towards a user's face including, but not limited to, glasses, smart glasses, a visor, a hat, a helmet, headgear, a virtual reality ("VR") headset.

The embodiments herein describe head-mounted and neck-mounted wearable devices comprises cameras 110 with adjustable positions and angles. Each camera 110 may be positioned such that at least one of a buccal region, a zygomatic region, and/or a temporal region of a user's face are included in the field of view of the camera 110.

In an alternate embodiment, the wearable devices previously described herein may be configured for use in a hand-face touching detection system to recognize and predict a time and position that a user's hand touches the user's face. An important step in reducing the risk of infection is avoiding touching the face because a virus, such as COVID-19, may enter the mucous membranes of the eyes, nose, and/or mouth. Touching different areas of the face carries different health related risks. For example, contacting a mucous membrane may introduce a higher risk of transmitting a virus than touching non-mucous areas such as the chin and cheek. In addition, the frequency of touching the face may be an indicator regarding the stress level of a person. Understanding how people touch their face may alleviate multiple health challenges. Accurately recognizing where the hand touches the face is an important step towards alleviating health risks introduced by hand-face touching behaviors. In order to implement behavior intervention technologies, the hand-face touching detection system predicts the behavior in advance rather than simply detecting the touching behavior.

A data training set is created similar to the data training sets described herein with reference to FIGS. 9 and 16. The difference is that instead of frontal view images of a user capturing just the user's face, the data training set uses frontal view images of a user with different hand-face touching positions. For example, frontal view images of the user may be acquired with the user touching his eye, nose, mouth, cheek, or any other suitable facial feature. In addition to touching faces directly, people move their hands closer to their faces when performing daily activities such as eating and drinking. The daily activities are classified as separate behaviors to avoid false-positive errors of a person touching their face. Additional frontal view images are acquired for the data training set depicting example daily activities. For example, the frontal view images may comprise a user eating with his hand, a fork, a spoon, or chopsticks. The user may be drinking with a straw, a bottle, or a cup. The user may be placing an earbud in or out, putting on or taking off eyeglasses, adjusting eyeglasses, applying lip balm, or adjusting his hair. Any suitable daily activities may be used in the frontal view images to create the data training set.

The frontal view images of the user are sent to a server, such as data processing system 130, to create the data training set, as previously described herein with reference to FIGS. 9 and 16. However, instead of extracting facial landmark positions as described in block 940 of FIG. 9 or facial geometric features as described in block 1640 of FIG. 16, the data processing system extracts hand/facial landmark positions or hand/geometric features to create the data training set.

In an example, necklace device 1210 may be positioned on a user to acquire images of the user's facial area, as previously described herein, to also include a user's hand if positioned or in motion near the user's face. Any suitable wearable device may be used to acquire the images of the user's face. To predict the time and location of a hand-face touch, camera images are monitored over a period of time. Camera images are sent to a server, such as data processing system 130, for processing. The data processing system receives the hand/facial images and reconstructs the position of the user's hand relative to the user's face using the data training set and a deep-learning model, such as the models previously described herein with reference to FIGS. 4 and 14. The data processing system monitors the hand-face position over time to predict where and when a user may touch his face. Alternatively, the data processing system may determine that the user is participating in a daily activity and that the user is not in the process of a hand-face touch. In each case, the system outputs a reconstructed image (or other similar information as described herein) depicting the user's facial expression and a representation of the hand-touch activity. The system also can log each hand-touch to the facial area and output notifications of the activity.

In an alternate embodiment, acoustic sensing technology can be used to reconstruct facial expressions using an array of microphones and speakers and deep-learning models. The acoustic technology comprises a wearable device such as headphones, earbuds, necklaces, neckbands, and any other suitable form factors such that the microphones and speakers can be mounted or attached to the wearable device. In an example, the microphones are Micro-Electro-Mechanical System ("MEMS") microphones that are placed on a printed circuit board ("PCB"). In an example, each microphone/speaker assembly may comprise four microphones and one speaker. Any suitable number of microphones and speakers may be included. The positions of the microphones and speakers may be adjustable to optimize the recording of reflected signals.

The acoustic wearable device actively sends signals from the speakers towards a user's face. In an example, the speakers transmit inaudible acoustic signals within a frequency range of 16 kHz to 24 kHz towards the user's face. Any suitable frequency range may be used. The signals are reflected by the user's face and captured by the microphones on the acoustic wearable device. The signals are reflected differently back towards the microphones based on different facial expressions or movements. A Channel Impulse Response ("CIR") is calculated based on the acoustic signals received at each microphone.

Each microphone is in communication with a computing device, such as computing device 120, such that the CIR images/data can be transmitted for processing to a server, such as data processing system 130.

The data processing system creates a data training set using frontal view images of a user in a machine learning algorithm, previously described herein with reference to FIGS. 9 and 16. The data processing system receives the CIR images/data and reconstructs the user's facial expression using the data training set and a deep-learning model, such as the models previously described herein with reference to FIGS. 4 and 14. The data processing system outputs the resultant facial expression reconstruction, such as previously described herein with reference to block 870 of FIG. 8.

The wearable devices and systems described herein may be used in applications such as silent speech recognition, emoji input, and real-time avatar facial expressions. Silent speech recognition is a method to recognize speech when vocalization is inappropriate, background noise is excessive, or vocalizing speech is challenging due to a disability. The data training set for silent speech recognition comprises a set of frontal view facial images directed to the utterance of a word or phrase. To recognize silent speech, the wearable device, such as necklace 1220, captures a series of facial movements from underneath the chin of a user while the user silently utters words or commands and transfers the series of digital facial images to the data processing system 130 for facial expression reconstruction. The results of the facial expression reconstruction, previously described herein with reference to block 456 or block 1460, are used as inputs to the classifier process 500, previously described herein with reference to FIG. 5. Using the series of facial expression reconstruction images, the classifier process 500 detects the start time and end time of an utterance and selects the frames from the series of facial expression reconstruction images associate with the utterance. A vector representation of the utterance is created and input into a probability distribution to predict a word or phrase. In some embodiments for applications, such as in a testing process after the training, or using a trained system, a front view of a user is not needed. In some embodiments for speech recognition, one or more imaging sensor(s), such as camera(s) in a necklace and/or a wearable device worn in or on ear(s) of a user, capture a series of images for speaking a syllable, word, or phrase with or without audio (for example, at least two images of a syllable, a word, or a phrase), wherein each image comprises only a portion of a full face. In some embodiments, one image used in the application only captures less than 50%, less than 40%, less than 30%, less than 25%, less than 20%, or less than 15% of a full face. In some embodiments, the one or more imaging sensor(s) used in the application do not capture direct visual information for eyes, nose, and/or mouth. In some embodiments, the one or more image(s) and the combination thereof used in the application capture incomplete visual information for eyes, nose, and/or mouth. In some embodiments, the system and method are configured to recognize or predict speech, and/or other facial expression(s) at a high accuracy, wherein the accuracy is at least 75%, at least 80%, at least 85%, at least 90%, at least 95%, or at least 98% for one or multiple words, phrases, or facial expressions on average. In some embodiments, the application is a speech recognition based on images/videos captured by the system. In other embodiments, the image-based or video-based speech recognition may be combined with an audio-based speech recognition to improve the accuracy of speech recognition. In some embodiments, the image-based or video-based speech recognition may be used to validate a result of an audio-based speech recognition.

Alternate Embodiment

Alternate Embodiment Example System Architecture

Figure 19:
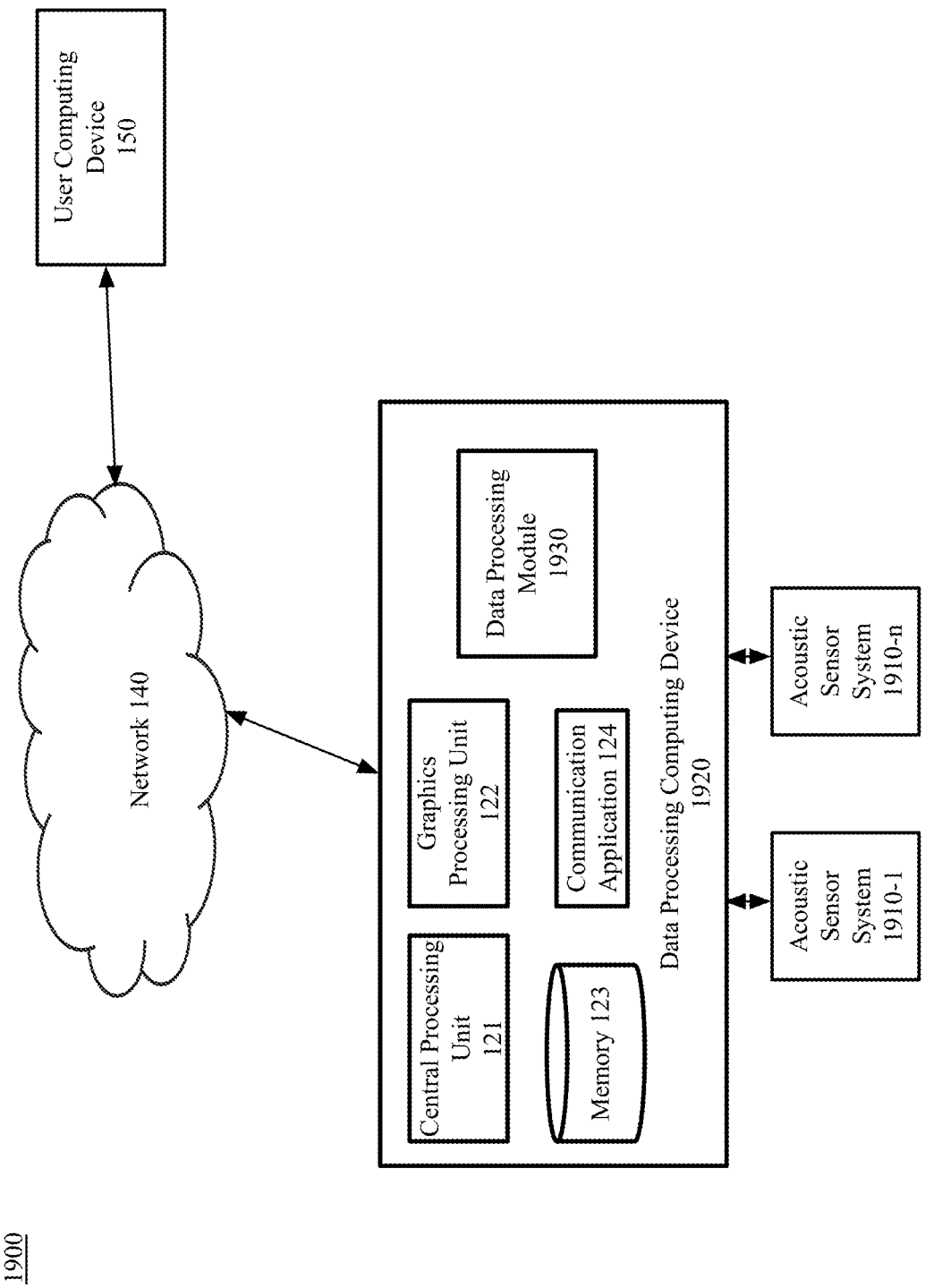
FIG. 19 is a block diagram depicting an acoustic sensor system based facial expression reconstruction system.

FIG. 19 is a block diagram depicting an acoustic sensor system based facial expression reconstruction system 1900, in accordance with certain examples. As depicted in FIG. 19, acoustic sensor system based facial expression reconstruction system 1900 comprises user computing device 150, acoustic sensor systems 1910-1 through 1910-n, and data processing computing device 1920. User computing device 150 and data processing computing device 1920 are configured to communicate via network 140. Network 140 and user computing device 150 were previously described herein with reference to FIG. 1. User computing device 150 may be configured to receive display a facial output, such as a predicted facial expression with three-dimensional visualization with examples depicted at 2830 of FIGS. 28 and 2930 of FIG. 29. Acoustic sensor systems 1910 are described in greater detail herein with reference to FIGS. 20A, 20B, and 20C.

FIG. 20A is a block diagram depicting a first embodiment of an acoustic sensor system 1910 in accordance with certain examples. Acoustic sensor system 1910 comprises speaker 1911, microphone 1912, Bluetooth module 1913, and printed circuit boards ("PCB") 1914. Speaker 1911 is a small form factor speaker. In an example, speaker 1911 is a speaker configurable to transmit signals in an inaudible frequency range. For example, speaker 1911 may be configured to transmit signals in a frequency range of 16-24 kHz. Any suitable frequency range may be used. In an example, speaker 1911 transmits signals that are frequency modulation continuous wave ("FMCW") transmissions, Channel Impulse Response ("CIR") transmissions, or any other suitable type of acoustic signal. In an example, the speakers transmit inaudible acoustic signals within the frequency range of 16 kHz to 24 kHz towards a user's face. As depicted in FIG. 20A, speaker 1911 is affixed to a PCB 1914.

Microphone 1912 is a small form factor microphone. In an example, microphone 1912 is a Micro-Electro-Mechanical System ("MEMS") microphone. Microphone 1912 may be a microphone chip, a silicon microphone, or any other suitable microphone. In an example, microphone 1912 is configured to receive reflected signals transmitted by speaker 1911. As depicted in FIG. 20A, microphone 1912 is affixed to a PCB 1914.

Bluetooth module 1913 may be a Bluetooth low energy ("BLE") module. Bluetooth module 1913 may be a System-on-Chip ("SoC") module. In an example, Bluetooth module 1913 may comprise a microcontroller unit ("MCU") with memory. In an example, the memory may be an on-board SanDisk ("SD") card. The SD card may function to save acoustic data on the MCU. Bluetooth module 1913 may be configured to control a battery (not depicted) to provide power to the acoustic sensing system 1910. In an example, the battery may be a lithium polymer ("LiPo") battery. Bluetooth module 1913 may be configured to power and control speaker 1911 transmissions, microphone 1912 signal receptions, and data transmissions external to a wearable device, for example transmissions to computing device 1920. As depicted in FIG. 20A, Bluetooth module 1913 is affixed to a PCB 1914.

FIG. 20B is a block diagram depicting a second embodiment of an acoustic sensor system 1910, in accordance with certain examples. FIG. 20B depicts speaker 1911 and microphone 1912 affixed to a common PCB 1914 with Bluetooth module 1913 affixed to a separate PCB 1914.

FIG. 20C is a block diagram depicting a third embodiment of an acoustic sensor system 1910, in accordance with certain examples. FIG. 20C depicts speaker 1911, microphone 1912, and Bluetooth module 1913 affixed to a common PCB 1914. Any suitable configuration of speaker 1911, microphone 1912, Bluetooth module 1913 and PCBs 1914 may be used in addition to the configurations depicted in FIGS. 20A, 20B, and 20C.

In an example, a wearable device system may comprise one or more speaker(s) 1911 and one or more microphone(s) 1912, with a pair of a speaker 1911 and a microphone 1912 affixed on a PCB 1914. Any suitable number of speakers 1911 and microphones 1912 may be included on a particular wearable device system. The positions and/or orientations of the speakers 1911 and microphones 1912 may be adjustable to optimize the recording of reflected signals.

Returning to FIG. 19, acoustic sensor system based facial expression reconstruction system 1900 comprises data processing computing device 1920. Data processing computing device 1920 functions to receive data from Bluetooth module 1913 to construct a facial output. The facial output may comprise one of a facial movement, an avatar movement associated with the facial movement, a speech recognition, text associated with the speech recognition, a physical activity, an emotional status, a two-dimensional visualization of a facial expression, a three-dimensional visualization of a facial expression, an emoji associated with a facial expression, or an avatar image associated with a facial expression. Data processing computing device 1920 may be a smart phone, a mobile device, or any type of computing device described herein with reference to FIG. 31. Data processing computing device 1920 comprises central processing unit 121, graphics processing unit 122, memory 123, communication application 124, and data processing module 1930. Central processing unit 121, graphics processing unit 122, memory 123, and communication application 124 were previously described herein with reference to FIG. 1. Data processing module 1930 is described in greater detail herein with reference to FIG. 21.

Figure 21:
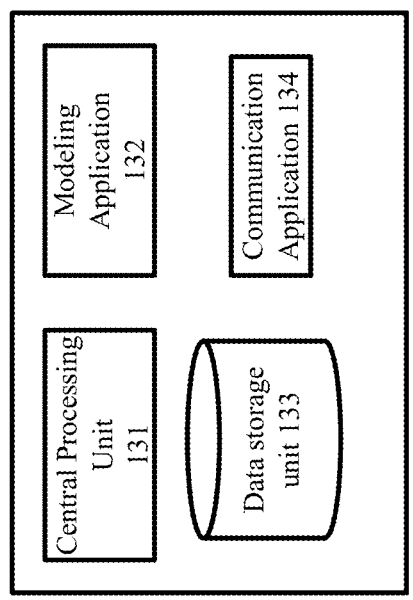
FIG. 21 is a block diagram depicting a data processing module.

FIG. 21 is a block diagram depicting a data processing module 1930, in accordance with certain examples. Data processing module 1930 comprises central processing unit 131, modeling application 132, data storage unit 133, and communication application 134. Central processing unit 131, modeling application 132, data storage unit 133, and communication application 134 were previously described herein with reference to FIG. 1.

Figure 22B:
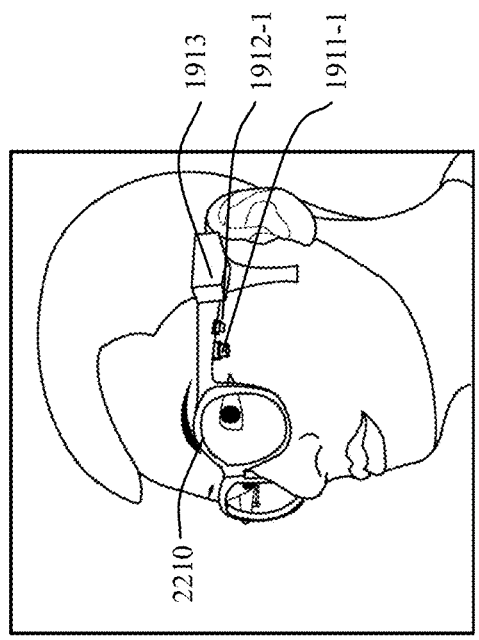
FIG. 22B is an illustration depicting the first embodiment of the head-mounted acoustic sensor system wearable device on a user.
Figure 22A:
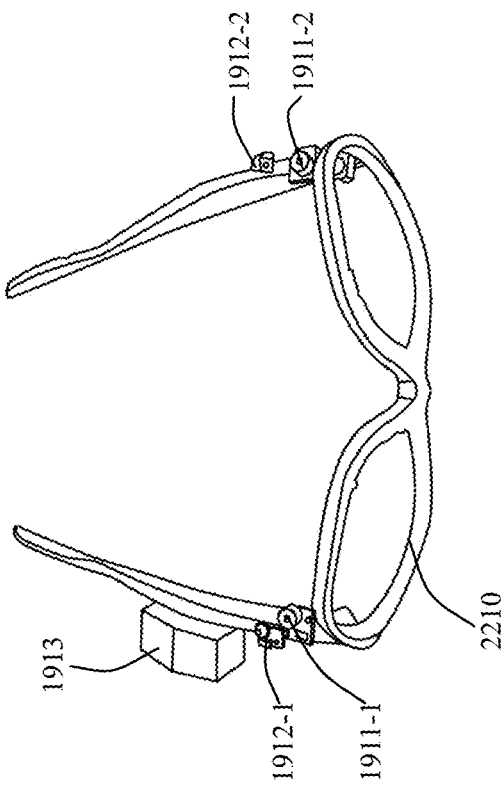
FIG. 22A depicts a first embodiment of a head-mounted acoustic sensor system wearable device.

FIG. 22A depicts a first embodiment of a head-mounted acoustic sensor system wearable device 2210. FIG. 22A depicts a glasses style wearable device 2210 (herein referred to as glasses device 2210). Glasses device 2210 comprises two speakers 1911-1 and 1911-2, two microphones 1912-1 and 1912-2, and a Bluetooth module 1913. While two speakers 1911 and two microphones 1912 are depicted, any suitable quantity of speakers 1911 and microphones 1912 may be used.

FIG. 22B is an illustration depicting the first embodiment of the head-mounted acoustic sensor system wearable device 2210 on a user. As illustrated in FIG. 22B, glasses device 2210 may be positioned on a user such that a pair of speaker 1911-1 and microphone 1912-1 are located on the left side of the user's face and a pair of speaker 1911-2 and microphone 1912-2 are located on the right side of the user's face. The disposition of each pair on the left and right side of the user allows data associated with skin deformations to be collected for the left and right contours of the user's face.

Figure 23B:
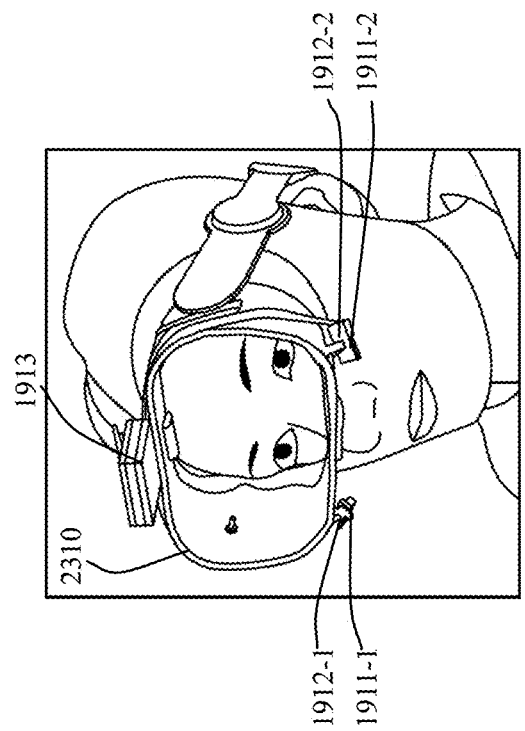
FIG. 23B is an illustration depicting the second embodiment of the head-mounted acoustic sensor system wearable device on a user.
Figure 23A:
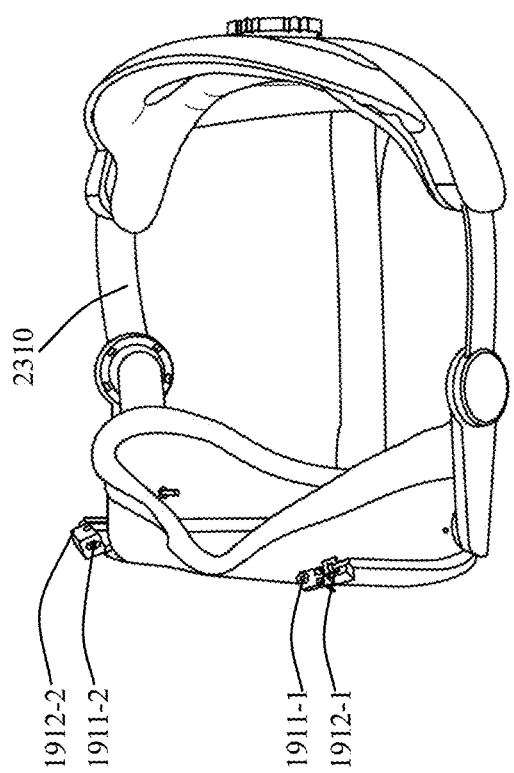
FIG. 23A depicts a second embodiment of a head-mounted acoustic sensor system wearable device.

FIG. 23A depicts a second embodiment of a head-mounted acoustic sensor system wearable device 2310. FIG. 23A depicts a headset style wearable device 2310 (herein referred to as headset device 2310). In an example, headset device 2310 may be a virtual reality headset. Headset device 2310 comprises two speakers 1911-1 and 1911-2, two microphones 1912-1 and 1912-2, and a Bluetooth module 1913 (depicted in FIG. 23B). While two speakers 1911 and two microphones 1912 are depicted, any suitable quantity of speakers 1911 and microphones 1912 may be used.

FIG. 23B is an illustration depicting the second embodiment of the head-mounted acoustic sensor system wearable device 2310 on a user. As illustrated in FIG. 23B, headset device 2310 may be positioned on a user such that a pair of speaker 1911-1 and microphone 1912-1 are located on the left side of the user's face and a pair of speaker 1911-2 and microphone 1912-2 are located on the right side of the user's face. The disposition of each pair on the left and right side of the user allows data associated with skin deformations to be collected for the left and right contours of the user's face.

Figure 24B:
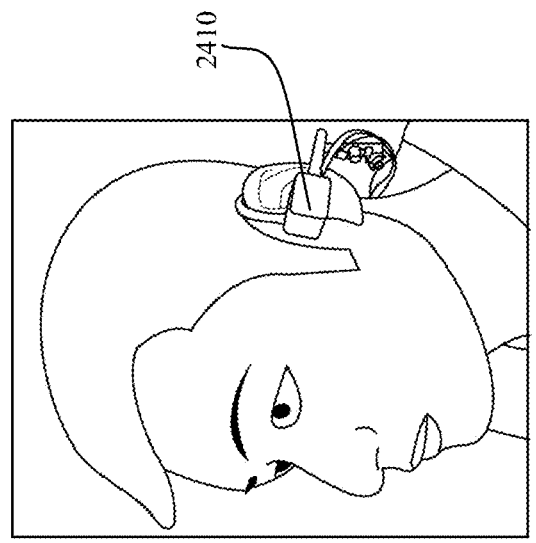
FIG. 24B is an illustration depicting the third embodiment of the head-mounted acoustic sensor system wearable device on a user.
Figure 24A:
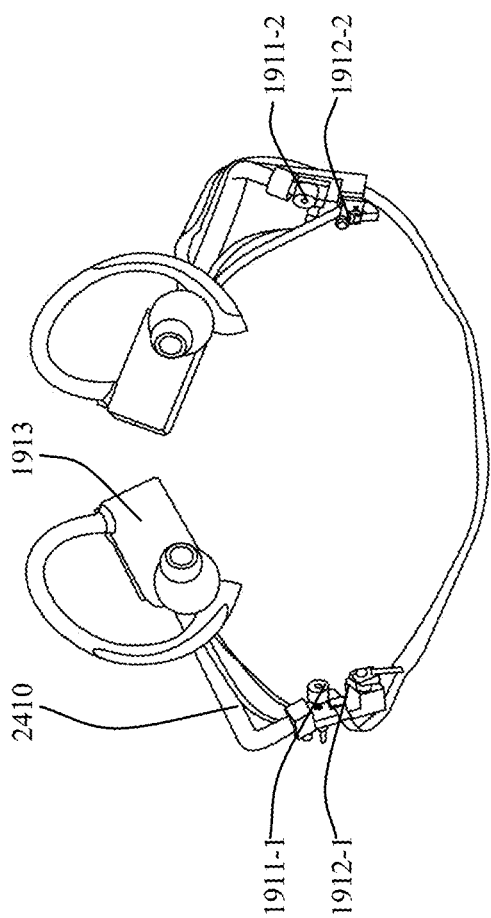
FIG. 24A depicts a third embodiment of a head-mounted acoustic sensor system wearable device.

FIG. 24A depicts a third embodiment of a head-mounted acoustic sensor system wearable device 2410. FIG. 24A depicts a headphone style wearable device 2410 (herein referred to as headphone device 2410). In an example, headphone device 2410 may be a headband style headphone, ear pods, earphones, ITE headphones, over the ear headphones, or any other headphone type device. Headphone device 2410 comprises two speakers 1911-1 and 1911-2, two microphones 1912-1 and 1912-2, and a Bluetooth module 1913. While two speakers 1911 and two microphones 1912 are depicted, any suitable quantity of speakers 1911 and microphones 1912 may be used.

FIG. 24B is an illustration depicting the third embodiment of the head-mounted acoustic sensor system wearable device 2410 on a user. As illustrated in FIG. 24B, headphone device 2410 may be positioned on a user such that a pair of speaker 1911-1 and microphone 1912-1 are located on the left side of the user's face and a pair of speaker 1911-2 and microphone 1912-2 are located on the right side of the user's face. The disposition of each pair on the left and right side of the user allows data associated with skin deformations to be collected for the left and right contours of the user's face.

As described herein, FIGS. 22A, 23A, and 24A depict example embodiments of a head-mounted acoustic sensor system wearable device. Other example embodiments may include ear buds, ear pods, in-the-ear ("ITE") headphones, over-the-ear headphones, outside-the-ear ("OTE") headphones, glasses, smart glasses, a visor, a hat, a helmet, headgear, a virtual reality headset, another head-borne device, a necklace, a neckband, a garment-attachable system, or any other type of device or system to which at least one acoustic sensor system 1910 may be affixed.

Alternate Embodiment Example Processes

Figure 25:
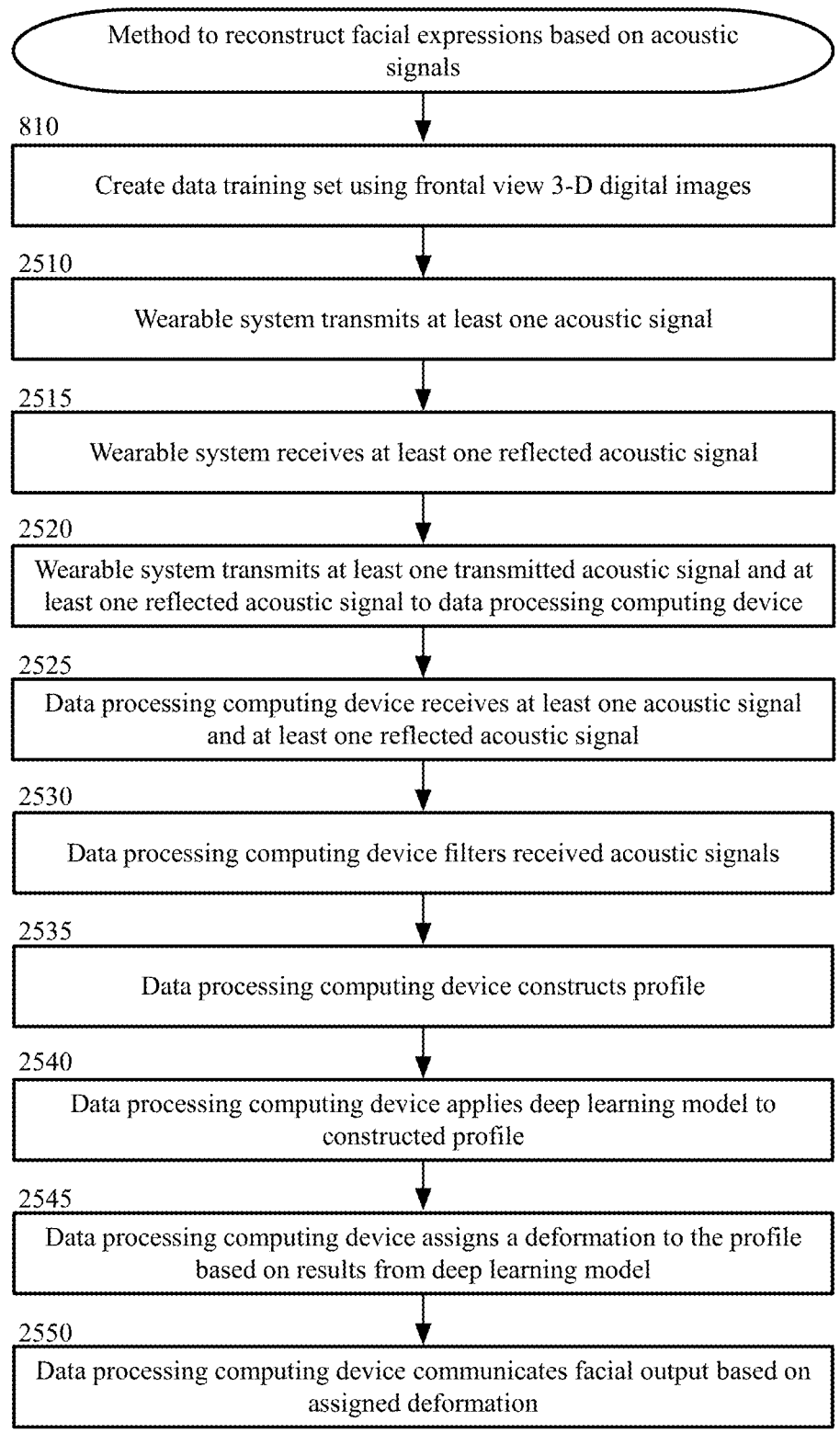
FIG. 25 is a block flow diagram depicting a method to reconstruct facial expressions based on acoustic signals.

FIG. 25 is a block flow diagram depicting a method 2500 to reconstruct facial expressions based on acoustic signals, in accordance with certain examples. In block 810, a data training set is created using frontal view digital images. Block 810 was previously described herein with reference to method 810 of FIG. 9.

In block 2510, a wearable system transmits at least one acoustic signal. The wearable system may be a system as described herein with reference to glasses device 2210, headset device 2310, headphone device 2410. In an example, the wearable system may include other embodiments such as ear buds, ear pods, ITE headphones, over-the-ear headphones, OTE headphones, glasses, smart glasses, a visor, a hat, a helmet, headgear, a virtual reality headset, another head-borne device, a necklace, a neckband, a garment-attachable system, or any other type of device or system to which at least one acoustic sensor system 1910 may be affixed. In an example, the wearable system is positioned on a wearer such that the distance from the wearable system to the wearer's face is less than 10 cm, 11 cm, 12 cm, 13 cm, 14 cm, 15 cm, or any suitable distance. The at least one acoustic signal is transmitted by a speaker 1911 of at least one acoustic sensor system 1910. Acoustic sensor system 1910 may be configured to transmit signals in a frequency range of 16-24 kHz. Any suitable frequency range may be used. Acoustic sensor system 1910 may transmit signals that are FMCW transmissions, CIR transmissions, or any other suitable type of acoustic signal. In an example, the transmitted signals have an associated sample length. For example, the sample length may be set to 600 corresponding to a sample length of 0.012 seconds. In this example, approximately 83.3 frames may be collected per second. Any suitable sample length may be used. In an example, acoustic sensor system 1910 transmits inaudible acoustic signals within the frequency range of 16 kHz to 24 kHz towards a wearer's face. In an example, acoustic sensor system 1910 may be positioned on the wearable system to transmit acoustic signals towards a first facial feature on a first side of a sagittal plane of a wearer and to transmit acoustic signals towards a second facial feature on a second side of the sagittal plane of a wearer. In an example, acoustic sensor system 1910 may be positioned on the wearable system to transmit acoustic signals towards an underside contour of a chin of a wearer.

In block 2515, the wearable system receives at least one reflected acoustic signal. Subsequent to transmitting the at least one acoustic signal toward a wearer's face as described herein with reference to block 2510, the signal is reflected by the wearer's face. The at least one reflected acoustic signal is received by microphone 1912 of the at least one acoustic sensor system 1910. The at least one transmitted signal is reflected differently to microphone 1912 based on skin deformations associated with different facial movements.

In block 2520, the wearable system transmits the at least one transmitted acoustic signal and the at least one reflected acoustic signal to data processing computing device 1920. In an example, the at least one transmitted acoustic signal and the at least one reflected acoustic signal are transmitted in frames. The at least one transmitted acoustic signal and the at least one reflected acoustic signal are transmitted by the Bluetooth module 1913 of the at least one acoustic sensor system 1910.

In block 2525, data processing computing device 1920 receives the at least one transmitted acoustic signal and the at least one reflected acoustic signal.

In block 2530, data processing computing device 1920 filters the received acoustic signals. In an example, the at least one transmitted acoustic signal and the at least one reflected acoustic signal are filtered to remove noise outside of a target frequency range. In an example, the target frequency range is 15.5 kHz to 20.5 kHz. Any suitable target frequency range may be used. In an example, the at least one transmitted acoustic signal and the at least one reflected acoustic signal are filtered using a Butterworth band-pass filter. Any suitable filter may be used.

In block 2535, data processing computing device 1920 constructs a profile using the filtered acoustic signals. In an example, the profile is an echo profile. The echo profile is determined by calculating a cross-correlation between the filtered at least one transmitted acoustic signal and the filtered at least one reflected acoustic signal. The echo profile depicts deformations of the skin of the wearer's face in temporal and spatial domains. In an example, a differential echo profile may be calculated. A differential echo profile is calculated by subtracting echo profiles between two adjacent echo frames. The differential echo profile removes static objects that may be present in the echo profile. Further, as the wearable system was positioned to be less than 10-15 cm away from a wearer's face, echo profiles comprising distance greater than that range may also be removed. For example, echo profiles with a distance greater than ±16 cm, ±17 cm, ±18 cm, or any other suitable distance may be removed. In an example, the transmitted acoustic signal is a FMCW signal from which the echo profile is constructed. In alternate examples, the transmitted acoustic signal may be a CIR signal with global system for mobiles ("GSM"), characteristic impedance ("ZC"), or Barker sequence encoding; angle of arrival ("AoA"); doppler effect; or phase change detection.

In block 2540, data processing computing device 1920 applies a deep learning model to the constructed profile. The deep-learning model for facial expression reconstruction was previous described herein with reference to the processes and methods of FIG. 4, FIG. 5, and FIG. 14. In an example with reference to acoustic data, a sliding window of one second may be applied to the differential echo profiles to provide 84 frames of differential echo profiles in each window. In an example, each differential echo profile may have approximately 200 data points providing an input vector of size 200×84. The input vector is used in the deep learning model along with the training data to estimate facial expressions.

In block 2545, data processing computing device 1920 assigns a deformation to the constructed profile based on the results of the deep learning model. In an example, the assigned deformation has a predetermined degree of correspondence to a selected one of a plurality of deformations in the deep learning model.

In block 2550, the data processing computing device 1920 communicates a facial output based on the assigned deformation. In an example, the facial output comprises one of a facial movement, an avatar movement associated with the facial movement, a speech recognition, text associated with the speech recognition, a physical activity, an emotional status, a two-dimensional visualization of a facial expression, a three-dimensional visualization of a facial expression, an emoji associated with a facial expression, or an avatar image associated with a facial expression. In an example, the facial output is communicated to user computing device 150. In an example, the facial output is communicated in real time. In an example, the facial output is continuously updated.

Figure 26:
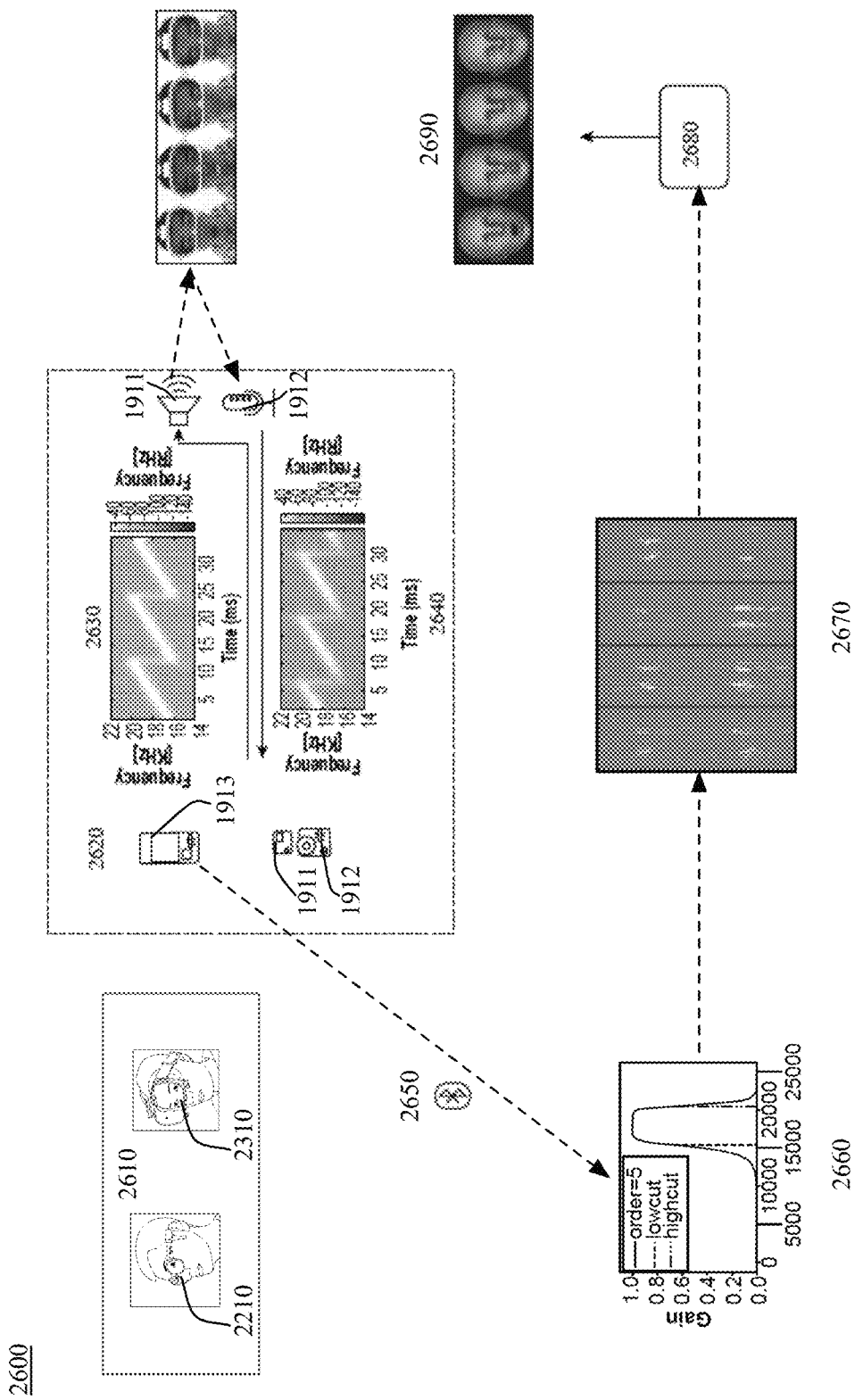
FIG. 26 is a diagram depicting an acoustic sensor system based facial expression reconstruction process.

FIG. 26 is a diagram 2600 depicting an acoustic sensor system based facial expression reconstruction process. FIG. 26 is a visual depiction of the method 2500 described herein with reference to FIG. 25. At 2610, a wearer is depicted with glasses device 2210 and headset device 2310. In an example, a wearer may select a wearable device from the various embodiments previously described herein. At 2620, speaker 1911, microphone 1912, and Bluetooth module 1913 of an acoustic sensor system 1910 of the wearable device are illustrated. At 2630, an acoustic signal is depicted as being transmitted by speaker 1911 and directed to the wearer's face. At 2630, the acoustic signal is deflected by the wearer's face and received by microphone 1912 at 2640. At 2650, the transmitted acoustic signal and the deflected acoustic signal are transmitted to data processing computing device 1920 (not depicted) by Bluetooth module 1913. At 2660, the transmitted acoustic signal and the deflected acoustic signal are filtered. At 2670, differential echo profiles are depicted. At 2680, the differential echo profiles are input into a deep learning model. At 2690, predicted facial expressions are depicted.

Figure 27:
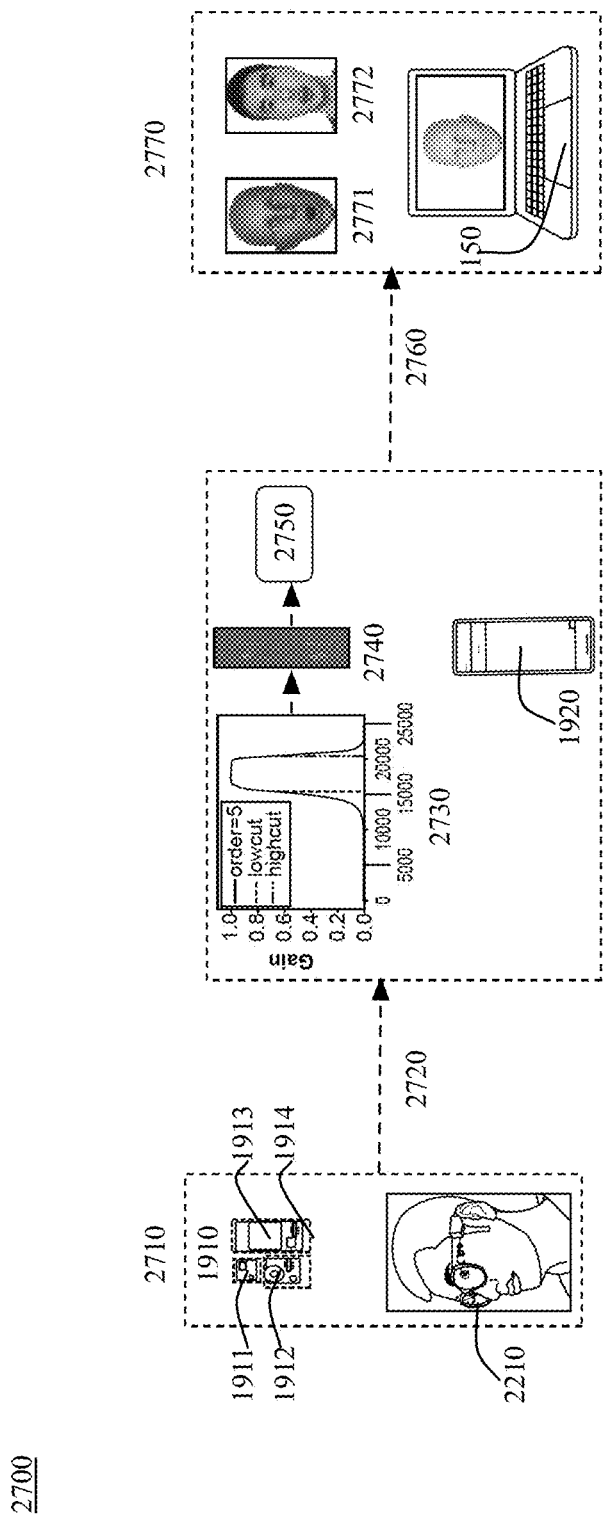
FIG. 27 is a diagram depicting an acoustic sensor system based facial expression reconstruction output process.

FIG. 27 is a diagram 2700 depicting an acoustic sensor system based facial expression reconstruction output process. FIG. 27 is a second visual depiction of the method 2500 described herein with reference to FIG. 25. At 2710, a wearer is depicted with glasses device 2210 with an acoustic sensor system 1910 comprising speaker 1911, microphone 1912, Bluetooth module 1913, and PCB 1914. At 2720, acoustic data, i.e., transmitted acoustic signal and deflected acoustic signal, are transmitted by acoustic sensor system 1910 to data processing computing device 1920. At 2730, the transmitted acoustic signal and the deflected acoustic signal are filtered. At 2740, differential echo profiles are depicted. At 2750, the differential echo profiles are input into a deep learning model. At 2760, data processing computing device 1920 transmits the output of the deep learning model to user computing device 150. At 2770, example facial outputs are depicted as received by user computing device 150. Example facial outputs may be a 3D avatar, such as depicted at 2771, or a personalized avatar, such as depicted at 2772.

Figure 28:
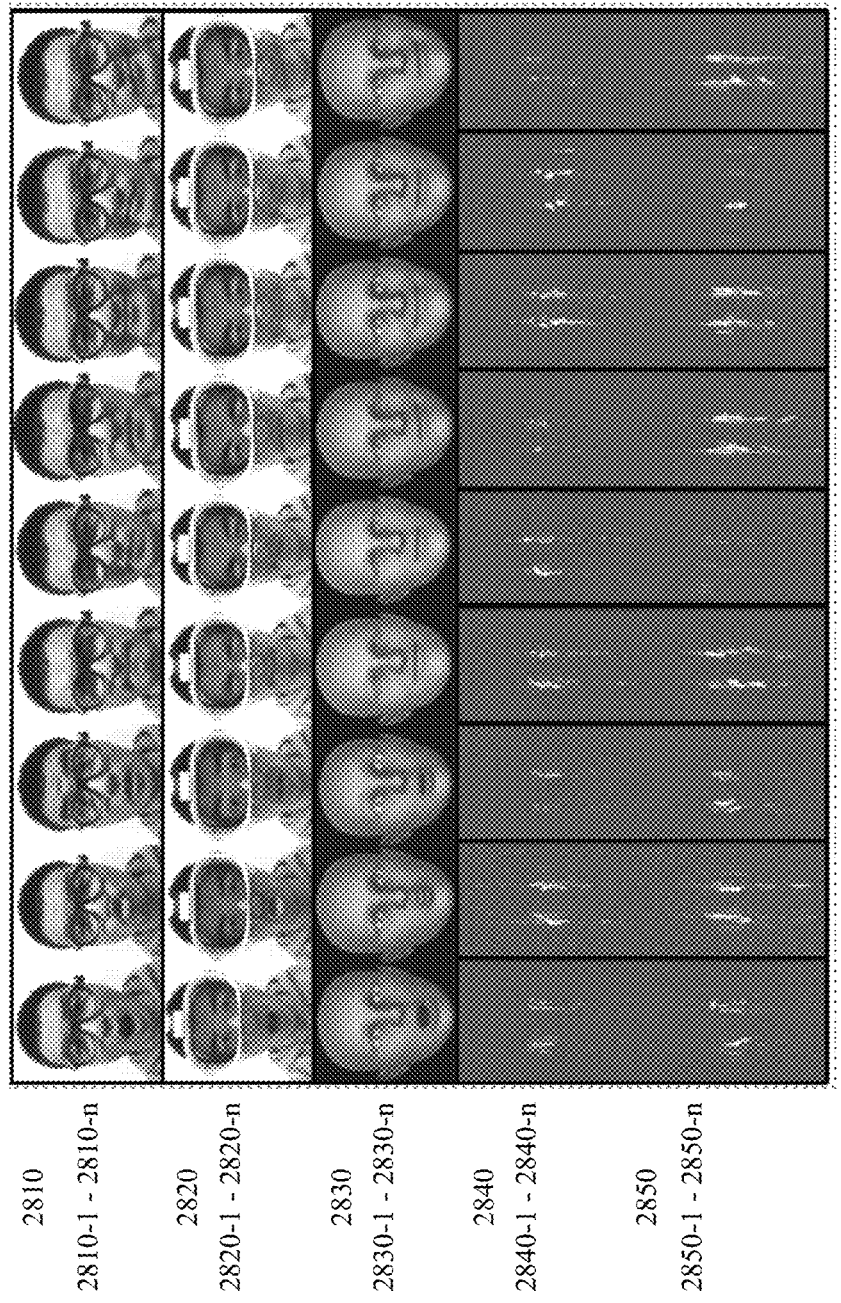
FIG. 28 is a diagram depicting the correlation between frontal view camera images, predicted facial expressions, and left and right differential echo profiles.

FIG. 28 is a diagram 2800 depicting the correlation between frontal view camera images 2810 and 2820, predicted facial expressions 2830, and left and right differential echo profiles, 2840 and 2850 respectively, in accordance with certain examples. Rows 2810 and 2820 illustrate frontal view camera images of a user. To construct a training data set or "ground truth," frontal view camera images of a user are acquired, via an imaging capturing device, with the user making various different facial expressions as depicted in images 2810-1 through 2810-$n$ and images 2820-1 through 2820-$n$. The method to create the training data set from the frontal view camera images is described herein in greater detail with reference to method 810 of FIG. 9. Row 2840 depicts left differential echo profiles 2840-1 through 2840-$n$ captured by a head-mounted, wearable device, such as glasses device 2210 or headset device 2310 described herein with reference to FIG. 22 and FIG. 23. Row 2850 depicts right differential echo profiles 2850-1 through 2850-$n$ captured by a head-mounted, wearable device, such as glasses device 2210 or headset device 2310 described herein with reference to FIG. 22 and FIG. 23. Left differential echo profiles 2840 and right differential echo profiles 2850 are input into a deep learning model, as previously described herein, to create the predicted facial expressions depicted at 2830. Predicted facial expressions 2830-1 through 2830-$n$ are illustrated in FIG. 28 beneath the frontal view camera images in rows 2810-1 through 2810-$n$ and 2820-1 through 2820-$n$ to illustrate the accuracy of the predicted facial expressions 2830.

Figure 29:
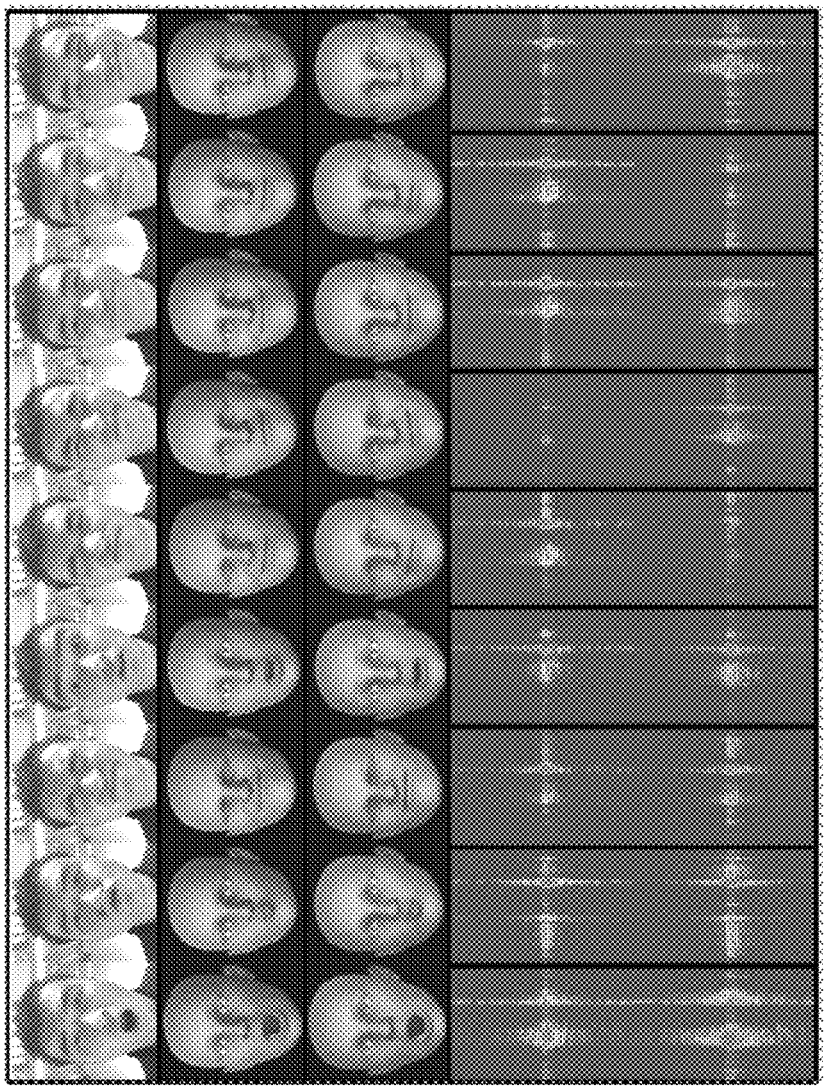
FIG. 29 is a diagram depicting the correlation between frontal view camera images, training data, predicted facial expressions, and left and right differential echo profiles.

FIG. 29 is a diagram 2900 depicting the correlation between frontal view camera images 2910, training data 2920, predicted facial expressions 2930, and left and right differential echo profiles, 2940 and 2950 respectively. Row 2910 illustrates frontal view camera images of a user. To construct a training data set or "ground truth," frontal view camera images of a user are acquired, via an imaging capturing device, with the user making various different facial expressions as depicted in images 2910-1 through 2910-$n$. The method to create the training data set from the frontal view camera images is described herein in greater detail with reference to method 810 of FIG. 9. Row 2920 depicts a training data image or ground truth for the frontal view camera images in row 2910. Training data images 2920-1 through 2920-$n$ correspond with frontal view camera images 2910-1 through 2910-$n$. Row 2940 depicts left differential echo profiles 2940-1 through 2940-$n$ captured by a head-mounted, wearable device. Row 2950 depicts right differential echo profiles 2950-1 through 2950-$n$ captured by a head-mounted, wearable device. Left differential echo profiles 2940 and right differential echo profiles 2950 are input into a deep learning model, as previously described herein, to create the predicted facial expressions depicted at 2930. Predicted facial expressions 2930-1 through 2930-$n$ are illustrated in FIG. 29 beneath the ground truth images 2920-1 through 2920-$n$ to illustrate the accuracy of the predicted facial expressions 2930.

Figure 30:
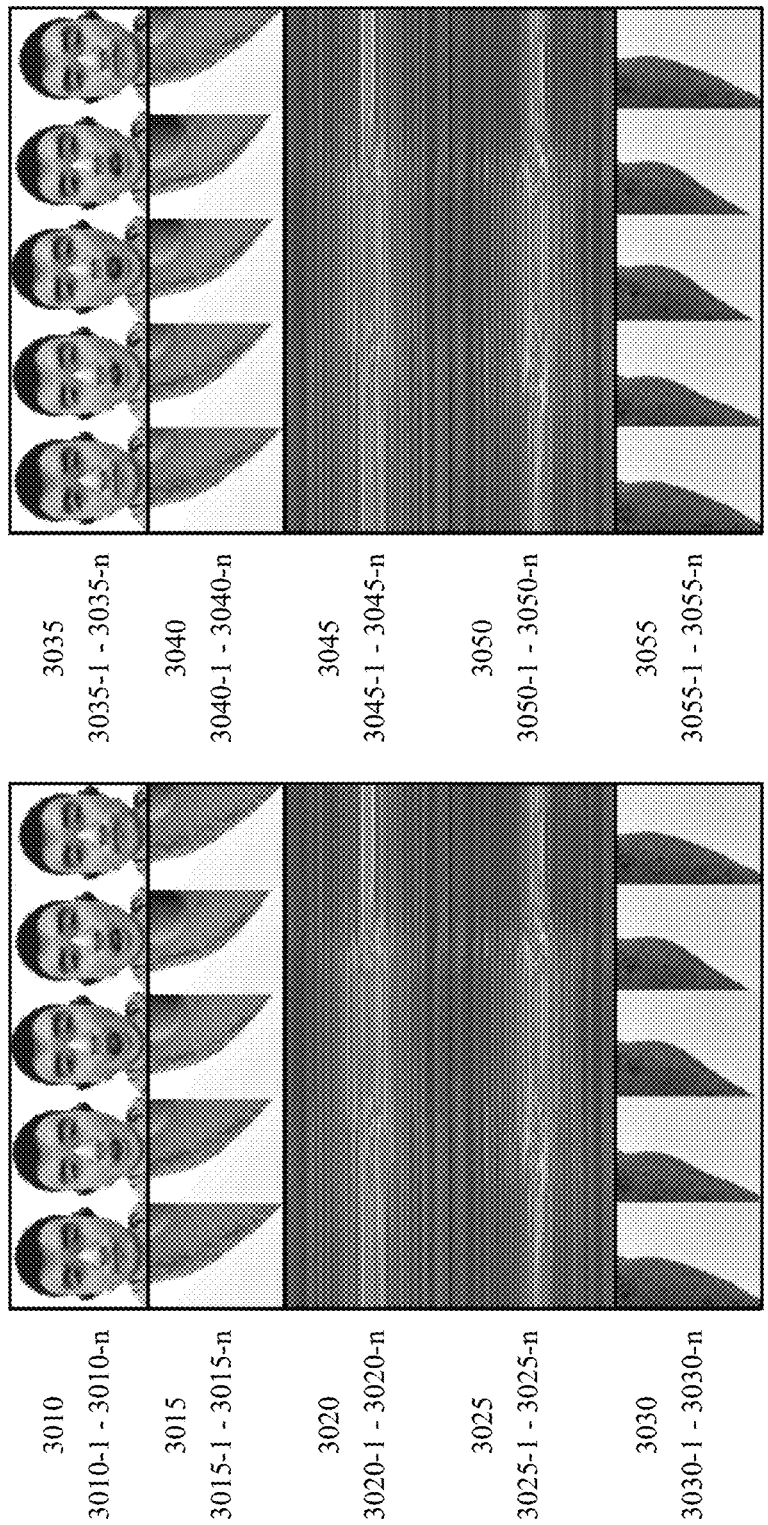
FIG. 30A is a diagram depicting the correlation between frontal view camera images of an open mouth, a left view image, a left and right echo profile, and a right view image.
FIG. 30B is a diagram depicting the correlation between frontal view camera images of a right sneer, a left view image, a left and right echo profile, and a right view image.

FIG. 30A is a diagram depicting the correlation between frontal view camera images of an open mouth 3010, a left view image 3015, a left and right echo profile, 3020 and 3025 respectively, and a right view image 3030. The skin deformations, depicted in left view images 3015-1 through 3015-$n$ and right view images 3030-1 through 3030-$n$, created by the various facial expressions 3010-1 through 3010-$n$ result in distinctive patterns changes depicted in left echo profiles 3020-1 through 3020-$n$ and right echo profiles 3025-1 through 3025-$n$. FIG. 30B is a diagram depicting the correlation between frontal view camera images of a right sneer 3035, a left view image 3040, a left and right echo profile, 3045 and 3050 respectively, and a right view image 3055. The skin deformations, depicted in left view images 3040-1 through 3040-$n$ and right view images 3055-1 through 3055-$n$, created by the various facial expressions 3035-1 through 3035-$n$ result in distinctive patterns changes depicted in left echo profiles 3045-1 through 3045-$n$ and right echo profiles 3050-1 through 3050-$n$.

While acoustic sensing technology may be used to determine facial expressions by detecting skin deformations, acoustic sensing technology may be used to directly determine other outputs associated with skin deformation without the need to first determine facial expressions. For example, the acoustic sensing technology may track blinking patterns and eyeball movements of a user. Blinking patterns and eyeball movements can be applied to the diagnosis and treatment processes of eye diseases. The acoustic sensing technology may detect movements of various parts of the face associated with speech, whether silent or voiced. While speaking, different words and/or phrases lead to subtle, yet distinct, skin deformations. The acoustic sensing technology can capture the skin deformation to recognize silent speech or to vocalize sound. By tracking subtle skin deformations, the acoustic sensing technology can be used to synthesize voice. The acoustic sensing technology may also be used to recognize and track physical activities. For example, while eating, a user opens the mouth, chews, and swallows. During each of those movements, the user's skin deforms in a certain way such that opening the mouth is distinguishable from chewing and from swallowing. The detected skin deformations may be used to determine the type and quantity of food consumed by a user. Similar to eating, a type and quantity of a consumed drink may be determined by skin deformation. The acoustic sensing technology may also be used to determine an emotional status of a user. An emotional status may be related to skin deformations. By detecting skin deformations, an emotional status can be determined and reported to corresponding applications. In an example, acoustic sensor system based facial expression reconstruction system 1900, described herein with reference to FIG. 19, may be configured to directly determine the other outputs associated with skin deformation without the need to first determine facial expressions, including, but not limited to, facial movements including eyeball movement, speech recognition, physical activities, and emotional status. Acoustic sensor system based facial expression reconstruction system 1900 may be configured to directly determine the other outputs associated with skin deformation using any type acoustic sensor system 1910 as described herein with reference to FIG. 19.

Other Examples

FIG. 31 depicts a computing machine 4000 and a module 4050 in accordance with certain examples. The computing machine 4000 may correspond to any of the various computers, servers, mobile devices, embedded systems, or computing systems presented herein. The module 4050 may comprise one or more hardware or software element(s) configured to facilitate the computing machine 4000 in performing the various methods and processing functions presented herein. The computing machine 4000 may include various internal or attached components such as a processor 4010, system bus 4020, system memory 4030, storage media 4040, input/output interface 4060, and a network interface 4070 for communicating with a network 4080.

The computing machine 4000 may be implemented as a conventional computer system, an embedded controller, a laptop, a server, a mobile device, a smartphone, a set-top box, a kiosk, a router or other network node, a vehicular information system, one or more processor(s) associated with a television, a customized machine, any other hardware platform, or any combination or multiplicity thereof. The computing machine 4000 may be a distributed system configured to function using multiple computing machines interconnected via a data network or bus system.

The processor 4010 may be configured to execute code or instructions to perform the operations and functionality described herein, manage request flow and address mappings, and to perform calculations and generate commands. The processor 4010 may be configured to monitor and control the operation of the components in the computing machine 4000. The processor 4010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 4010 may be a single processing unit, multiple processing units, a single processing core, multiple processing cores, special purpose processing cores, co-processors, or any combination thereof. The processor 4010 along with other components of the computing machine 4000 may be a virtualized computing machine executing within one or more other computing machine(s).

The system memory 4030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 4030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 4030. The system memory 4030 may be implemented using a single memory module or multiple memory modules. While the system memory 4030 is depicted as being part of the computing machine 4000, one skilled in the art will recognize that the system memory 4030 may be separate from the computing machine 4000 without departing from the scope of the subject technology. It should also be appreciated that the system memory 4030 may include, or operate in conjunction with, a non-volatile storage device such as the storage media 4040.

The storage media 4040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 4040 may store one or more operating system(s), application programs and program modules such as module 4050, data, or any other information. The storage media 4040 may be part of, or connected to, the computing machine 4000. The storage media 4040 may also be part of one or more other computing machine(s) that are in communication with the computing machine 4000 such as servers, database servers, cloud storage, network attached storage, and so forth.

The module 4050 may comprise one or more hardware or software element(s) configured to facilitate the computing machine 4000 with performing the various methods and processing functions presented herein. The module 4050 may include one or more sequence(s) of instructions stored as software or firmware in association with the system memory 4030, the storage media 4040, or both. The storage media 4040 may therefore represent machine or computer readable media on which instructions or code may be stored for execution by the processor 4010. Machine or computer readable media may generally refer to any medium or media used to provide instructions to the processor 4010. Such machine or computer readable media associated with the module 4050 may comprise a computer software product. It should be appreciated that a computer software product comprising the module 4050 may also be associated with one or more process(es) or method(s) for delivering the module 4050 to the computing machine 4000 via the network 4080, any signal-bearing medium, or any other communication or delivery technology. The module 4050 may also comprise hardware circuits or information for configuring hardware circuits such as microcode or configuration information for an FPGA or other PLD.

The input/output ("I/O") interface 4060 may be configured to couple to one or more external device(s), to receive data from the one or more external device(s), and to send data to the one or more external device(s). Such external devices along with the various internal devices may also be known as peripheral devices. The I/O interface 4060 may include both electrical and physical connections for operably coupling the various peripheral devices to the computing machine 4000 or the processor 4010. The I/O interface 4060 may be configured to communicate data, addresses, and control signals between the peripheral devices, the computing machine 4000, or the processor 4010. The I/O interface 4060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 4060 may be configured to implement only one interface or bus technology. Alternatively, the I/O interface 4060 may be configured to implement multiple interfaces or bus technologies. The I/O interface 4060 may be configured as part of, all of, or to operate in conjunction with, the system bus 4020. The I/O interface 4060 may include one or more buffer(s) for buffering transmissions between one or more external device(s), internal device(s), the computing machine 4000, or the processor 4010.

The I/O interface 4060 may couple the computing machine 4000 to various input devices including mice, touch-screens, scanners, electronic digitizers, sensors, receivers, touchpads, trackballs, cameras, microphones, keyboards, any other pointing devices, or any combinations thereof. The I/O interface 4060 may couple the computing machine 4000 to various output devices including video displays, speakers, printers, projectors, tactile feedback devices, automation control, robotic components, actuators, motors, fans, solenoids, valves, pumps, transmitters, signal emitters, lights, and so forth.

The computing machine 4000 may operate in a networked environment using logical connections through the network interface 4070 to one or more other system(s) or computing machines across the network 4080. The network 4080 may include WANs, LANs, intranets, the Internet, wireless access networks, wired networks, mobile networks, telephone networks, optical networks, or combinations thereof. The network 4080 may be packet switched, circuit switched, of any topology, and may use any communication protocol. Communication links within the network 4080 may involve various digital or an analog communication media such as fiber optic cables, free-space optics, waveguides, electrical conductors, wireless links, antennas, radio-frequency communications, and so forth.

The processor 4010 may be connected to the other elements of the computing machine 4000 or the various peripherals discussed herein through the system bus 4020. It should be appreciated that the system bus 4020 may be within the processor 4010, outside the processor 4010, or both. Any of the processor 4010, the other elements of the computing machine 4000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspect(s) of examples described herein may be performed by hardware, software, or a combination thereof, as may be embodied in one or more computing system(s). Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

Various embodiments are described herein. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment," "an embodiment," "an example embodiment," or other similar language means that a particular feature, structure, or characteristic described in connection with the embodiment is included in at least one embodiment of the invention described herein. Thus, appearances of the phrases "in one embodiment," "in an embodiment," "an example embodiment," or other similar language in various places throughout this specification are not necessarily all referring to the same embodiment. Furthermore, the particular features, structures, or characteristics may be combined in any suitable manner in one or more embodiment(s), as would be apparent to a person having ordinary skill in the art and the benefit of this disclosure. Furthermore, while some embodiments described herein include some, but not other, features included in other embodiments, combinations of features of different embodiments are meant to be within the scope of the invention. For example, in the appended claims, any of the claimed embodiments can be used in any combination.

The following examples are presented to illustrate the present disclosure. The examples are not intended to be limiting in any manner.

Example 1 is a wearable system, comprising: at least one acoustic sensor system configured to transmit at least one acoustic signal, to receive at least one reflected acoustic signal, and to output the at least one transmitted acoustic signal and the at least one received reflected acoustic signal; a processor that receives the at least one transmitted acoustic signal and the at least one received reflected acoustic signal from each of the at least one acoustic sensor system; and a physical memory, the physical memory comprising instructions that when executed by the processor cause the processor to: calculate a profile associated with the at least one transmitted acoustic signal and the at least one received reflected acoustic signal; assign a deformation to the profile, the assigned deformation having a predetermined degree of correspondence to a selected one of a plurality of deformations in a model when compared to the profile; and communicate a facial output based on the assigned deformation.

Example 2 includes the subject matter of Example 1, wherein the at least one acoustic sensor system comprises at least one speaker and at least one microphone.

Example 3 includes the subject matter of Examples 1 and 2, wherein the at least one acoustic sensor system comprises a Bluetooth low energy ("BLE") module to output the at least one transmitted acoustic signal and the at least one received reflected acoustic signal.

Example 4 includes the subject matter of any of Examples 1-3, wherein the at least one transmitted acoustic signal is a frequency modulation continuous wave ("FMCW") signal.

Example 5 includes the subject matter of any of Examples 1-4, wherein the profile is a differential echo profile.

Example 6 includes the subject matter of any of Examples 1-5, wherein the deformation is a skin deformation.

Example 7 includes the subject matter of any of Examples 1-6, wherein the communicated facial output comprises one of a facial movement, an avatar movement associated with the facial movement, a speech recognition, text associated with the speech recognition, a physical activity, an emotional status, a two-dimensional visualization of a facial expression, a three-dimensional visualization of a facial expression, an emoji associated with a facial expression, or an avatar image associated with a facial expression.

Example 8 includes the subject matter of any of Examples 1-7, the at least one acoustic sensor system positioned on the wearable system to transmit acoustic signals towards a first facial feature on a first side of a sagittal plane of a wearer and to transmit acoustic signals towards a second facial feature on a second side of the sagittal plane of a wearer.

Example 9 includes the subject matter of any of Examples 1-8, the at least one acoustic sensor system positioned on the wearable system to transmit acoustic signals towards an underside contour of a chin of a wearer.

Example 10 includes the subject matter of any of Examples 1-9, the wearable system comprising ear buds, ear pods, in-the-ear (ITE) headphones, over-the-ear headphones, or outside-the-ear (OTE) headphones to which the at least one acoustic sensor system is attached.

Example 11 includes the subject matter of any of Examples 1-10, the wearable system comprising glasses, smart glasses, a visor, a hat, a helmet, headgear, a virtual reality headset, or another head-borne device to which the at least one acoustic sensor system is attached.

Example 12 includes the subject matter of any of Examples 1-11, the wearable system comprising a necklace, a neckband, or a garment-attachable system to which the at least one acoustic sensor system is attached.

Example 13 includes the subject matter of any of Examples 1-12, further comprising a computing device that receives and displays the communicated facial output.

Example 14 includes the subject matter of any of Examples 1-13, wherein the model is trained using machine learning.

Example 15 includes the subject matter of any of Examples 1-14, the training comprising: receiving one or more frontal view facial image(s) of a subject, each of the frontal view facial images corresponding to a deformation of a plurality of deformations of the subject; receiving one or more transmitted acoustic signal(s) and one or more corresponding reflected acoustic signal(s) associated with the subject, each of the one or more transmitted acoustic signal(s) and the one or more corresponding reflected acoustic signal(s) from the at least one acoustic sensor system also corresponding to a deformation of the plurality of deformations of the subject; and correlating, for each of the deformations, the one or more transmitted acoustic signal(s) and the one or more corresponding reflected acoustic signal(s) from the at least one acoustic sensor system corresponding to a particular deformation to the one or more frontal view facial image(s) corresponding to the particular deformation.

What is claimed is:

1. A wearable system, comprising:
    at least one imaging sensor configured to capture an image of a facial feature of a wearer of the wearable system and to output image data corresponding to the image;
    a processor that receives the image data from each of the at least one imaging sensor; and
    a physical memory, the physical memory comprising instructions that when executed by the processor cause the processor to:
    compare the image data from each of the at least one imaging sensor to a model;
    assign a contour to the image data, the assigned contour having a predetermined degree of correspondence to a selected one of a plurality of contours in the model when compared to the image data; and
    communicate a facial expression image based on the assigned contour;
    wherein the model is trained using machine learning; and
    wherein the training comprises:
    receiving one or more frontal view facial image(s) of a subject, each of the frontal view facial images corresponding to a facial expression of a plurality of facial expressions of the subject;
    receiving one or more image(s) of the subject from the at least one imaging sensor, each of the images from the at least one imaging sensor also corresponding to a facial expression of the plurality of facial expressions of the subject; and
    correlating, for each of the facial expressions, the one or more image(s) from the at least one imaging sensor corresponding to a particular facial expression to the one or more frontal view facial image(s) corresponding to the particular facial expression.

2. The wearable system of claim 1, wherein the at least one imaging sensor comprises an acoustic camera or an acoustic sensor configured to:
    transmit signals towards a wearer's face; and
    detect reflected signals from the wearer's face, wherein the transmitted signals are reflected differently based on different facial expressions or movements of the wearer.

3. The wearable system of claim 1, wherein the communicated facial expression image comprises one of a two-dimensional visualization of the facial expression image, a three-dimensional visualization of the facial expression image, an emoji associated with the facial expression image, or an avatar image associated with the facial expression image.

4. The wearable system of claim 1, wherein comparing the image data from each of the at least one imaging sensor to the model comprises processing the image data to at least one derivative image data set and comparing the at least one derivative image data set to the model.

5. The wearable system of claim 1, the at least one imaging sensor positioned on the wearable system to capture image data of a first facial feature on a first side of a sagittal plane of the wearer and to capture image data of a second facial feature on a second side of the sagittal plane of the wearer.

6. The wearable system of claim 1, the at least one imaging sensor positioned on the wearable system to capture image data of an underside contour of a chin of the wearer.

7. The wearable system of claim 1, wherein correlating for each of the facial expressions comprises:
    extracting a plurality of landmark positions from each of the one or more frontal view facial image(s) of the subject;

extracting a plurality of landmark positions from each of the one or more image(s) of the subject from the at least one imaging sensor;

correlating the landmark positions for a particular frontal view facial image with a particular facial expression; and correlating the landmark positions for a particular one of the images of the subject from the at least one imaging sensor with the particular facial expression.

8. The wearable system of claim 1, the at least one imaging sensor comprising a first imaging sensor and a second imaging sensor, the first imaging sensor positioned on the wearable system to capture first image data of a first facial feature of the wearer, and the second imaging sensor positioned on the wearable system to capture second image data of a second facial feature of the wearer, wherein comparing the image data from each of the at least one imaging sensor to the model comprises comparing the first image data of the first facial feature of the wearer to the model and comparing the second image data of the second facial feature of the wearer to the model, wherein assigning a contour to the image data comprises assigning a first contour to the first image data and a second contour to the second image data, and wherein the facial expression image being based on the assigned first contour and the assigned second contour.

9. The wearable system of claim 8, the first imaging sensor positioned on the wearable system to capture image data of the first facial feature on a first side of a sagittal plane of the wearer, and the second imaging sensor positioned on the wearable system to capture an image of the second facial feature on a second side of the sagittal plane of the wearer.

10. The wearable system of claim 8, the first facial feature comprising a left side contour of a face of the wearer, and the second facial feature comprising a right side contour of the face of the wearer.

11. The wearable system of claim 8, the first facial feature comprising a left underside contour of a chin of the wearer, and the second facial feature comprising a right underside contour of the chin of the wearer.

12. The wearable system of claim 1, the wearable system comprising ear buds, ear pods, in-the-ear (ITE) headphones, over-the-ear headphones, or outside-the-ear (OTE) headphones to which the at least one imaging sensor is attached.

13. The wearable system of claim 1, the wearable system comprising glasses, smart glasses, a visor, a hat, a helmet, headgear, a virtual reality headset, or another head-borne device to which the at least one imaging sensor is attached.

14. The wearable system of claim 1, the wearable system comprising a necklace, a neckband, or a garment-attachable system to which the at least one imaging sensor is attached.

15. The wearable system of claim 1, the physical memory comprising further instructions that when executed by the processor cause the processor to:

compare the assigned contour to a second model; and assign the facial expression image based on the assigned contour, the assigned facial expression image having a predetermined degree of correspondence to a selected one of a plurality of contours in the second model when compared to the assigned contour.

16. The wearable system of claim 15, wherein the second model is trained using machine learning.

17. The wearable system of claim 16, wherein the training of the second model comprises:

receiving one or more frontal view facial image(s) of a subject, each of the frontal view facial images corresponding to a facial expression of a plurality of facial expressions of the subject;

receiving one or more image(s) of the subject from the at least one imaging sensor, each of the images from the at least one imaging sensor also corresponding to a facial expression of the plurality of facial expressions of the subject; and correlating, for each of the facial expressions, the one or more image(s) from the at least one imaging sensor corresponding to a particular facial expression to the one or more frontal view facial image(s) corresponding to the particular facial expression.

18. The wearable system of claim 17, wherein correlating for each of the facial expressions in the training of the second model comprises:

extracting a plurality of landmark positions from each of the one or more frontal view facial image(s) of the subject;

extracting a plurality of landmark positions from each of the one or more image(s) of the subject from the at least one imaging sensor;

correlating the landmark positions for a particular frontal view facial image with a particular facial expression; and correlating the landmark positions for a particular one of the images of the subject from the at least one imaging sensor with the particular facial expression.

19. The wearable system of claim 1, further comprising a computing device that receives and displays the communicated facial expression image.

20. The wearable system of claim 1, wherein the at least one imaging sensor comprises a depth camera, a red-green-blue ("RGB") camera, an infrared ("IR") sensor, an acoustic camera, an acoustic sensor, a thermal imaging sensor, a charge-coupled device ("CCD"), a complementary metal oxide semiconductor ("CMOS") device, an active-pixel sensor, or a radar imaging sensor.

21. The wearable system of claim 1, the physical memory comprising further instructions that when executed by the processor cause the processor to:

compare the facial expression image to a second model;

assign at least one of a letter or a word to the facial expression image based on a predetermined degree of correspondence of the assigned at least one of a letter or a word to a selected one of a plurality of letters or words in the second model when compared to the facial expression image, and output text or speech corresponding to the assigned at least one of a letter or a word.

22. The wearable system of claim 1, wherein the captured image further captures an object in a vicinity of the captured facial feature of the wearer; and wherein the predetermined degree of correspondence of the image data to the selected one of the contours in the model includes correspondence based on the captured object in the image data.

23. A method to determine a facial expression using a wearable system, comprising:

positioning a first imaging sensor of a wearable system to image a first facial feature of a wearer;

imaging the first facial feature of the wearer using the first imaging sensor;

comparing, via a processor, the imaged first facial feature to a first model; and assigning, via the processor, a facial expression corresponding to the imaged first facial feature selected from one of a plurality of facial expressions in the first model;
wherein the first model is trained using machine learning; and
wherein the training comprises:
receiving one or more frontal view facial image(s), each of the frontal view facial images corresponding to a facial expression of a plurality of facial expressions;
receiving one or more image(s) from the first imaging sensor, each of the images from the first imaging sensor also corresponding to a facial expression of the plurality of facial expressions; and
correlating, for each of the facial expressions, the one or more image(s) from the first imaging sensor corresponding to a particular facial expression to the one or more frontal view facial image(s) corresponding to the particular facial expression.

24. The method of claim 23, wherein the act of positioning the first imaging sensor of the wearable system comprises positioning the first imaging sensor in a vicinity of an ear of the wearer facing forward to include within a field of view at least one of a buccal region, a zygomatic region, and/or a temporal region of one side of the wearer's face.

25. A method to determine a facial expression using a wearable system, comprising:
positioning a first imaging sensor of a wearable system to image a first facial feature of a wearer;
positioning a second imaging sensor of the wearable system to image a second facial feature of the wearer;
imaging the first facial feature of the wearer using the first imaging sensor;
imaging the second facial feature of the wearer using the second imaging sensor;
comparing, via a processor, the imaged first facial feature and the imaged second facial feature to a model; and
assigning, via the processor, a facial expression selected from one of a plurality of facial expressions in the model corresponding to the imaged first facial feature and the imaged second facial feature;
wherein the model is trained using machine learning; and
wherein the training comprises:
receiving one or more frontal view facial image(s), each of the frontal view facial images corresponding to a facial expression of a plurality of facial expressions;
receiving one or more image(s) from at least one of the first imaging sensor and the second imaging sensor, each of the images from the at least one of the first imaging sensor and the second imaging sensor also corresponding to a facial expression of the plurality of facial expressions; and
correlating, for each of the facial expressions, the one or more image(s) from the at least one of the first imaging sensor and the second imaging sensor corresponding to a particular facial expression to the one or more frontal view facial image(s) corresponding to the particular facial expression.

* * * * *